(12) United States Patent
Suzuki et al.

(10) Patent No.: US 7,163,331 B2
(45) Date of Patent: Jan. 16, 2007

(54) LIGHTING UNIT AND DISPLAY DEVICE

(75) Inventors: Toshihiro Suzuki, Kawasaki (JP); Tetsuya Hamada, Kawasaki (JP); Mari Sugawara, Kawasaki (JP); Tetsuya Kobayashi, Kawasaki (JP); Keiji Hayashi, Kawasaki (JP)

(73) Assignee: Sharp Kabushiki Kaisha, Osaka (JP)

( * ) Notice: Subject to any disclaimer, the term of this patent is extended or adjusted under 35 U.S.C. 154(b) by 126 days.

(21) Appl. No.: 10/641,720

(22) Filed: Aug. 15, 2003

(65) Prior Publication Data

US 2004/0042233 A1    Mar. 4, 2004

(30) Foreign Application Priority Data

Aug. 30, 2002    (JP)    ............... 2002-255713

(51) Int. Cl.
  *F21V 7/04*    (2006.01)
  *F21V 8/00*    (2006.01)

(52) U.S. Cl. .................. 362/610; 362/609; 362/612; 362/621; 362/628

(58) Field of Classification Search ............... 362/560, 362/561, 608–610, 612, 616, 621, 622, 628
See application file for complete search history.

(56) References Cited

U.S. PATENT DOCUMENTS

| | | | | | |
|---|---|---|---|---|---|
| 4,630,895 | A | * | 12/1986 | Abdala et al. | ............... 362/612 |
| 5,359,691 | A | * | 10/1994 | Tai et al. | ..................... 362/561 |
| 5,390,276 | A | * | 2/1995 | Tai et al. | ..................... 362/561 |
| 5,613,751 | A | * | 3/1997 | Parker et al. | ................ 362/627 |
| 5,883,684 | A | * | 3/1999 | Millikan et al. | ............ 362/612 |
| 5,986,727 | A | * | 11/1999 | Fukui et al. | ................. 362/609 |
| 6,053,619 | A | | 4/2000 | Nakamura et al. | .......... 362/609 |
| 6,104,454 | A | * | 8/2000 | Hiyama et al. | ............. 362/608 |
| 6,164,789 | A | * | 12/2000 | Unger et al. | ................. 362/610 |
| 6,648,485 | B1 | * | 11/2003 | Colgan et al. | .............. 362/600 |
| 7,001,058 | B1 | * | 2/2006 | Inditsky | ....................... 362/610 |
| 2001/0017774 | A1 | * | 8/2001 | Ito et al. | ........................ 362/31 |

FOREIGN PATENT DOCUMENTS

| | | |
|---|---|---|
| CN | 1204775 A | 1/1999 |
| JP | 5-61730 | 8/1993 |
| JP | 07-095360 | 4/1995 |
| JP | 2001-083358 | 3/2001 |
| JP | 2001-135117 | 5/2001 |

* cited by examiner

*Primary Examiner*—Alan Cariaso
(74) *Attorney, Agent, or Firm*—Greer, Burns & Crain, Ltd

(57) ABSTRACT

A lighting unit and a liquid crystal display device which can improve the efficiency of usable light. The lighting unit includes a light source, a light guide plate, and a truncated pyramid located between the light guide plate and the light source. The truncated pyramid has a base, a top smaller than the base, and a slope linking the base and the top. The light source is placed in close contact with the top of the truncated pyramid, and the light guide plate is placed in close contact with the base of the truncated pyramid. Light is propagated from a light emitting part of the light source to the light guide plate without passing through any air layer. Also, an unnecessary light removing structure is provided in the light guide plate near the incidence surface thereof.

19 Claims, 43 Drawing Sheets

$-\alpha < \theta < \alpha$ $\alpha < \theta < \theta_0, \ -\theta_0 < \theta < -\alpha$ $\theta_0 < \theta, \ \theta < -\theta_0$

V LIGHT DISTRIBUTION CHARACTERISTIC

H LIGHT DISTRIBUTION CHARACTERISTIC

SPREAD ANGLE
(WHOLE ANGLE)

LIGHTING UNIT AND DISPLAY DEVICE

BACKGROUND OF THE INVENTION

1. Field of the Invention

The present invention relates to a lighting unit and a display device.

2. Description of the Related Art

For example, a display device such as a liquid crystal display device includes a lighting unit referred to as a front light or a backlight. The lighting unit includes a light source and a light guide plate. Light emitted by the light source enters the light guide plate. The light is propagated through the light guide plate while being repeatedly totally reflected within the light guide plate. The light leaves the light guide plate toward a display panel by means of a light discharging mechanism such as a set of prisms.

A cold cathode tube (fluorescent lamp) is used as the light source. The cold cathode tube is located at the side of the light guide plate together with a generally U-shaped reflector. Light emitted by the cold cathode tube and reflected by the reflector falls on the light guide plate.

Moreover, an LED (or LEDs) can be used as the light source. The LED is manufactured as an LED package having a semiconductor chip sealed with a resin. A mirror is formed behind a light emitting part of the LED package, and light is directed forwards from the LED package. However, the directivity of light of the LED is low, and light radially travels in forward and oblique directions at various angles. This poses a problem in that the usage efficiency of light emitted by the LED and entering the light guide plate is low.

Moreover, a certain type of lighting unit includes two light guide plates. A light source is located at the side of a first light guide plate, and the first light guide plate is located at the side of the second light guide plate. Light enters the first light guide plate, and then enters the second light guide plate after coming out of the first light guide plate. The light is propagated through the second light guide plate while being repeatedly totally reflected within the second light guide plate. The light leaves the second light guide plate toward the display panel by means of a light discharging mechanism such as a set of prisms. The thickness of the first light guide plate is the same as the thickness of the second light guide plate. The second light guide plate is bonded to a polarizer with a low refractive index layer, the refractive index of which is lower than that of the second light guide plate. In this kind of lighting unit, light exhibiting a large angular distribution leaks out of the second light guide plate and degrades the contrast offered by the display device. Consequently, it has been required that light exhibiting a high degree of parallelism enters the second light guide plate. Moreover, there is a problem that a part of light guide plate located near the light source causes degradation of the contrast.

Also, in the case where the light guide plate, the polarizer, and the liquid crystal panel are bonded to one another as a unit, and a low refractive index layer whose refractive index is higher than the refractive index of air but lower than the refractive index of the light guide plate is interposed between the light guide plate and the polarizer, light entering the light guide plate at an angle greater than a total reflection angle of the light guide plate is not propagated through the light guide plate but enters the liquid crystal panel, at a large angle, as it is. This light degrades the contrast offered by the liquid crystal panel, makes the contrast and the brightness non-uniform, and degrades the quality of the display.

When the light guide plate and the liquid crystal panel are bonded to each other with the low refractive index layer, of which the refractive index is lower than that of the light guide plate, light propagated in the light guide plate is not completely reflected by the interface but passes through the polarizing layer and enters the liquid crystal panel. The propagated light therefore causes degradation of the contrast.

Moreover, when the light guide plate, the polarizer, and the liquid crystal panel are bonded to one another as a unit, it means that hard plates are bonded to one another. This poses a problem in that the hard plates are liable to peel off. In particular, if dust is caught in the adhesive, the hard plates are liable to peel off.

SUMMARY OF THE INVENTION

Accordingly, an object of the present invention is to provide a lighting unit in which the efficiency in introducing light from a light source to a light guide plate can be improved.

An object of the present invention is to provide a lighting unit in which light exhibiting a high degree of parallelism enters a light guide plate.

An object of the present invention is to provide a lighting unit and a display device which contribute to improving the contrast offered by a display device.

An object of the present invention is to provide a display device that exhibits high efficiency in utilizing light or offers a high contrast.

A lighting unit, in accordance with the present invention, includes a light guide plate, a light source, and a truncated pyramid located between the light guide plate and light source. The truncated pyramid has a base, a top smaller than the base, and a slope linking the base and the top. The light source is placed in close contact with the top of the truncated pyramid. The light guide plate is placed in close contact with the base of the truncated pyramid. Thus, light is propagated from a light emitting part of the light source to the light guide plate without passing through any air layer.

In this construction, no air layer is interposed between the light source such as an LED and the light guide plate. Light emitted by the light source at a large angle can enter the truncated pyramid. The light is totally reflected by the slope of the truncated pyramid interposed between the light source and the light guide plate and propagated internally through the light guide plate. Consequently, light emitted by the light source can be utilized efficiently. Eventually, light exhibiting a high degree of parallelism can be introduced into the light guide plate.

Moreover, a lighting unit, in accordance with the present invention, comprises a light guide plate, a light source, and a truncated pyramid located between the light guide plate and the light source. The base of the truncated pyramid is joined to the light guide plate or placed in close contact therewith. The light source is located near the truncated pyramid. A reflecting member is placed to enclose the light source and the truncated pyramid. A light absorbing member is located on or near the border between the wedge-shaped member and the light guide plate.

In this construction, light exhibiting a high degree of parallelism can be introduced to the light guide plate.

Moreover, a lighting unit, in accordance with the present invention, comprises a light source, a first light guide plate receiving light emitted by the light source, a second light guide plate receiving light passing through the first light guide plate, and a light converging means located between the first light guide plate and the second light guide plate. The thickness of the second light guide plate is greater than the thickness of the first light guide plate.

In this construction, light exhibiting a high degree of parallelism enters the light guide plate.

Moreover, a liquid crystal display device, in accordance with the present invention, includes any of the foregoing lighting units.

Moreover, a liquid crystal display device in accordance with the present invention, comprises a light source, a light guide plate on which light emitted by the light source falls, a liquid crystal panel, and a polarizer arranged between the light guide plate and the liquid crystal panel. The light guide plate, the polarizer, and the liquid crystal panel are bonded to one another. The light guide plate has an incidence surface on which light emitted by the light source falls, a light guide area corresponding to a display area of the liquid crystal panel, a first surface at which light travelling in the light guide area leaves the light guide plate toward the liquid crystal panel, prisms formed on a second surface on the opposite side of the light guide plate, and an unnecessary light removing area interposed between the incidence surface and the light guide area for removing at least part of unnecessary light that falls on the light guide plate at an angle greater than a total reflection angle of the light guide plate.

In this construction, the unnecessary light removing area that includes no prisms but includes an absorbing member is formed near the incidence surface. Unnecessary light that is totally reflected within the light guide plate but is not propagated at all is removed in the unnecessary light removing area. Consequently, a high-contrast display can be achieved.

Furthermore, the present invention provides a liquid crystal display device having a light guide plate, a polarizer, and a liquid crystal panel bonded to one another, and including the features described below.

(a) In a portion of the prisms lying over a distance corresponding to approximately three times greater than the thickness of the light guide area and starting from the end of the prism on the side of the incidence surface, each prism having a slow slope and a steep slope. The slow slope has an inclination of 1° or more with respect to a light discharging surface of the light guide area. Thus, the slow slope of each of the prisms formed near the incidence surface has an inclination of 1° or more. A high contrast is attained a short distance from the incidence surface.

(b) The absorption axis of the polarizer is oriented generally perpendicular to the incidence surface of the light guide area or at an inclination within generally 45° with respect to the perpendicular direction. The absorption axis of the polarizer is set to a direction generally perpendicular to the incident light. Thus, a high contrast is attained a short distance from the incidence surface.

(c) If the refractive index of the light guide area is ng, the refractive index of a layer of the liquid crystal panel from which light propagated through the light guide plate is reflected is na, a pitch between adjoining prisms is P, and a distance from the prisms to a reflecting mechanism included in the liquid crystal panel is D, the following relationship is established:

$$\sqrt{Ng^2-Na^2}/Na \geq 0.5(P/D)$$

The pitch between adjoining prisms, and the distance from the prisms to the internal mirror of the liquid crystal display panel are defined so that illumination variation may not occur.

In this way, the size and the position of the polarizer are defined relative to the display area of the liquid crystal panel so that illumination variation may not occur.

(d) A first low refractive index layer whose refractive index is lower than that of the light guide plate is arranged between the polarizer and the light guide plate. A second low refractive index layer whose refractive index is lower that that of the light guide plate is arranged between the liquid crystal panel and the polarizer. Consequently, unnecessary light passing through the first low refractive index layer and causing a low contrast is partly reflected by the second low refractive index layer. Thus, an amount of unnecessary light reaching the liquid crystal panel is reduced.

(e) One side or both sides of the polarizer are formed with an irregular surface.

Consequently, minute bubbles can be contained in the bond layer. A layer whose refractive index is substantially lower can be produced.

(f) The polarizer and the light guide plate are bonded to each other using a first bond layer. The liquid crystal panel and the polarizing layer of the polarizer are bonded to each other using a second bond layer. With respect to at least one of the first bond layer and second bond layer, assuming that the thickness of the bond layer is T and the size of dust caught in the bond layer is S, the following relationship is established:

$$S<50 \; \mu m \; or \; S<T$$

The size of dust to be caught during bonding is defined in order to prevent peeling off of the bonded plates, triggered by the dust, due to an environmental change and a time-sequential change.

(g) The polarizer and the light guide plate are bonded to each other using a first bond layer. The liquid crystal panel and the polarizing layer of the polarizer are bonded to each other using a second bond layer. The thickness of the first bond layer serves as a structure for preventing or minimizing reflection or part of the structure for preventing or minimizing reflection. Thus, the thickness of the low refractive index layer is defined so that it provides an interference type anti-reflection structure, whereby degradation of a contrast stemming from reflection is prevented.

(h) A bond layer is formed on the light guide plate. The polarizer includes at least a transparent layer and a polarizing layer. The transparent layer is located closer to the light guide plate than the polarizing layer is. The refractive index of the light guide plate is generally identical to the refractive index of the bond layer. The refractive index of the transparent layer is lower than the refractive indices of the light guide plate and the bond layer.

(i) The thickness of a low refractive index area substantially forming the reflecting surface of the light guide plate serves as a structure for preventing or minimizing reflection of vertical light or corresponds to a half of the wavelength of the vertical light.

(j) The light guide plate comprises a substrate and a resin layer. The substrate is made of the same material as the substrate of the liquid crystal panel or a material exhibiting nearly the same coefficient of thermal expansion as the material made into the substrate of the liquid crystal panel. The resin layer has a light path changing capability of prisms for changing the path of light propagated through the light guide plate and emitting the light out of the light guide plate. Thus, the coefficients of thermal expansion of the plates to be bonded to each other agree with each other, whereby the bonded plates are prevented from peeling off because of a warp stemming from a temperature change.

(k) The materials of the light guide plate and of the substrate of the liquid crystal panel are glass or plastic.

(l) Prisms are formed on one side of the light guide plate, and the polarizer is bonded on the opposite side of the light guide plate. The liquid crystal panel is driven according to the vertical alignment method. The vertical alignment type liquid crystal panel is used in combination with a high-contrast optical system, thus achieving a display of a higher contrast.

(m) Prisms are formed on one side of the light guide plate, and the polarizer is bonded to the opposite side thereof. The full angle of a spread angle by which light propagated through the light guide plate spreads on a horizontal plane falls below 60°.

Furthermore, a method of manufacturing a liquid crystal display, in accordance with the present invention, comprises a step of bonding a polarizer to a liquid crystal panel, a step of bonding a light guide plate to an assembly of the polarizer and the liquid crystal panel bonded to each other, and a step of pressing the bonded unit formed by bonding the light guide plate, the polarizer, and the liquid crystal panel in that order.

The bonding steps are defined, whereby the manufacturing method offers excellent bonding efficiency. Namely, prior to bonding, the bonded surface of the light guide plate is treated. This results in improved bonding efficiency.

DESCRIPTION OF THE PREFERRED EMBODIMENTS

Embodiments of the present invention are now described with reference to the drawings.

Figure 1:
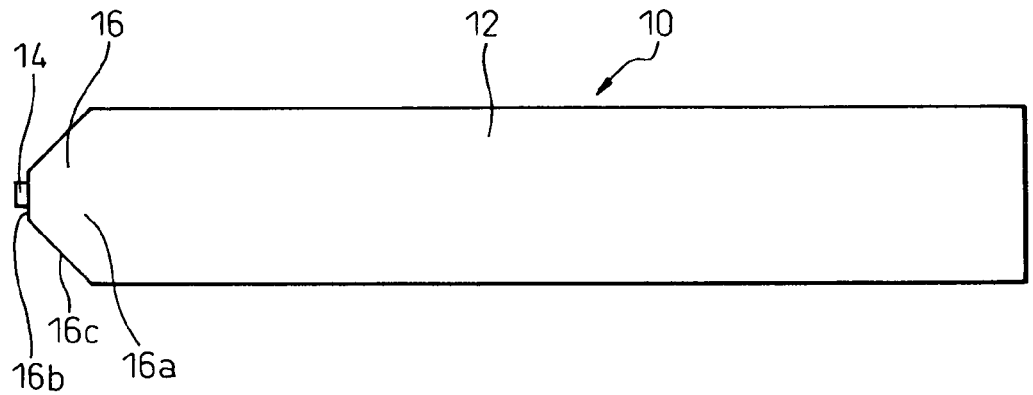
FIG. 1 is a schematic view showing a lighting unit in accordance with a first embodiment of the present invention.
Figure 2:
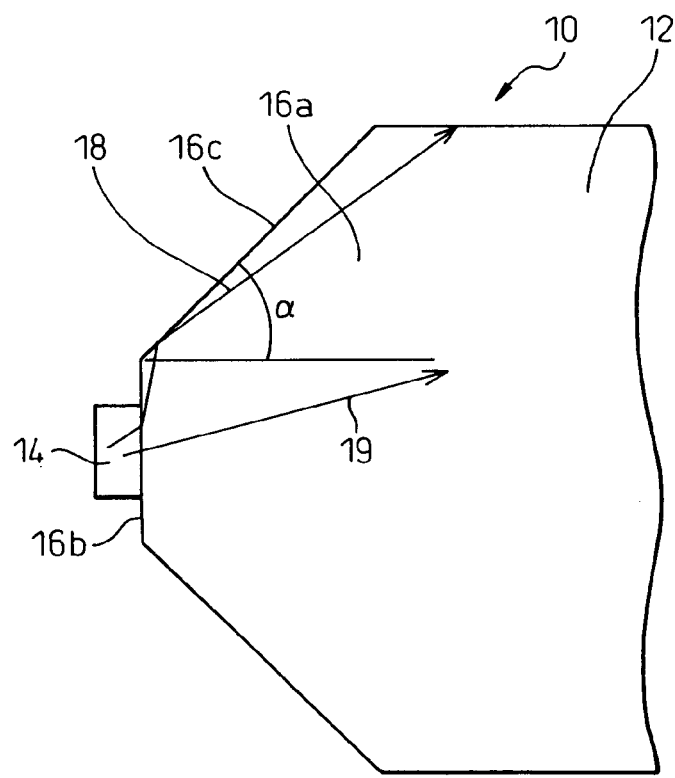
FIG. 2 is a partially enlarged view of the lighting unit for explaining the operation of the lighting unit shown in FIG. 1.

FIG. 1 is a schematic view showing a lighting unit 10 in accordance with a first embodiment. FIG. 2 is a partially enlarged view of the lighting unit 10 for explaining the operation of the lighting unit 10 shown in FIG. 1.

Figure 5:
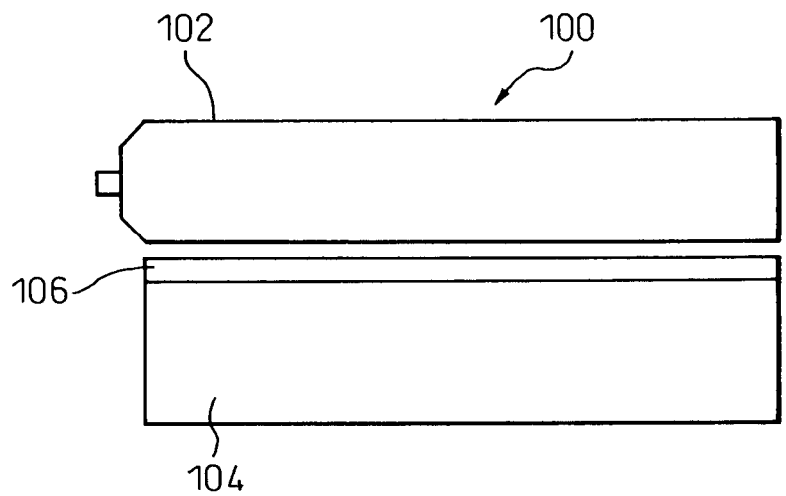
FIG. 5 is a schematic view showing an example of a display device including the lighting unit.
Figure 6:
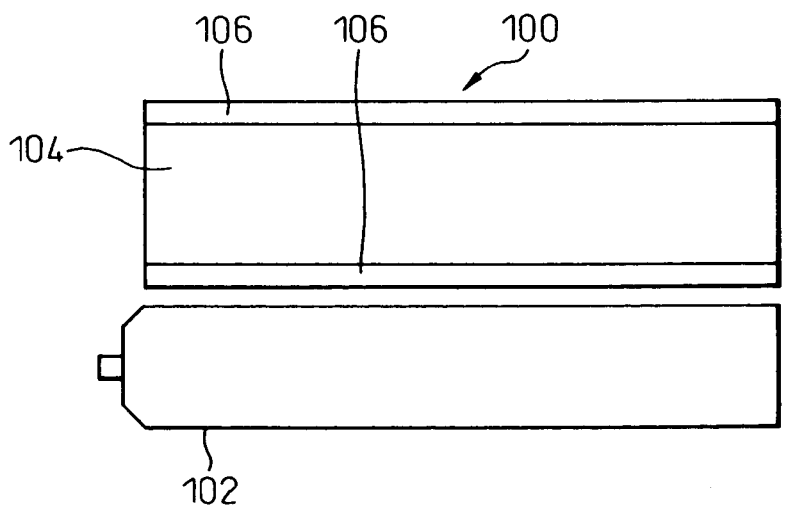
FIG. 6 is a schematic view showing another example of the display device including the lighting unit.

FIGS. 5 and 6 are schematic views showing an example of a display device including a lighting unit. In FIGS. 5 and 6, a display device 100 includes a lighting unit 102 and a display panel 104. In FIG. 5, the lighting unit 102 is a front light, and the display panel 104 is a reflective liquid crystal display panel. A polarizer 106 is arranged between the front light 102 and display panel 102. In FIG. 6, the lighting unit 102 is a backlight and the display panel 104 is a transmissive liquid crystal display panel. Polarizers 106 are arranged on both sides of the display panel 104. The lighting unit 10 to be described below is usable as the lighting unit 102 shown in FIG. 5 or FIG. 6 or any other lighting unit.

Referring to FIG. 1, the lighting unit 10 comprises a light guide plate 12, a light source 14, and a truncated pyramid 16 located between the light guide plate 12 and the light source 14. The truncated pyramid 16 has a base 16a, a top (support surface) 16b smaller than the base 16a, and a slope (slopes) 16c linking the base 16a and the top 16b. The light source 14 is placed in close contact with the top 16b of the truncated pyramid 16. The light guide plate 12 is placed in close contact with the base 16a of the truncated pyramid 16. Light is propagated from the light emitting part of the light source 14 to the light guide plate 12 without passing through any air layer.

Referring to FIGS. 1 and 2, the truncated pyramid 16 is made of the same material as the light guide plate 12 and integrated with the light guide plate 12. The light source 14 is fixed to the top 16b of the truncated pyramid 16 by an adhesive. For example, the light guide plate 12 the truncated pyramid 16 are made of acrylic resin (refractive index is 1.48), Arton, or Zeonor (refractive index is 1.51). Polycarbonate resin (refractive index is 1.58) may be adopted. In this embodiment, the adhesive optically couples the light source 14 and the truncated pyramid 16 to each other in such a manner that air will not substantially caught in the space between the light source 14 and the truncated pyramid 16. Herein, a permanent adhesive, a removable adhesive and other bonding members are generically called the adhesive.

Figure 4:
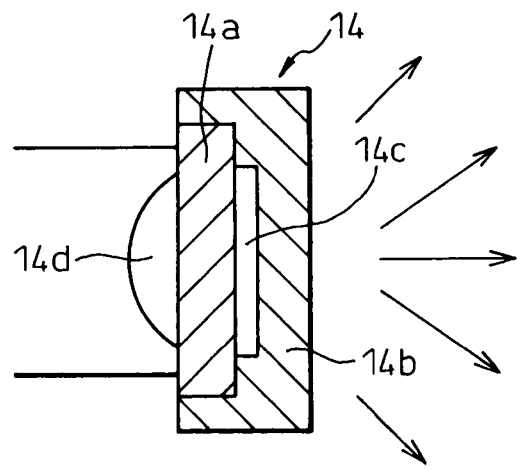
FIG. 4 is a sectional view showing an example of an LED.

The light source 14 comprises an LED. FIG. 4 is a sectional view showing an example of the LED. The LED 14 is manufactured as an LED package having a semiconductor chip 14a, in which a pn junction is formed, sealed with a resin 14b such as an acrylic or an epoxy resin. A mirror 14d is formed behind a light emitting part 14c included in the LED 14. Light is irradiated forwards from the LED 14 in the radial directions as indicated by arrows. The directivity of light of the LED 14 is small, and light travels in forward and oblique directions at various angles.

In FIG. 2, light 18 emanating from the light source 14 at a relatively large angle with respect to the axis of the light guide plate 12 is shown. The light 18 enters the truncated pyramid 16 and travels towards the slope 16*c*. The light 18 is totally reflected by the slope 16*c* of the truncated pyramid 16 and travels further within the light guide plate 12. The light 18 is propagated through the light guide plate 12, repeating total reflection within the light guide plate 12, and leaves the light guide plate 12 toward the display panel 104 by means of a light discharging mechanism such as prisms or a diffuse reflection layer. Light 19 emanating from the light source 14 at a relatively small angle with respect to the axis of the light guide plate 12 is propagated through the light guide plate 12 without hitting the slope 16*c*.

Assuming that the refractive index of the truncated pyramid 16 is n and an angle at which the slope 16*c* meets a line parallel to the axis of the truncated pyramid 16 is α, if the angle α of the slope 16*c* of the truncated pyramid 16 is equal to or larger than $\arcsin(1/n)$, light made incident to the truncated pyramid 16 is entirely totally reflected by the slope 16*c*. However, if the angle α is large, the amount of light reflected by the slope 16*s* may decrease. Moreover, there is a possibility that light reflected by the slope 16*c* may pass through the surface of the light guide plate 12. Consequently, if the angle α of the slope 16*c* of the truncated pyramid 16 ranges from 30° to 45°, the amount of light allowed to enter the light guide plate 12 increases.

The light emitting part of the light source 14 is smaller in size than the top 16*b* of the truncated pyramid 16 or equal thereto. Moreover, the light emitting surface of the light source 14 is smaller in size than the top 16*b* of the truncated pyramid 16 or is equal thereto. Consequently, a larger amount of light emitted by the light source 14 can be introduced into the truncated pyramid 16.

Figure 3:
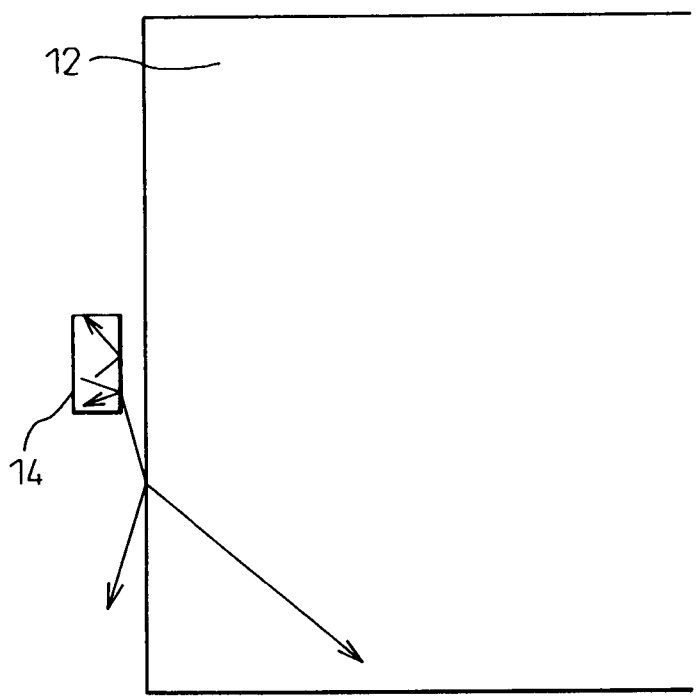
FIG. 3 is an explanatory view for explaining the operation of a lighting unit presented of a comparative example.

FIG. 3 is an explanatory view for explaining the operation of a lighting unit of a comparative example. In FIG. 3, the truncated pyramid 16 is not included, and the light source 14 is not in optical contact with the light guide plate 12. Namely, an air layer is interposed between the light source 14 and the light guide plate 12. In this case, part of light emitted by the light emitting part of the light source 14 is reflected by the interface between the light source 14 and air layer and is not directed to the light guide plate 12. Part of the light is reflected by the end surface of the light guide plate 12 and does not enter the light guide plate 12.

According to the present invention, this kind of light that cannot be utilized can be considerably largely introduced into the light guide plate 12, and the light utilization efficiency can be improved. An experiment has revealed that the light introducing efficiency is improved to be 2.9 times higher.

FIGS. 7 to 23 show further examples of the lighting unit 10. In these examples, the lighting unit 10 comprises a light guide plate 12, a light source 14, and a truncated pyramid 16 linking the light guide plate 12 and the light source 14. The light source 14 is placed in close contact with the top 16*b* of the truncated pyramid 16, and the light guide plate 12 is placed in close contact with the base 16*a* of the truncated pyramid 16, so that light is propagated from the light emitting part of the light source 14 to the light guide plate 12 without any air layer between them.

Figure 7:
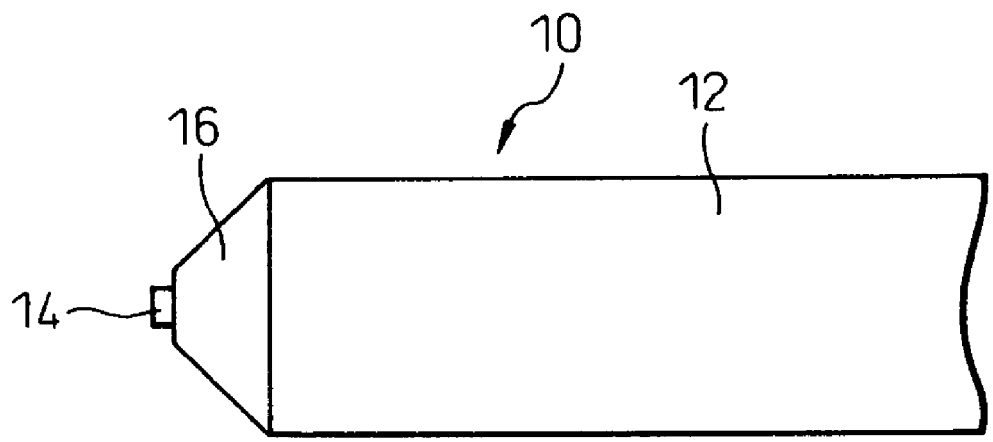
FIG. 7 shows another example of a lighting unit.

In FIG. 7, the light source 14 and the truncated pyramid 16 are integrated with each other, and the truncated pyramid 16 is attached to the light guide plate 12.

Figure 8:
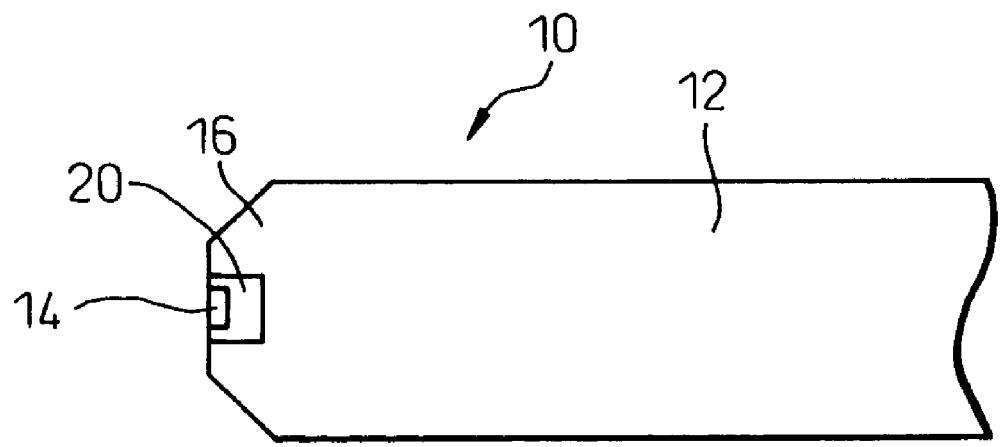
FIG. 8 shows a further example of a lighting unit.

In FIG. 8, the truncated pyramid 16 and the light guide plate 12 are integrated with each other, and the light source 14 is attached to the top 16*b* of the truncated pyramid 16 using a deformable body (adhesive) 20 that can be deformed due to a flow thereof, and is applied to a concave part of the top 16*b* of the truncated pyramid 16.

Figure 9:
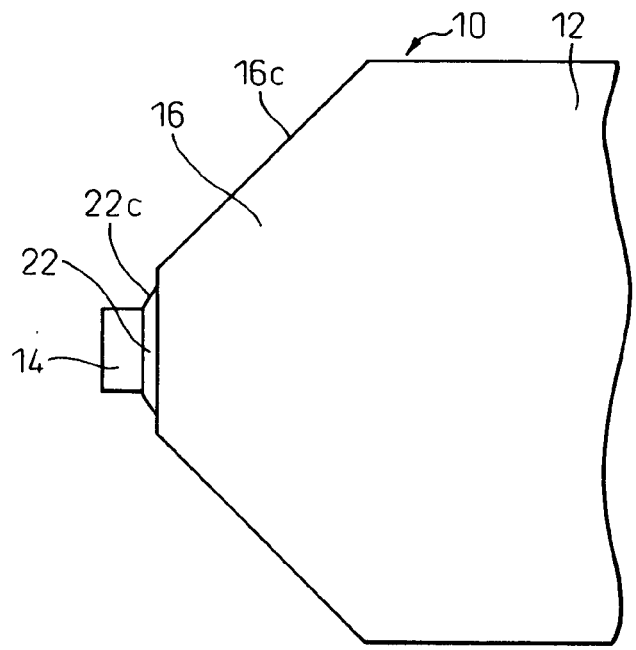
FIG. 9 shows a further example of a lighting unit.

In FIG. 9, the light source 14 is attached to the top 16*b* of the truncated pyramid 16 using the adhesive 22. The design is such that not only the truncated pyramid 16 has the slope 16*c* but also the adhesive 22 has a slope 22*c*. Consequently, in this example, the adhesive 22 has the same function as that of the truncated pyramid 16. This leads to improvement in light utilization efficiency. In this example, the adhesive 22 is acrylic resin, similar to the light guide plate 12 and to the truncated pyramid 16 that are acrylic. This leads to improvement in adhesive strength. Moreover, an air layer is removed. Preferably, the shape of the adhesive 22 is determined so that the relationship between the refractive index n and the inclination α of the slope, which has been described with reference to FIG. 2, will be established.

Figure 10:
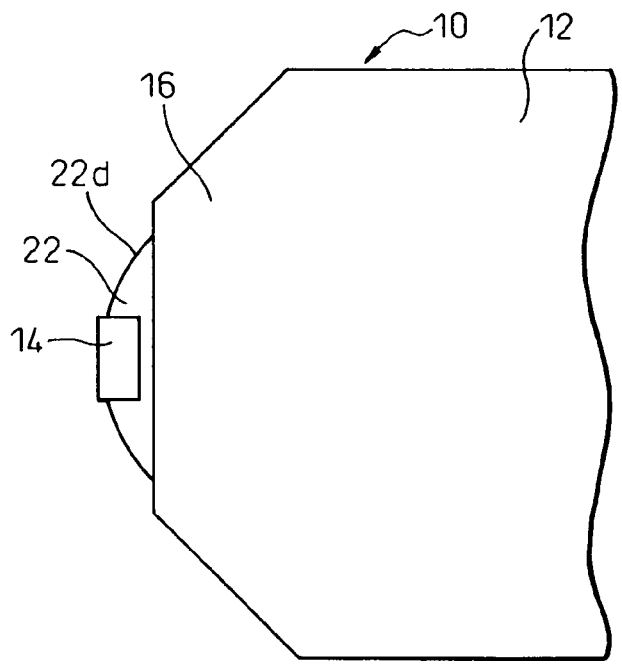
FIG. 10 shows a further example of a lighting unit.

In FIG. 10, the light source 14 is attached to the top 16*b* of the truncated pyramid 16 using the adhesive 22. The surface 22*d* of the adhesive 22 is a rounded inclined surface. In this example, similarly to the lighting unit 10 shown in FIG. 9, light utilization efficiency improves. In this example, first, the light source 14 is bonded to the top 16*b* of the truncated pyramid 16. Thereafter, an acrylic resin is added in order to form a partial sphere. When the light source 14 is embedded in the adhesive 22, light emitted by the sides of the light source 14 can also be used.

Figure 11:
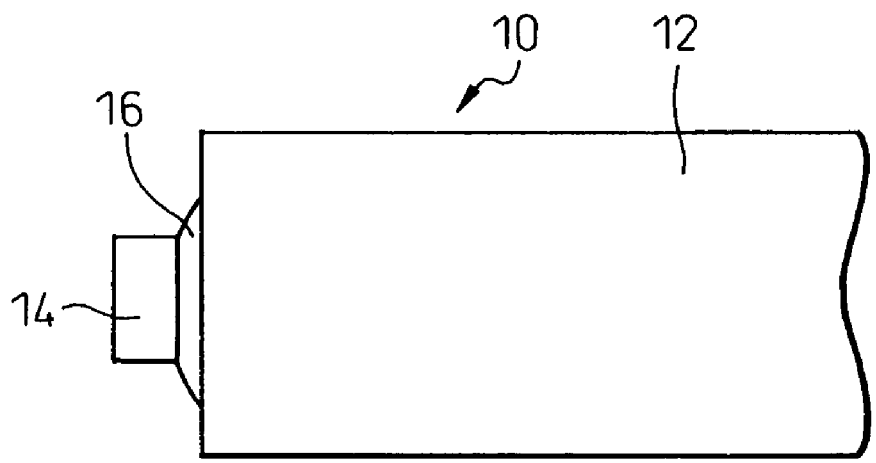
FIG. 11 shows a further example of a lighting unit.
Figure 12:
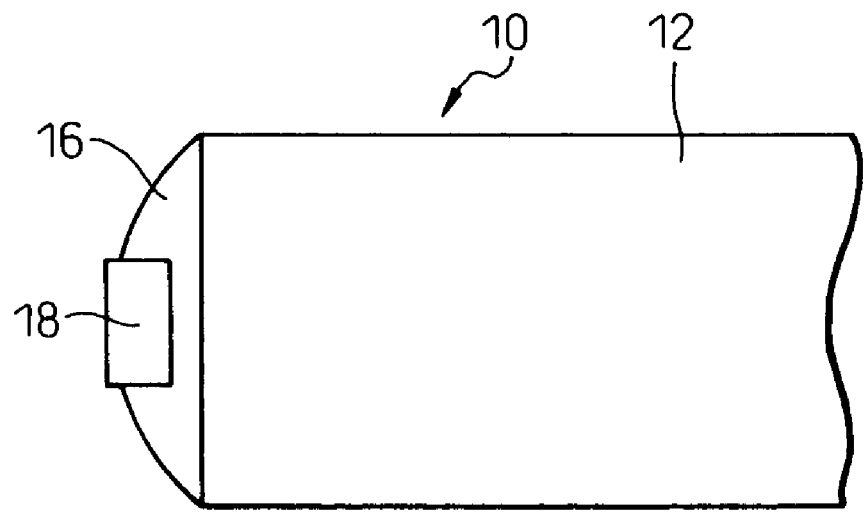
FIG. 12 shows a further example of a lighting unit.

In FIGS. 11 and 12, the truncated pyramid 16 is made of an adhesive. Even in this example, preferably, the shape of the adhesive made into the truncated pyramid 16 is determined so that the relationship between the refractive index n and the inclination a of the slope, which has been described with reference to FIG. 2, will be established.

Figure 13:
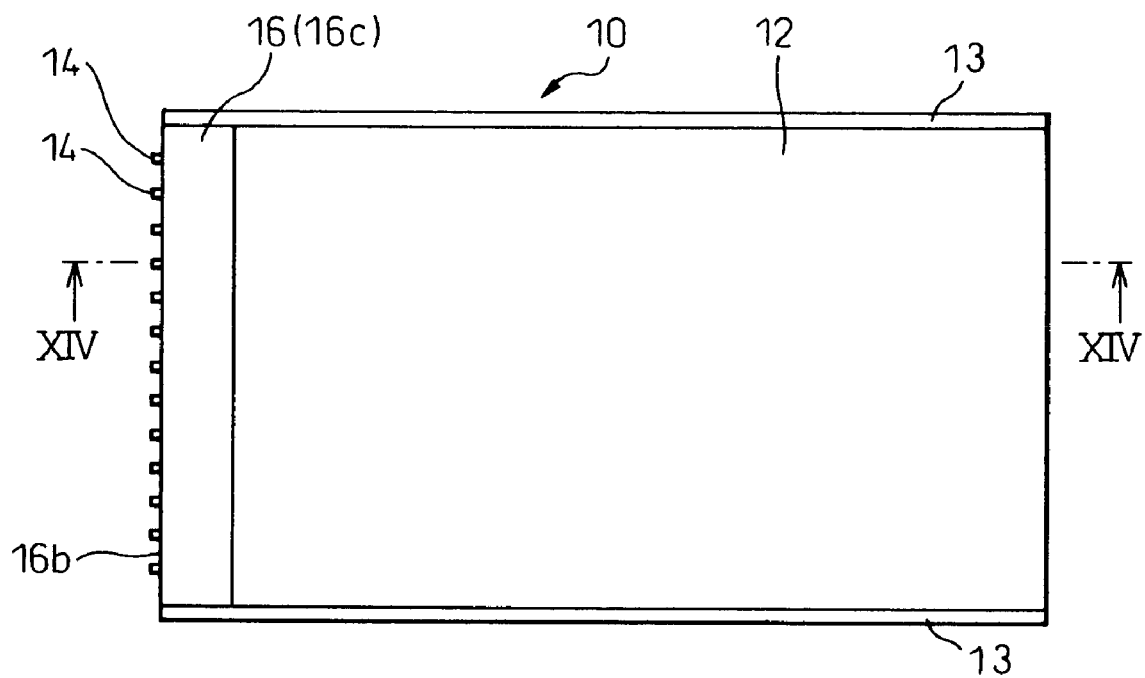
FIG. 13 shows a further example of a lighting unit.
Figure 14:
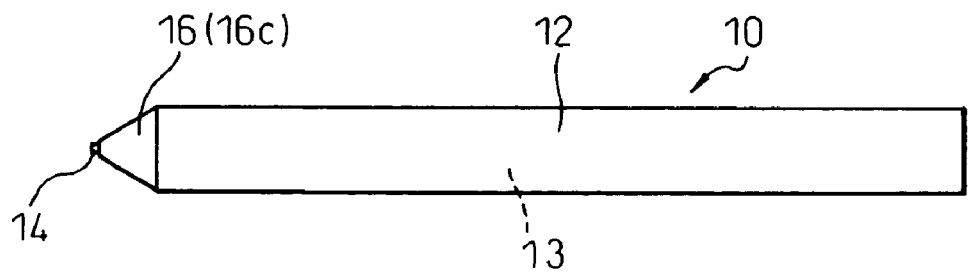
FIG. 14 is a sectional view of the lighting unit shown in FIG. 13 taken along the line XIV—XIV.

In FIGS. 13 and 14, a plurality of light sources 14 are attached to the top 16*b* of the truncated pyramid 16. In this case, in the vertical section of FIG. 14, the structure is similar to that of FIG. 9 or FIG. 10, but in the horizontal section, the structure is similar to that of FIG. 11 or FIG. 12. The LED light source array is an array of LED packages having LED chips, which are arranged on a printed circuit board as an array and adhered thereto. One LED package contains one LED chip that emits light in one of three primary colors, LED packages that emit light in red, light in green, and light in blue are orderly set in array. Alternatively, one LED package may contain three LED chips that emit light in three primary colors. This has the merit that when such LED packages are constructed as a plane light source, color deviation will be minimized.

In this case, regular reflection mirrors 13 are preferably attached to the side surfaces of the truncated pyramid 16 and the side surfaces of the light guide plate 12 that extend in the direction of travelling light (the sides above and below the sheet of FIG. 14). This can prevent light from getting out of the light guide plate through the side surfaces while not being converged internally.

Figure 15:
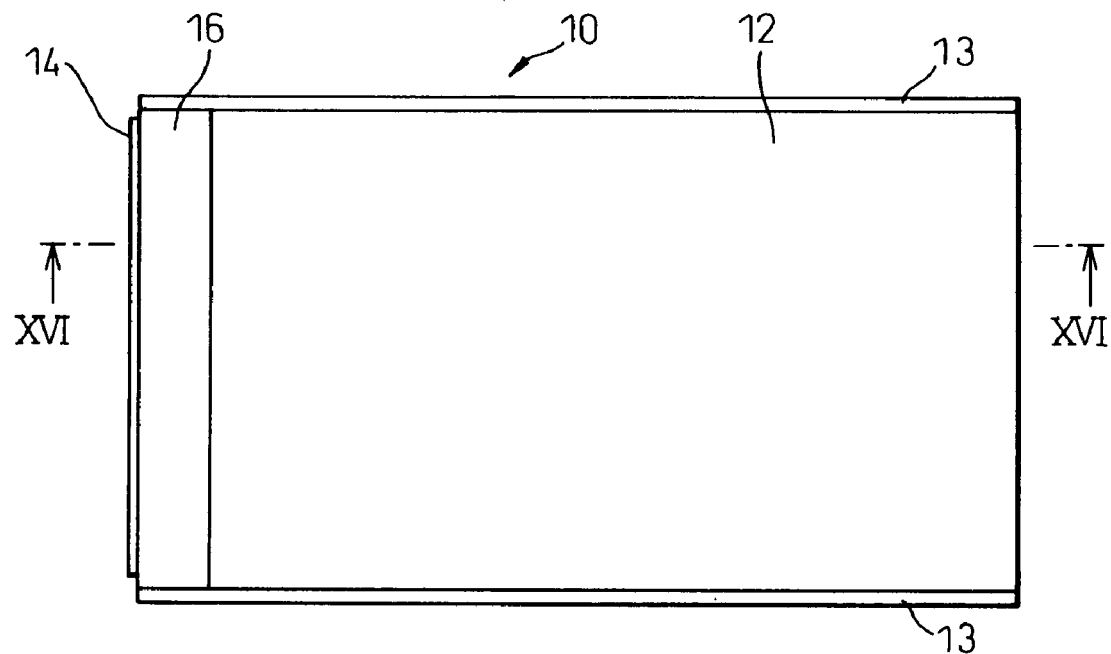
FIG. 15 shows a further example of a lighting unit.
Figure 16:
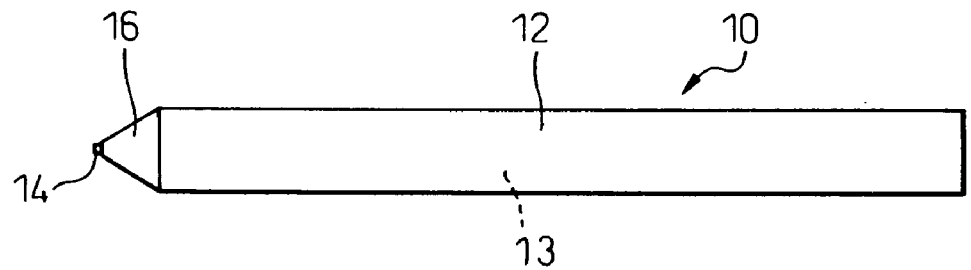
FIG. 16 is a sectional view of the lighting unit shown in FIG. 15 taken along the line XVI—XVI.

In FIGS. 15 and 16, the linear light source 14 realized with a white organic electroluminescent (EL) lamp or the like is mounted on the top 16*b* of the truncated pyramid 16. The linear EL light source 14 is realized with an EL lamp formed on a glass substrate. From the viewpoint of a coefficient of thermal expansion, the linear EL light source 14 may be realized with an EL lamp formed on an organic film or an organic sheet.

Figure 17:
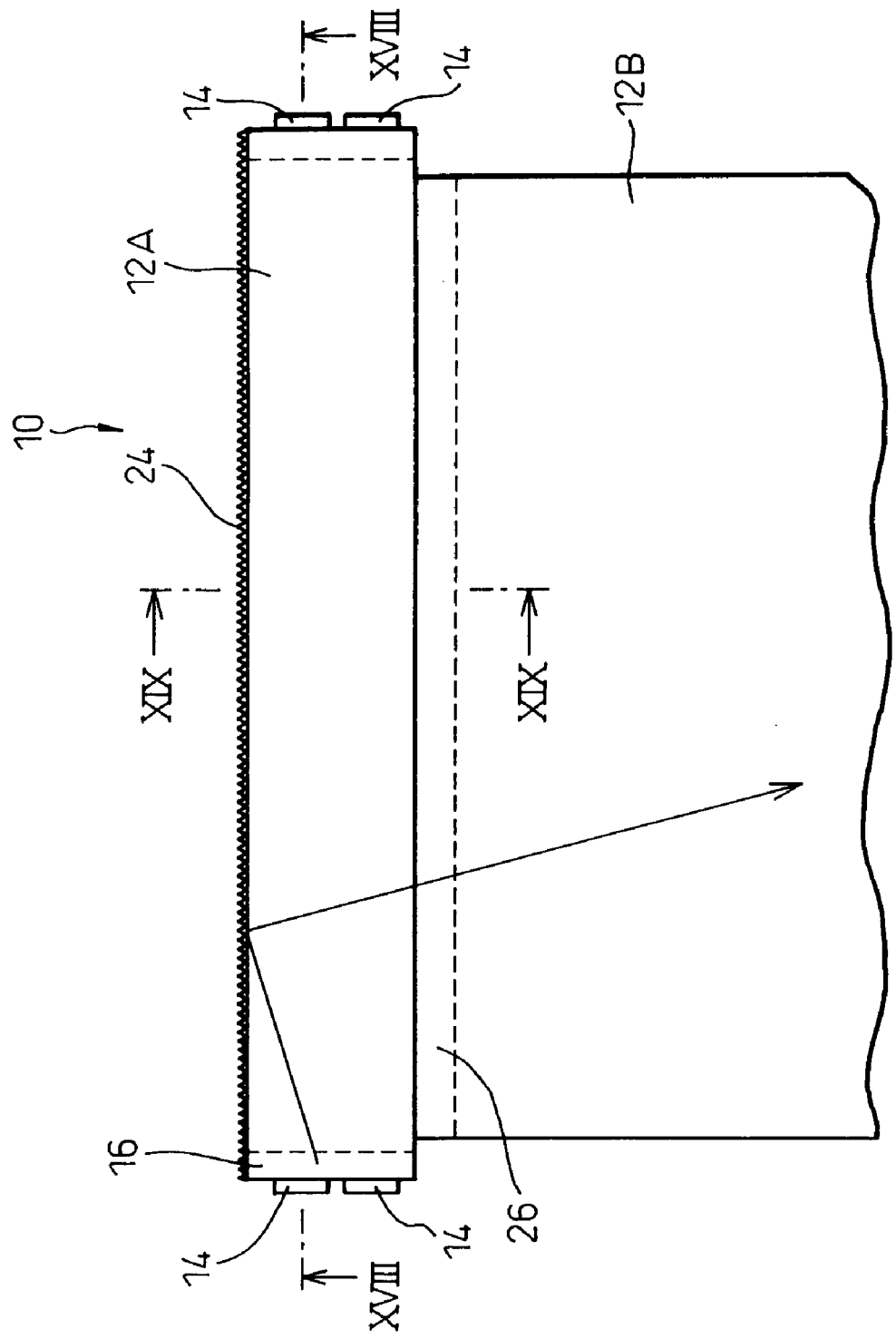
FIG. 17 is a view showing a further example of a lighting unit.
Figure 18:
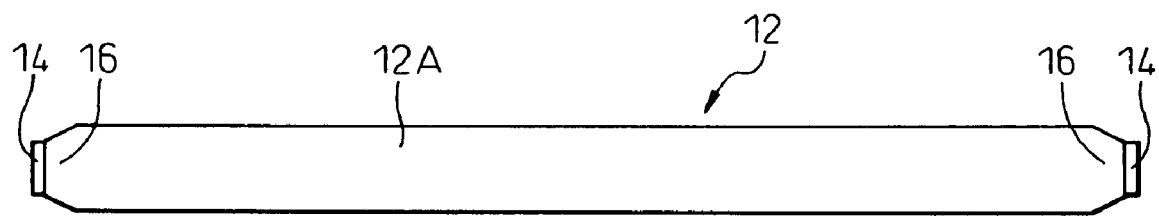
FIG. 18 is a sectional view of the lighting unit shown in FIG. 17 taken along the line XVIII—XVIII.
Figure 19:
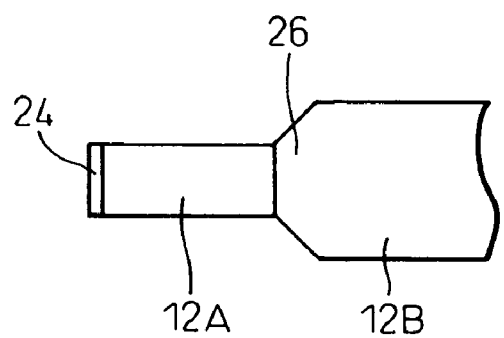
FIG. 19 is a sectional view of the lighting unit shown in FIG. 17 taken along the line XIX—XIX.

In FIGS. 17 to 19, a light guide plate comprises a first light guide plate 12A and a second light guide plate 12B. The light source 14 is attached to both sides of the first light guide plate 12A in the same manner as the foregoing examples. The first light guide plate 12A is placed on the side of the second light guide plate 12B. The first light guide plate 12A may be called a light guide pipe. The first light guide plate 12A has a sawtooth mirror 24 formed on the side thereof opposite to the side where the second light guide plate 12B is arranged. The second light guide plate 12B has a light converging means 26 formed on the side where the first light guide plate 12A is arranged.

Light emitted by the light sources 14 enters the first light guide plate 12A, whereby the first light guide plate 12A serves as a linear light source. Light within the first light guide plate 12A is reflected by the sawtooth mirror 24 and enters the second light guide plate 12B. The second light guide plate 12B then serves as a plane light source. The optical coupling portions of each of the light sources 14 and the first light guide plate 12A respectively are optically closely coupled to each other using an acrylic resin, but the optical coupling portions of the first light guide plate 12A and the second light guide plate 12B respectively are not optically closely coupled to each other but are merely contacted each other so that light guided within the first light guide plate 12A may be intercepted.

Figure 20:
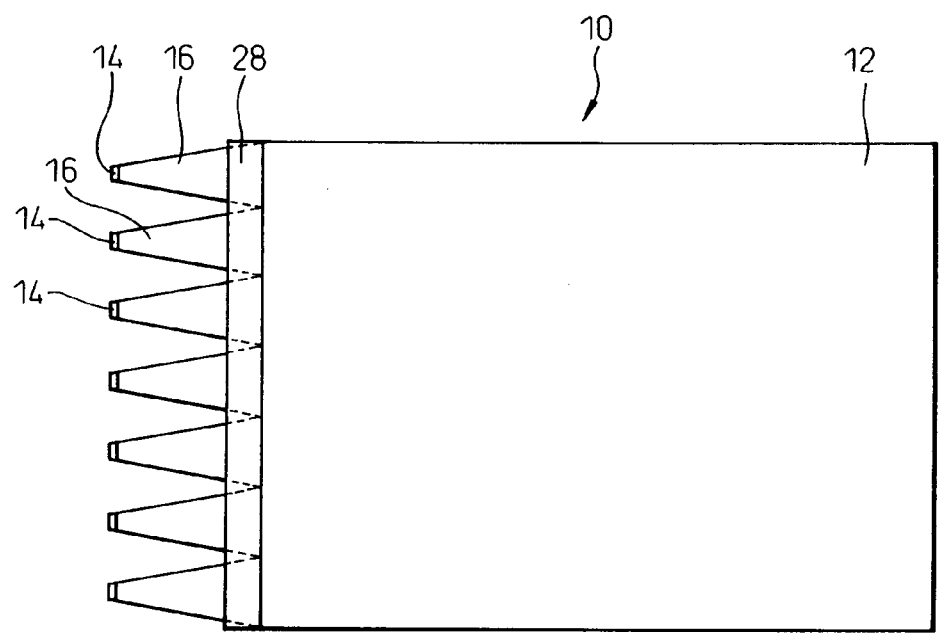
FIG. 20 is a view showing a further example of a lighting unit.
Figure 21:
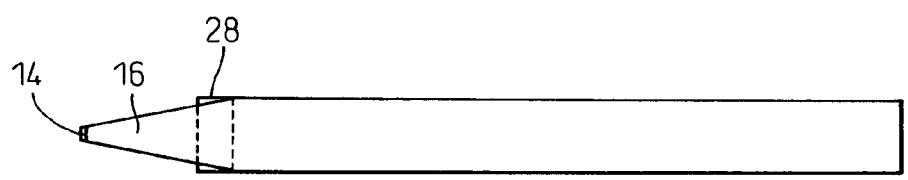
FIG. 21 is a sectional view passing through one of the pyramids of the lighting unit shown in FIG. 20.

In FIGS. 20 and 21, the truncated pyramid 16 is formed as an elongated wedge-shaped member. A plurality of truncated pyramids 16 are arranged on one side of the light guide plate 12. Light sources 14 formed with LEDs are mounted on the tops of the respective truncated pyramids 16. A light absorbing member 28 surrounds all the truncated pyramids 16 on or near the border between the truncated pyramids and the light guide plate 12 so that the light absorbing member 28 will cover the portions of the truncated pyramids 16 adjoining the light guide plate 12. This example is adapted to convert the divergent light rays from the light source 14 into parallel light rays.

Figure 22:
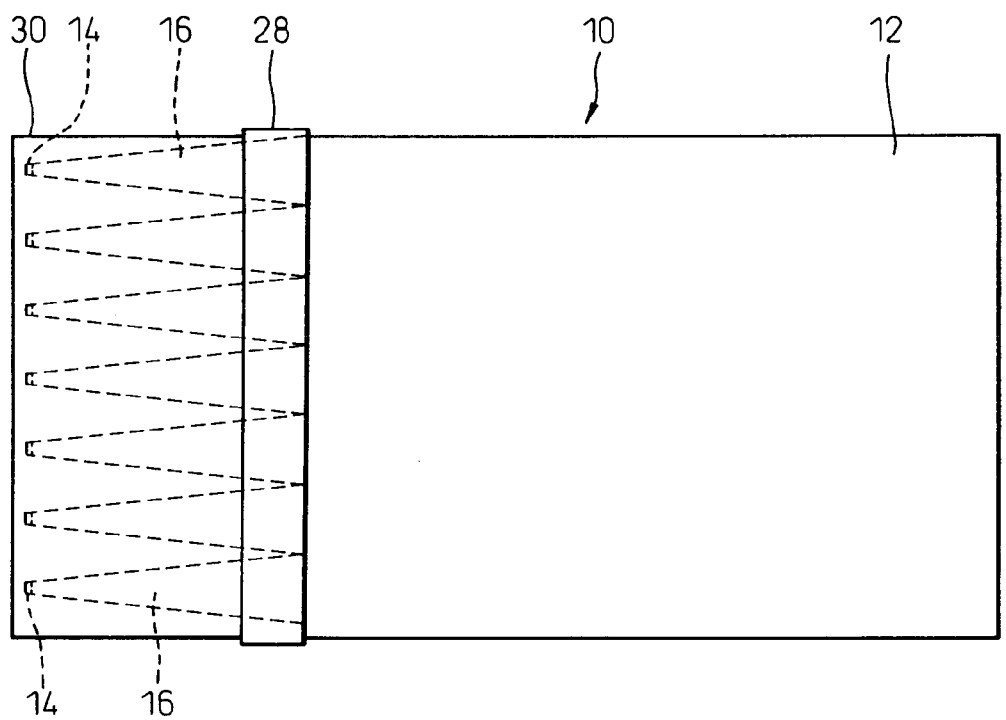
FIG. 22 is a view showing further example of a lighting unit.
Figure 23:
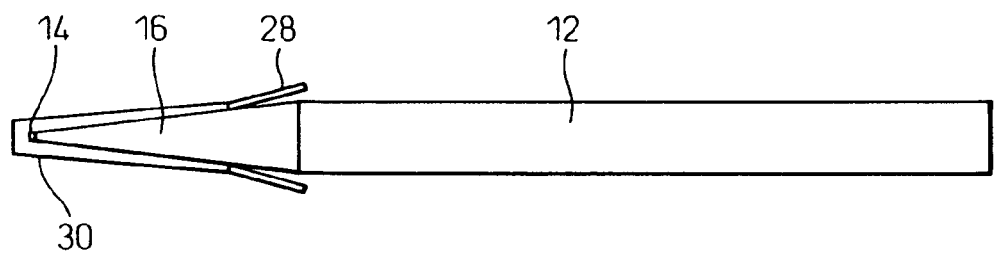
FIG. 23 is a sectional view passing through one of the pyramids of the lighting unit shown in FIG. 22.

In FIGS. 22 and 23, the truncated pyramid 16 is formed as an elongated wedge-shaped member. A plurality of truncated pyramids 16 are placed on one side of the light guide plate 12. Light sources 14 realized with LEDs are mounted on the tops of the respective truncated pyramids 16. An optical absorbing member 28 surrounds all the truncated pyramids 16 on or near the border between the truncated pyramids 16 and the light guide plate 12 so that the optical absorbing member 28 will cover the portions of the truncated pyramids 16 adjoining the light guide plate 12. Furthermore, a mirror or a scattering reflecting member 30 encloses all the truncated pyramids 16. This example is suitable for conversion of diverging light rays emitted by the light sources 14 into parallel light rays. The small light sources 14 such as LEDs are bonded to the tops of the respective truncated pyramids 16, but, the light sources 14 need not always be bonded to the tops of the respective truncated pyramids 16. As long as the light sources 14 are placed near the respective truncated pyramids (near the side surfaces thereof), no problem occurs.

Figure 24:
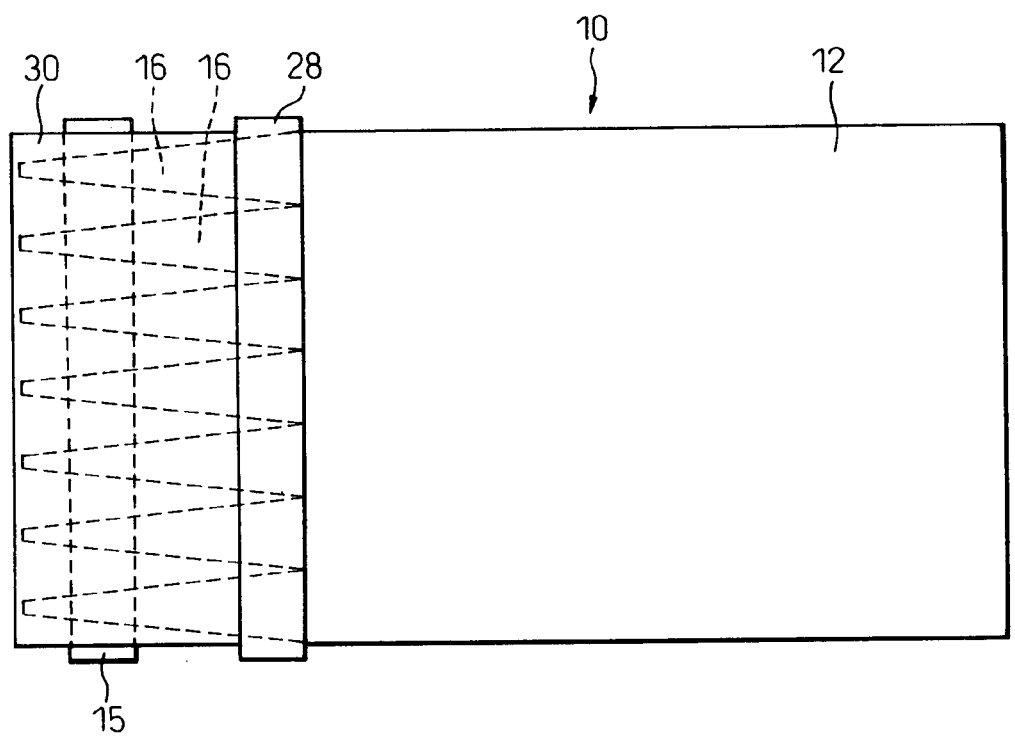
FIG. 24 is a view showing a further example of a lighting unit.
Figure 25:
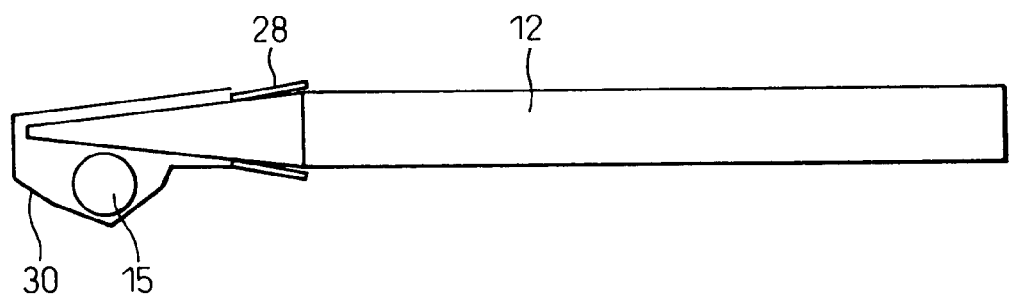
FIG. 25 is a sectional view passing through one of the pyramids of the lighting unit shown in FIG. 24.

FIGS. 24 to 27 show further examples of a lighting unit. In FIGS. 24 and 25, a lighting unit 10 comprises a light source 15, a light guide plate 12, a plurality of truncated pyramids 16 formed as elongated wedge-shaped members and attached to the light guide plate 12, an optical absorbing member 28 that surrounds all the truncated pyramids 16 on or near the border between the truncated pyramids 16 and the light guide plate 12 so that the optical absorbing member 28 will cover the portions of the truncated pyramids 16 adjoining the light guide plate 12, and a mirror or a scattering reflecting member 30 that encloses all the truncated pyramids 16. The light source 15 is realized with a cold cathode tube (fluorescent lamp) and placed by the truncated pyramids 16 to traverse all the truncated pyramids 16. Light emitted by the light source 15 enters the truncated pyramids 16 from the sides of the respective truncated pyramids 16, is repeatedly totally reflected within the truncated pyramids 16, and enters the light guide plate 12 at small angles with respect to the axis of the light guide plate 12. This example is suitable for introducing parallel light rays into the light guide plate 12.

Figure 26:
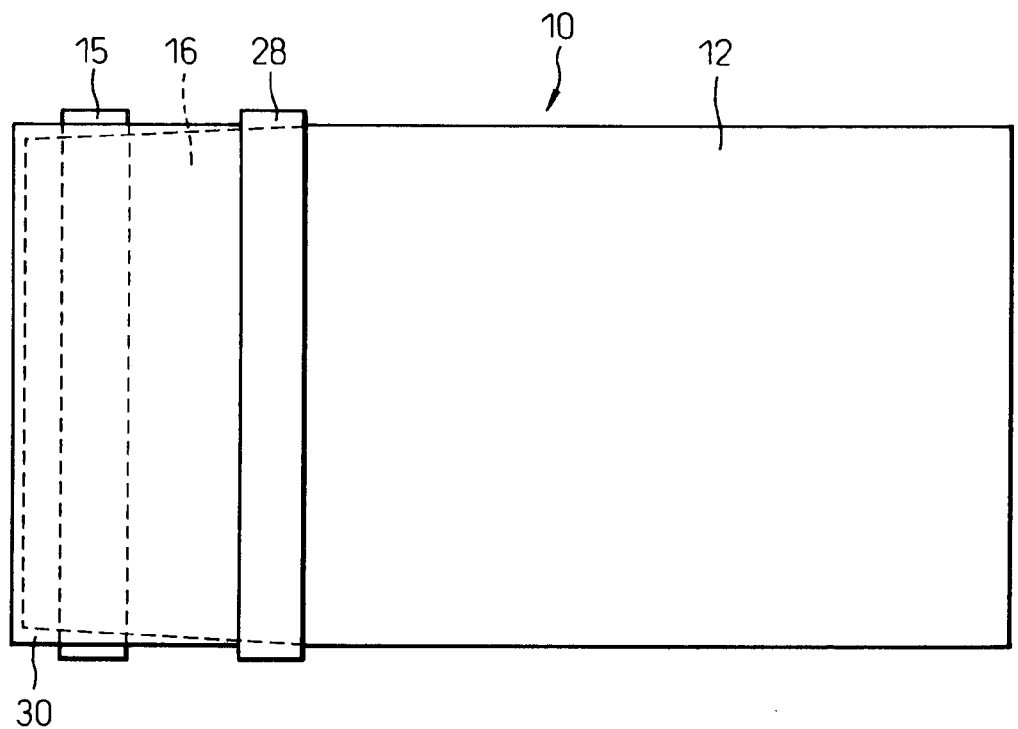
FIG. 26 is a view showing a further example of a lighting unit.
Figure 27:
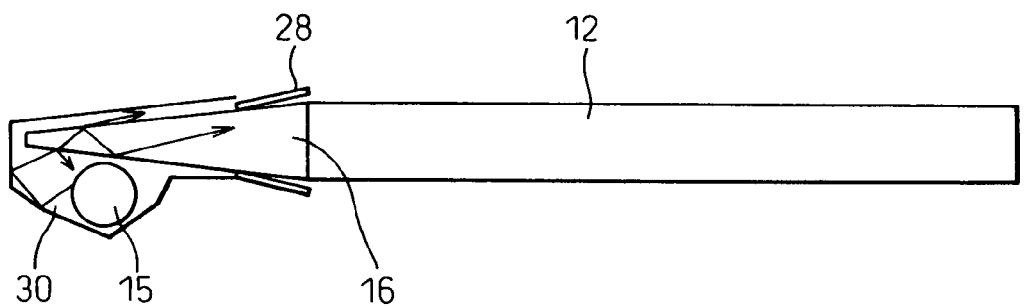
FIG. 27 is a sectional view passing through one of the pyramids of the lighting unit shown in FIG. 24.

In FIGS. 26 and 27, a lighting unit 10 comprises a light source 15, a light guide plate 12, a truncated pyramid 16 formed as an elongated wide wedge-shaped member and attached to the light guide plate 12, a light absorbing member 28 surrounding the truncated pyramid 16 on or near the border between the truncated pyramid 16 and light guide plate 12 so that the light absorbing member 28 will cover the portion of the truncated pyramid 16 adjoining the light guide plate 12, and a mirror or a scattering reflecting member 30 enclosing the truncated pyramid 16. The operation of this example is identical to that of the previous example.

In FIG. 24 to FIG. 27, the light source 15 may be not only a cold cathode tube but also any other rod-like light source, for example, an EL light source. Moreover, the light source 15 is not limited to the rod-like light source but may be a light source having any shape. In the examples, the light absorbing member 28 prevents stray light.

Figure 28:
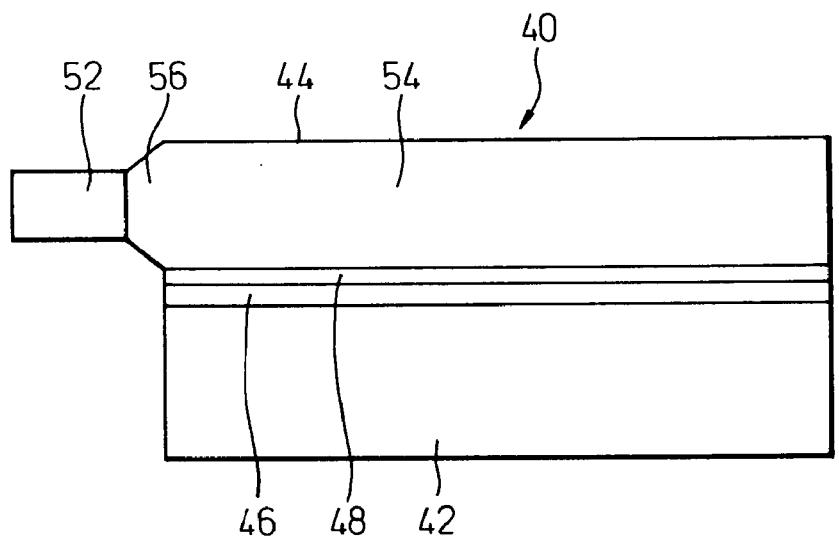
FIG. 28 is a schematic view showing a liquid crystal display device in accordance with a second embodiment of the present invention.
Figure 29:
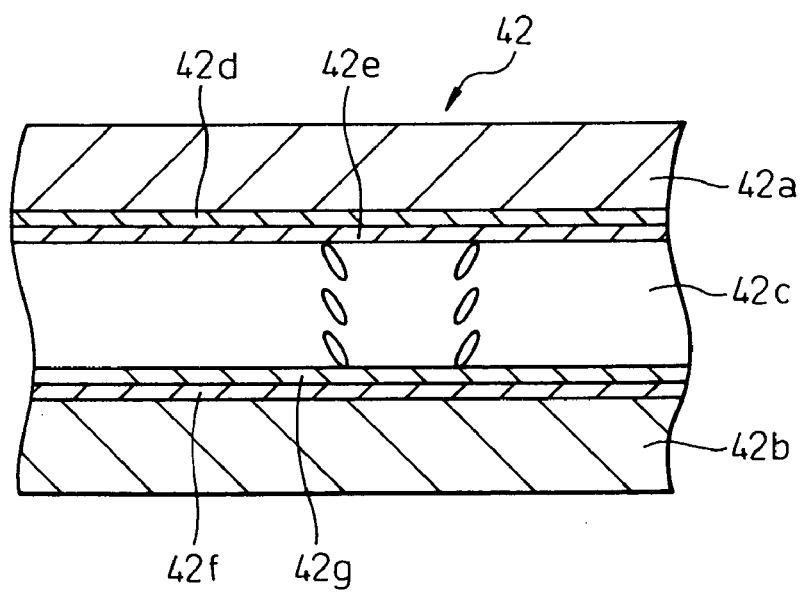
FIG. 29 is a sectional view showing the liquid crystal panel included in the liquid crystal display device shown in FIG. 28.

FIG. 28 is a schematic view showing a liquid crystal display device in accordance with a second embodiment of the present invention. FIG. 29 is a sectional view of the liquid crystal panel included in the liquid crystal display device shown in FIG. 28. The liquid crystal display device 40 comprises a liquid crystal panel 42, a lighting unit 44, a polarizer 46, and a low refractive index layer 48. Preferably, the liquid crystal panel 42 is of a reflective type and of a vertical alignment type (VA type).

In FIG. 29, the liquid crystal panel 42 has a liquid crystal 42c arranged between a pair of glass substrates 42a and 42b. One of the glass substrates 42a includes a common electrode 42d and a vertical alignment layer 42e, and the other glass substrate 42b includes pixel electrodes 42f and a vertical alignment layer 42g. Consequently, the liquid crystal molecules are aligned generally perpendicularly to the surfaces of the substrates when no voltage is applied, and the liquid crystal molecules are aligned generally parallel to the surfaces of the substrates when the voltage is applied. The pixel electrodes 42f are made of a material by which light is reflected. Preferably, one pixel is divided into a plurality of regions in which pretilt direction of liquid crystal molecules varies depending on the regions.

In FIG. 28, a (second) light guide plate 54 included in the lighting unit 44 is bonded to the polarizer 46 with the low refractive index layer 48. The polarizer 46 is bonded to the liquid crystal panel 42.

In this way, in the case where the light guide plate 54, the sheet polarizer 46, and the liquid crystal panel 42 are bonded to one another, a problem arises in that contrast is degraded because, of the light made incident to the light guide plate 54, light that is not totally reflected by the low refractive index layer 48 passes through the polarizer 46, as it is, and is then irradiated onto the liquid crystal panel 42. The inventors have recognized this problem as a serious problem when a high contrast vertical alignment type liquid crystal panel 42 is used in which the polarizer 46 is bonded to the light guide plate 54 and further the liquid crystal panel 42 is bonded to the polarizer 46.

As the low refractive index layer 48 whose refractive index is higher than the refractive index of air is formed on one side of the light guide plate 54, and the liquid crystal panel 42 is bonded to the light guide plate via the polarizer a large amount of light having entered the light guide plate 54 (light that is not totally reflected by the low refractive index layer 48) is made incident to the liquid crystal panel 42, resulting in a problem in that display quality deteriorates because contrast is degraded and becomes inhomogeneous and the brightness also becomes inhomogeneous. This problem first came to light when the light guide plate 54, the polarizer 46, and the liquid crystal panel 42 were bonded to one another.

Moreover, as the light guide plate 54 and the liquid crystal panel 42 that are plates are bonded to each other, the light guide plate 54 and liquid crystal panel 42 tend to peel off. In particular, if dust is caught in the adhesive, the light guide plate 54 and the liquid crystal panel 42 tend to locally peel off from each other in a special environment. This poses a problem in that the display quality deteriorates. The light guide plate 54 and the liquid crystal panel 42 are brought into contact with each other with the low refractive index layer 48 whose refractive index is lower than the refractive index of the light guide plate 54. Transmission of light through the interface is therefore not completely zero. The transmitted light causes a degradation of contrast. When the polarizer 46 is bonded to the light guide plate 54 and the liquid crystal panel 42 is bonded to the polarizer 46, the polarizer 46 absorbs a large amount of light. This degrades brightness. The embodiment to be described below attempts to solve the foregoing problems.

Figure 30:
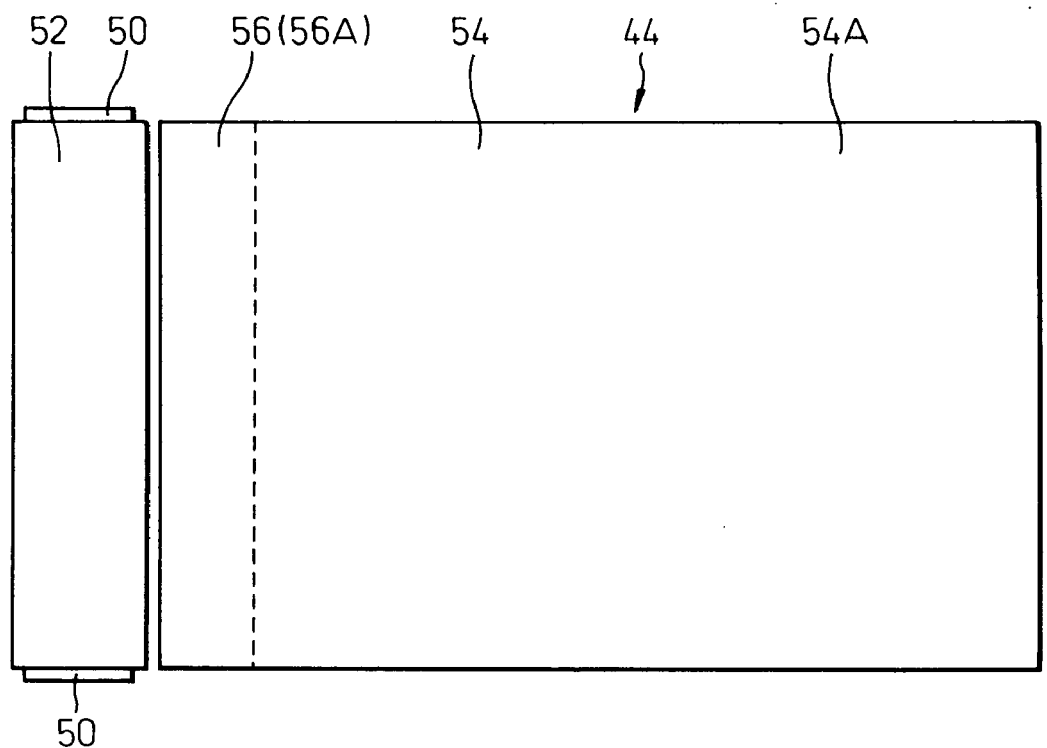
FIG. 30 is a plan view showing the lighting unit included in the liquid crystal display device shown in FIG. 28.
Figure 31:
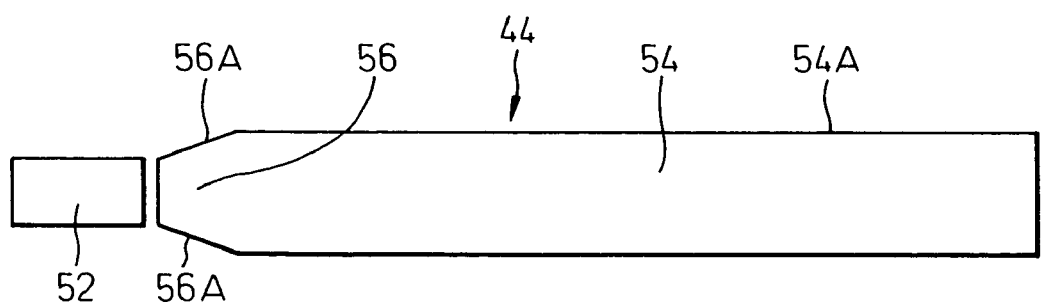
FIG. 31 is a sectional view showing the lighting unit shown in FIG. 30.

FIG. 30 is a plan view of the lighting unit 44 shown in FIG. 28, and FIG. 31 is a sectional view of the lighting unit 44 shown in FIG. 30. The lighting unit 44 includes light sources 50, a first light guide plate 52 that receives light emitted by the light sources 50, a second light guide plate 54 that receives light passing through the first light guide plate 52, and a light converging means 56 interposed between the first light guide plate 52 and the second light guide plate 54. The thickness of the second light guide plate 54 is greater than the thickness of the first light guide plate 52.

The lighting unit 44 is analogous to the lighting unit 10 shown in FIGS. 17 to 19. Specifically, the light sources 50 are realized with LEDS and are attached to the respective sides of the first light guide plate 52. The first light guide plate 52 is placed on one side of the second light guide plate 54. The first light guide plate 52 has a sawtooth mirror (see FIG. 17) formed on the side thereof opposite to the side where the second light guide plate 54 is arranged. The second light guide plate 54 has the light converging means 56 formed on the side where the first light guide plate 52 is arranged. In this example, the light converging means 56 is formed as an integral part of the second light guide plate 54 tapered towards the first light guide plate 52. The second light guide plate 54 has prisms (not shown) formed on the surface 54A thereof as a light discharging mechanism that directs light, which is propagated through the second light guide plate 54, toward the liquid crystal panel 42. The second light guide plate 54 includes the prisms even in an example to be described below.

The light sources 50 are formed with LEDs each having a thickness of 0.6 mm. The thickness of the first light guide plate 52 is 0.5 mm, and the thickness of the second light guide plate 54 is 1.0 mm. The light converging means 56 is the portion of the second light guide plate 54 having a slope 56A that extends between the first and second light guide plates 52 and 54. However, the light converging means 56 and the first light guide plate 52 are not optically coupled to each other but placed mutually closely to each other so that they may come into contact with each other.

The first light guide plate 52 and the second light guide plate 54 are made of Arton (whose refractive index is 1.51) manufactured by JSR Corp. The light converging means 56 is also made of Arton. The polarizer 46 shown in FIG. 28 is bonded to the second light guide plate 54 with an adhesive (whose refractive index ranges from 1.45 to 1.47), to which nano-level bubbles are added in order to attain a low refractive index, between them. The removable adhesive serves as the low refractive index layer 48 shown in FIG. 28. The polarizer 46 has a polarizing layer, layers of triacetyl-cellulose (TAC) coated on both sides of the polarizing layer and a plurality of layers formed below the TAC layer. The vertical alignment type liquid crystal panel 42 is bonded to the polarizer 46.

The light converging means 56 is included in order to improve the degree of parallelism of light entering the second light guide plate 54 from the first light guide plate 52.

The adhesive serving as the low refractive index layer 48 is made of an acrylic material which has a refractive index of 1.48 by nature. Invisible nano-level bubbles are contained in the adhesive in order to decrease the refractive index, irregularities (projections and cavities) whose heights range from several micrometers to ten micrometers are formed on the surface of the polarizer, the adhesive is applied to the polarizer, and the polarizer is bonded to a light guide plate. Thus, the polarizer is stuck to the light guide plate with air caught uniformly over the surface of the polarizer. In this stage, the bubbles are discernible, and therefore, the assembly of the polarizer and the light guide plate is autoclaved to be finished. It has been confirmed that the contained bubbles makes an amount of illumination light 1.2 to 1.8 times greater.

Figure 32:
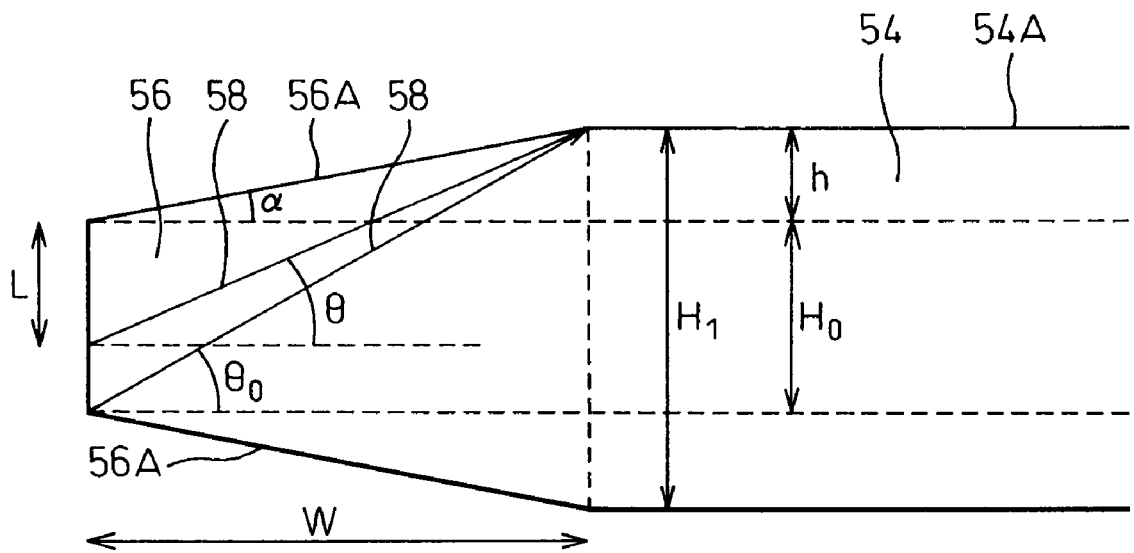
FIG. 32 is an explanatory view for explaining the operation of the light converging means included in the lighting unit shown in FIGS. 30 and 31.

FIG. 32 is a view for explaining the operation of the light converging means 56. Reference numeral 58 designates light entering the second light guide plate 54 from the first light guide plate 52. An angle at which the slope 56A meets a line parallel to the axis of the second light guide plate 54 is $\alpha$. An angle at which the light 58 meets a line parallel to the axis of the second light guide plate 54 is $\theta$. An angle at which the light 58 meets the line parallel to the axis of the second light guide plate when the light travels from the lowermost point of the entrance of the light converging means 56 (adjoining the first light guide plate 52) to the uppermost point of the exit thereof (adjoining the second light guide plate 54) is $\theta 0$. A total reflection angle at which light is totally reflected within the second light guide plate 54 is $\theta c$.

The character W denotes the length of the light converging means 56, L denotes the incident position of the light 58, and H0 denotes the thickness of the first light guide plate 52, and H1 denotes the thickness of the second light guide plate 54. The character h equals (H1−H0)/2. In this case, the relationships of $H1=H0+2h$, $h=W\tan\alpha$, and $h+H0=W\tan\theta 0$ are established.

Figure 33:
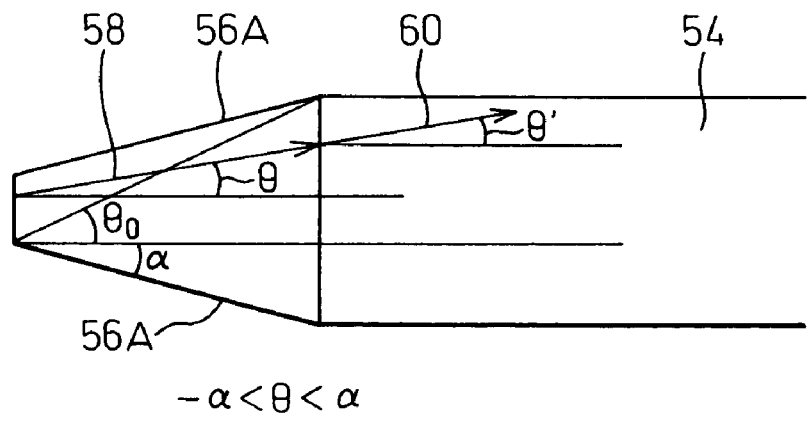
FIG. 33 is a view for explaining the operation of the light converging means when the angle of light θ satisfies the condition of θ<α.

FIG. 33 is a view for explaining the operation of the light converging means 56 when the angle $\theta$ of the light 58 satisfies $\theta<\alpha$ (when negative angles are taken into account, $-\alpha<\theta<\alpha$). In this case, the angle of the light 58 is small and exhibits a high degree of parallelism. The light 58 does not hit the slope 56A and enters directly the second light guide plate 54. Light which enters the second light guide plate 54 is designated by the reference numeral 60.

Figure 34:
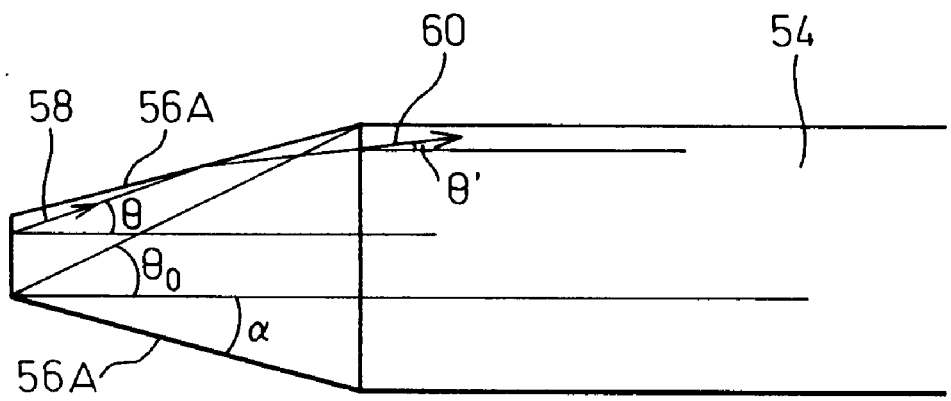
FIG. 34 is a view for explaining the operation of the light converging means when the angle of light θ satisfies the condition of α<θ<θo.

FIG. 34 is a view for explaining the operation of the light converging means 56 when the angle θ of the light 58 satisfies α<θ<θo (and −θo<θ<α). In this case, depending on the incident position L of the light 58, there is a possibility in which the light 58 may not hit the slope 56A and directly enters the second light guide plate 54, and there is a possibility in which the light 58 may hit the slope 56A, be totally reflected, and then enter the second light guide plate 54. Light which enters the second light guide plate 54 in the latter case is designated by the reference numeral 60. When the light 58 and 60 is shifted downwards in parallel, light in the former case can be obtained.

Figure 35:
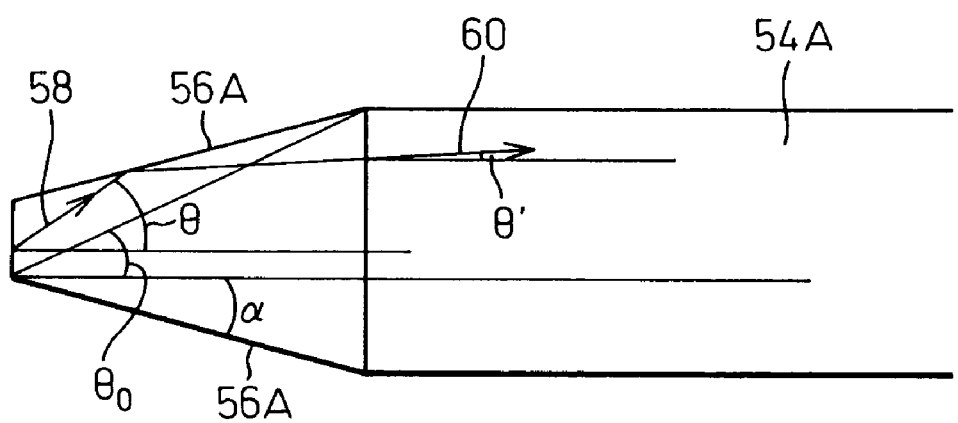
FIG. 35 is a view for explaining the operation of the converging means when the angle of light θ satisfies the condition of θo<θ.

FIG. 35 is a view for explaining the operation of the light converging means 56 when the angle θ of the light 58 satisfies θo<θ (or θ<−θo). In this case, all the light 58 hits the slope 56A, to be totally reflected by the slope 56A, and then enters the second light guide plate 54. Light which enters the second light guide plate 54 is designated by the reference numeral 60.

Figure 36:
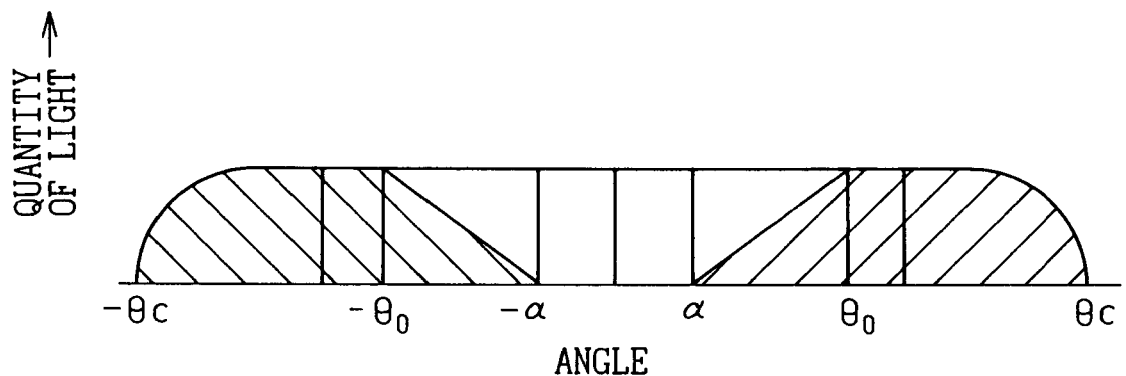
FIG. 36 is a view showing the angular distribution of light entering the light converging means from the first light guide plate.
Figure 37:
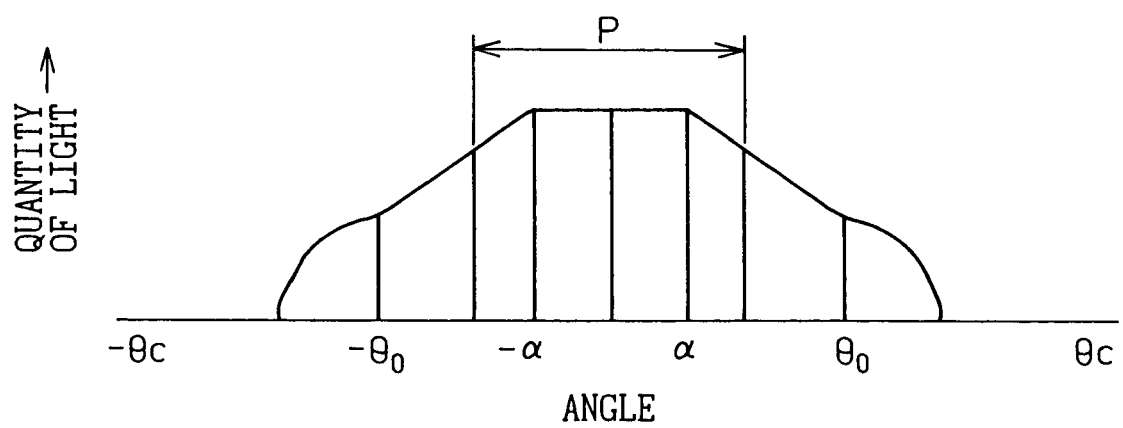
FIG. 37 is a view showing the angular distribution of light regulated by the light converging means.

FIG. 36 shows an angular distribution of light traveling from the first light guide plate 52 to the light converging means 56. FIG. 37 shows an angular distribution of light adjusted by the light converging means 56. When the light 58 is totally reflected by the slope 56A, the angle θ of the light 58 is compensated for so that the light approaches a line parallel to the axis of the second light guide plate 54 by ±2α. A hatched part in FIG. 36 indicates a region permitting the light 58 to be reflected by the slope 56A. Consequently, the degree of parallelism of the light traveling from the first light guide plate 52 to the second light guide plate 54 improves as indicated in FIG. 37 (the quantity of light traveling at a small angle increases). Incidentally, P denotes a preferable range of angles.

Now, the length of the light converging means 56 and the angle of the slope will be discussed. Samples of the light converging means 56 are produced with the parameter of the length set to range from 0.5 mm to 7 mm. The angle α of the slope 56A of the light converging means 56 is determined, when the thickness of the first light guide plate 52, the thickness of the second light guide plate 54, and the length of the converging means 56 are determined.

Figure 38:
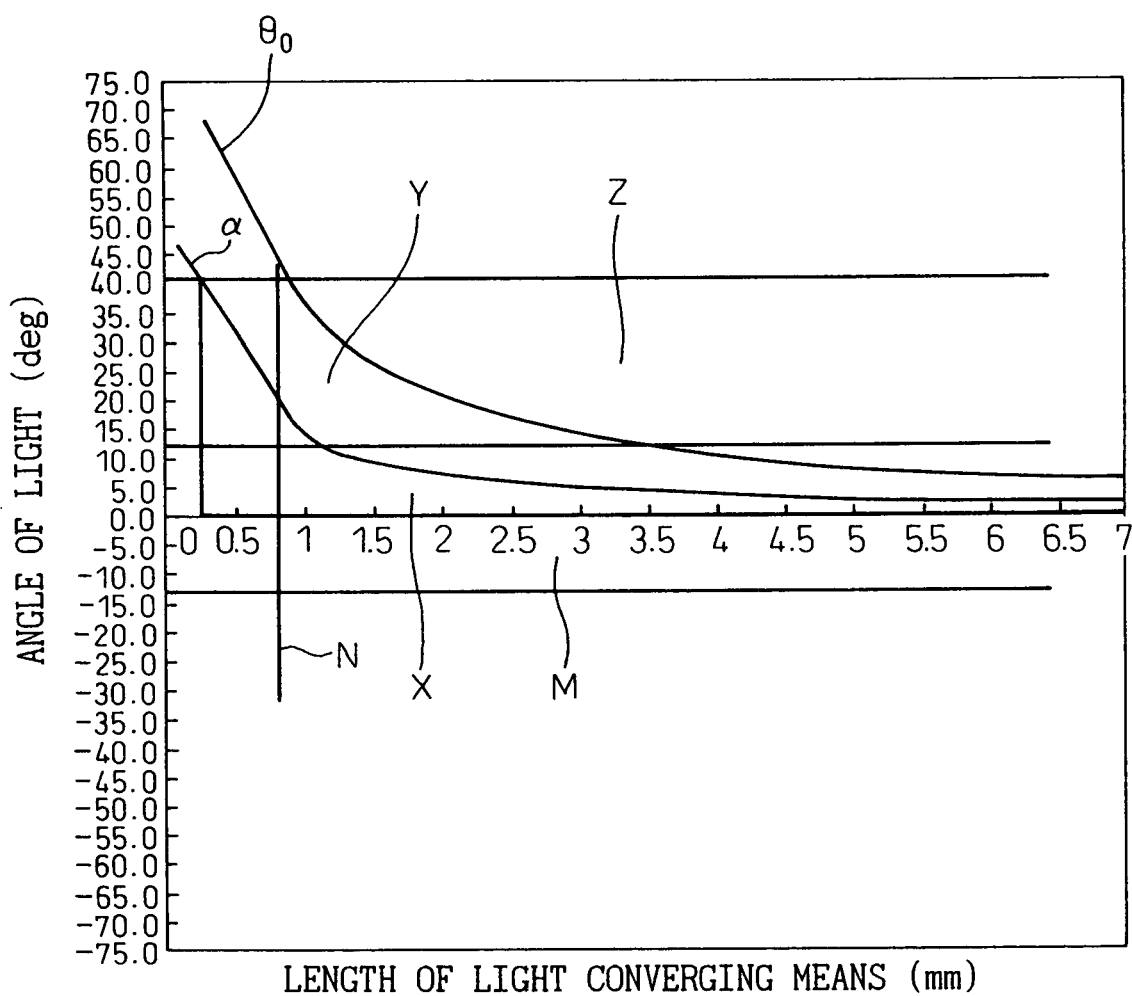
FIG. 38 is a view showing the angular distribution of light entering from the first light guide plate to the light converging means.

FIG. 38 shows an angular distribution of light traveling from the first light guide plate 52 to the light converging means 56. The distribution is shown only on the positive angle side. The curve α is drawn by plotting the values of the angle α of the slope 56A of the light converging means 56. The curve θ0 is drawn by plotting the values of the angle θ0 indicated in FIG. 32. The region x existing below the curve α is a region in which light travels to the second light guide plate 54 without being reflected by the slope 56A, as shown in FIG. 33. The region Y between the curve α and the curve θ0 is a region in which light is partly reflected by the slope 56A, as shown in FIG. 34. The region above the curve θ0 is a region in which light is totally reflected by the slope 56A, as shown in FIG. 35.

Figure 39:
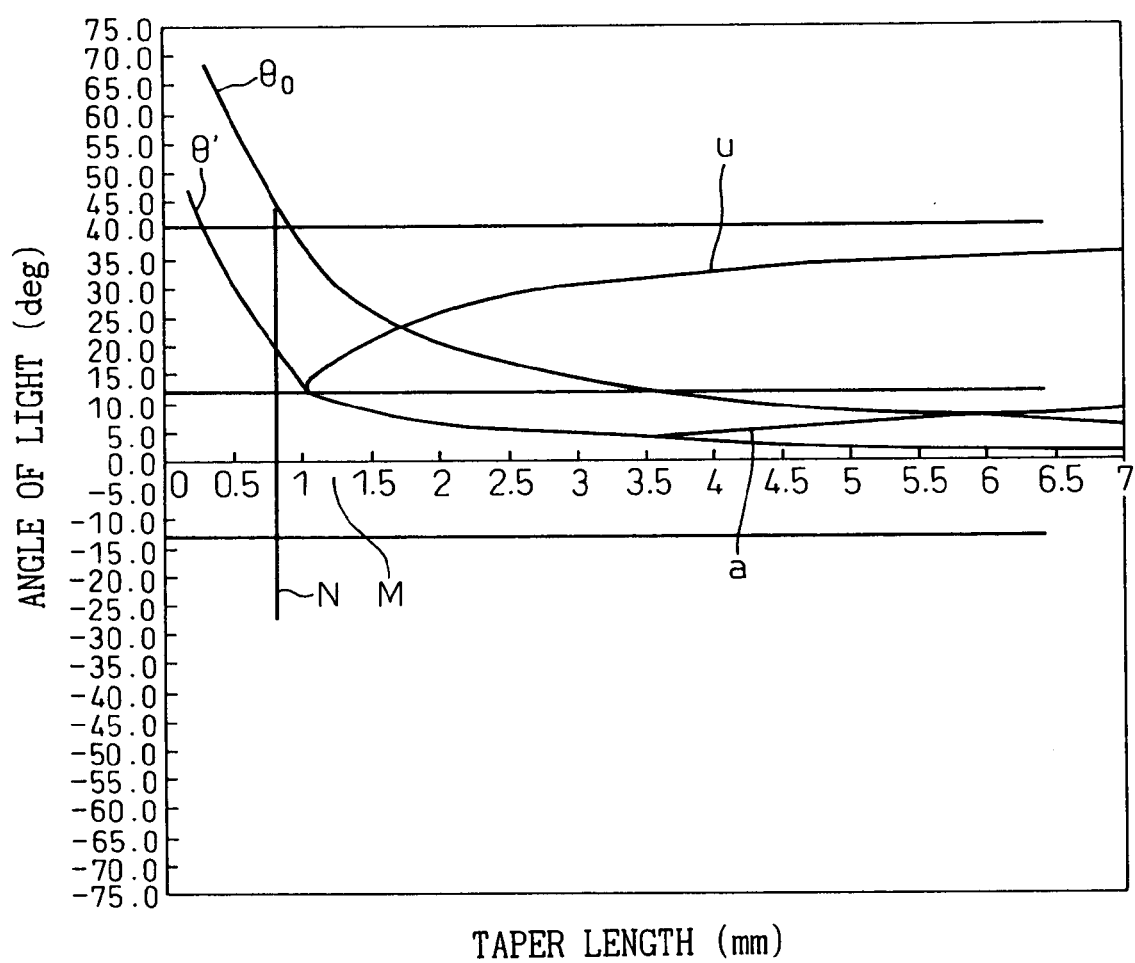
FIG. 39 is a view showing the angular distribution of light rays that all have angles causing the light rays to reflect from the slope (region z in FIG. 38)

FIG. 39 shows an angular distribution of the light 58 that has an angle permitting total reflection from the slope 56A and that has passed through the light converging means 56. In this case, the angular distribution of the light 60 exists in the region between the curve U and the curve θ'. The curve θ' corresponds to a curve obtained by shifting the curve θ0 shown in FIG. 38 downwards. Comparing this region with the region Z shown in FIG. 38, the angular distribution of the light 60 is converted into the angular distribution of the light having smaller angles, and the degree of parallelism of the light is improved.

Region M is between the angle of 13° and the angle of −13° and shows the angular range in which, when light travels in the second light guide plate 54, light is totally reflected by the interface between the second light guide plate 54 and the low refractive index layer 48. When the light 60 is totally reflected by the interface between the second light guide plate 54 and the low refractive index layer 48, the light is sufficiently propagated all over the second light guide plate 54. This feature is preferable for the lighting unit. In the region between the angle of 13° and the curve θ', and in the portion on the left side of the line a, light is reflected by the slope 56A and falls within the region M. In the portion on the right side of the line a, light is reflected by the slope 56A and falls within the region M, but even if the light is not reflected by the slope 56A, the light falls within the region M from the beginning.

Figure 40:
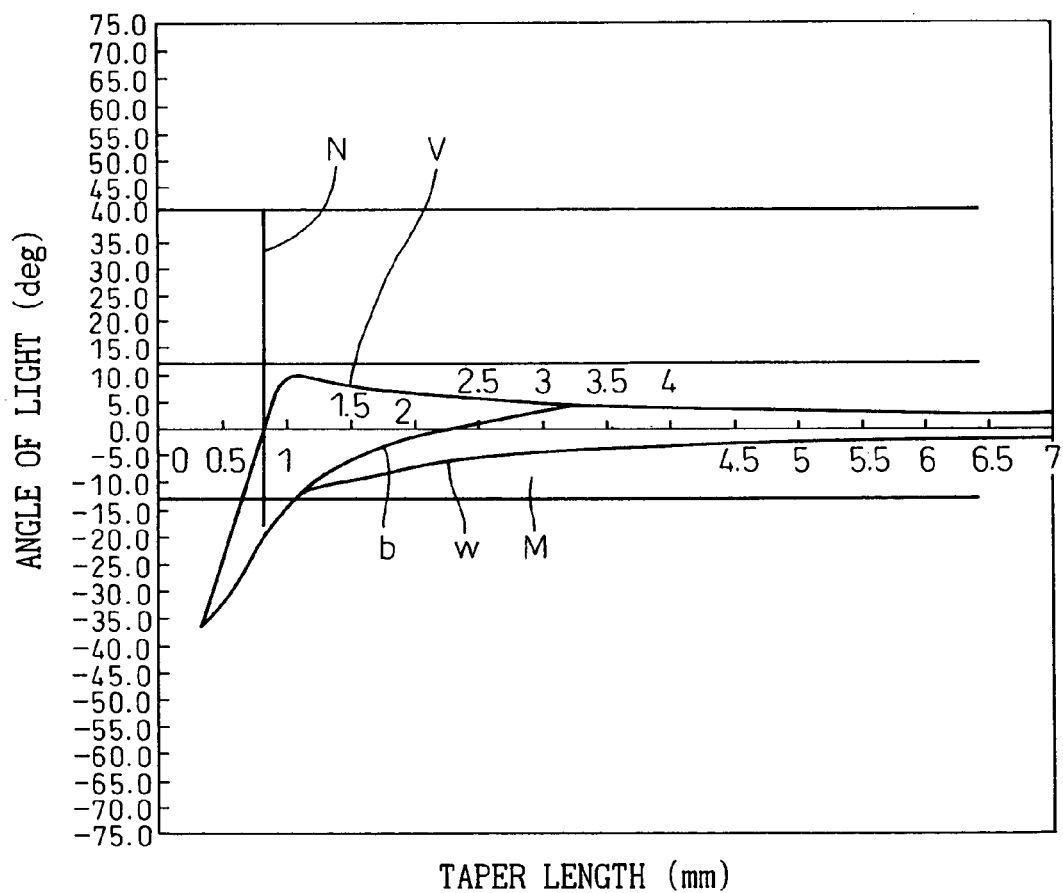
FIG. 40 is a view showing the angular distribution of light rays part of which has angles causing the part of the light rays to reflect from the slope (region Y in FIG. 38) and which have passed through the light converging means.

FIG. 40 shows an angular distribution of light that has an angle permitting part of the light 58 to be reflected by the slope 56A (the region Y in FIG. 38) and that has passed through the light converging means 56. In this case, the angular distribution of the light 60 is between the curve V and the curve W. Comparing this region with the region Y in FIG. 38, the angular distribution of the light 60 is converted to the angular distribution of the light having smaller angles, and the degree of parallelism of the light is improved. Light which falls within the portion on the left side of the line b is reflected by the slope 56A and falls within the region M. Light which falls within the portion on the right side of the line b is reflected by the slope 56A and falls within the region M, but the light falls within the region M from the beginning, even if it is not reflected by the slope 56A.

In FIGS. 38 to 40, the line N passing through the length of the light converging means 56 of 0.8 mm is shown. In the range of the length of the light converging means 56 between 0.8 mm (the angle α of the slope is approximately 18°) to 3.5 mm (the angle α of the slope is approximately 4.1°), the quantity of light that is propagated by the total reflection increases, but if the length of the taper further increases, the effect of light convergence hardly changes (in particular, FIG. 40). Moreover, within the light that is propagated by total reflection, the quantity of light nearly parallel to the axis of the second light guide plate (ranging between +5° to −5°) increases. Thus, the light outputting prisms of the second light guide plate 54 are arranged at an angle approximate to 45°, so the amount of light to be irradiated perpendicularly to the liquid crystal panel 42 increases.

Consequently, assuming that a total reflection angle at which light is reflected by the second light guide plate 54 is θc and the angle of the slope 56A is α, α<1.5 θc should be satisfied. The relationship of α<1.5 θc is established when the total reflection angle θc is set to 13° and the angle α of the slope 57A is set to approximately 18°. Consequently, the brightness level becomes 1.5 times to 2.0 times higher and the contract becomes 2 times to three times higher. In this example, the thickness of the LED is set to 0.6 mm and the thickness of the first light guide plate is set to 0.5 mm. Effective radiation of the LED is concentrated on a portion (surface) thereof near the center thereof whose thickness is 0.5 mm or less and loss stemming from optical coupling is therefore limited.

Figure 41:
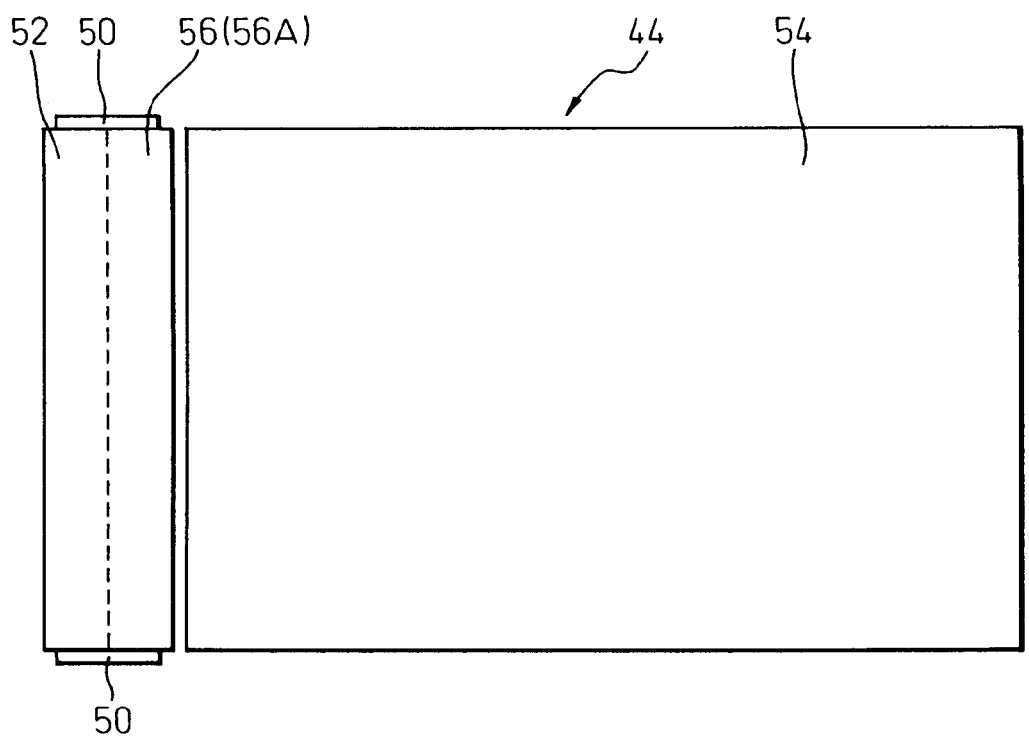
FIG. 41 is a view showing further example of a lighting unit.
Figure 42:
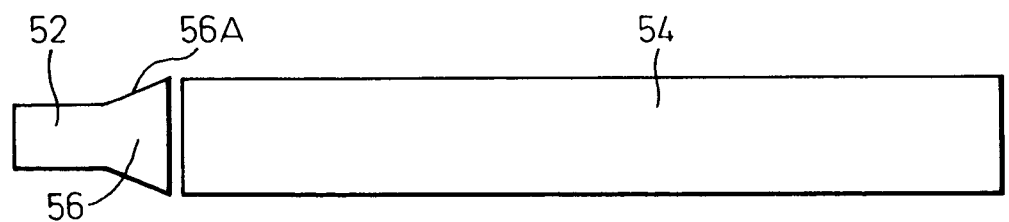
FIG. 42 is a sectional view showing the lighting unit shown in FIG. 41.

FIG. 41 shows a further example of a lighting unit. FIG. 42 is a sectional view of the lighting unit shown in FIG. 41. In this example, the light converging means 56 is an integral part of the first light guide plate 52 that diverges towards the second light guide plate 54. The light converging means 56 includes the slope 56A.

Figure 43:
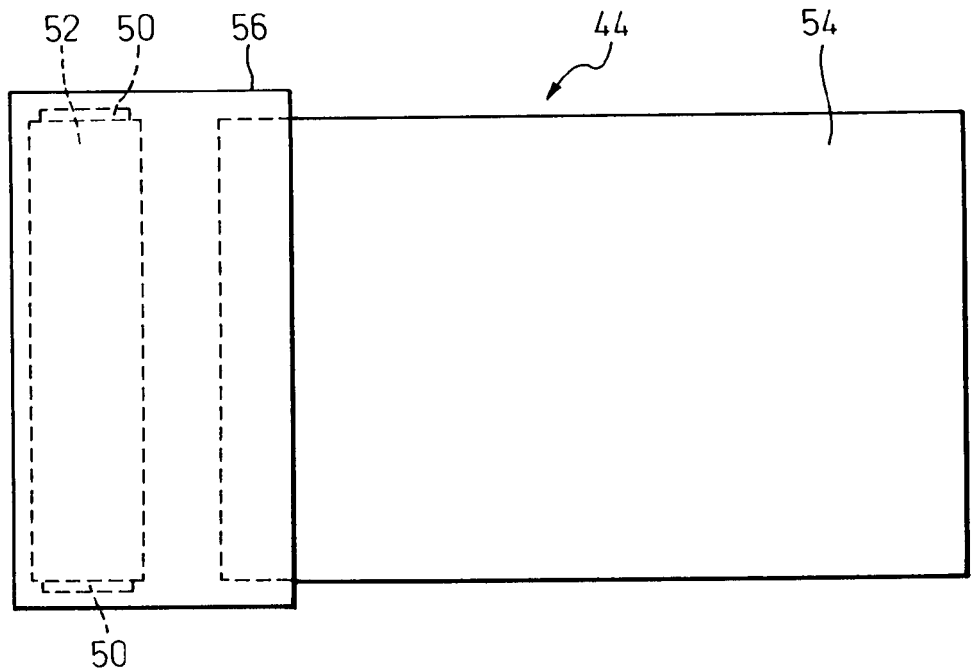
FIG. 43 is a view showing a further example of a lighting unit.
Figure 44:
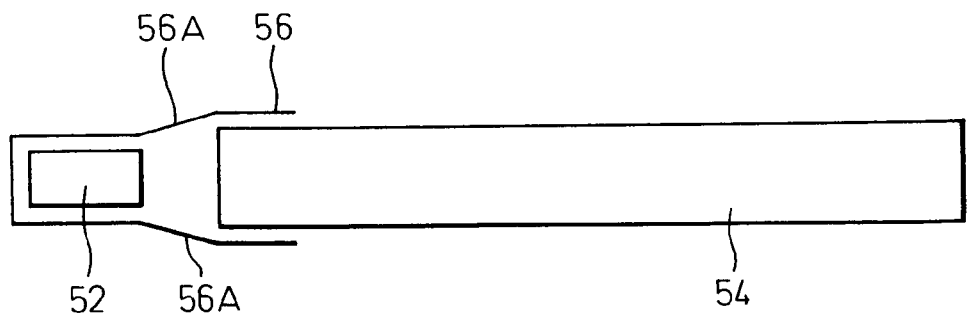
FIG. 44 is a sectional view showing the lighting unit shown in FIG. 43.

FIG. 43 shows a further example of a lighting unit. FIG. 44 is a sectional view of the lighting unit shown in FIG. 43. In this example, the light converging means 56 comprises a reflector having slopes 56A that are inclined or tapered from a point on or near a first light guide plate 52 to a point on or near the second light guide plate 54. The reflector is positioned in order to improve the degree of parallelism of light coming from the first light guide plate 52 and entering the second light guide plate 54. The light converging means 56 is not superior in the light converging efficiency but is advantageous in terms of ease of manufacturing owing to the simple structure.

Figure 45:
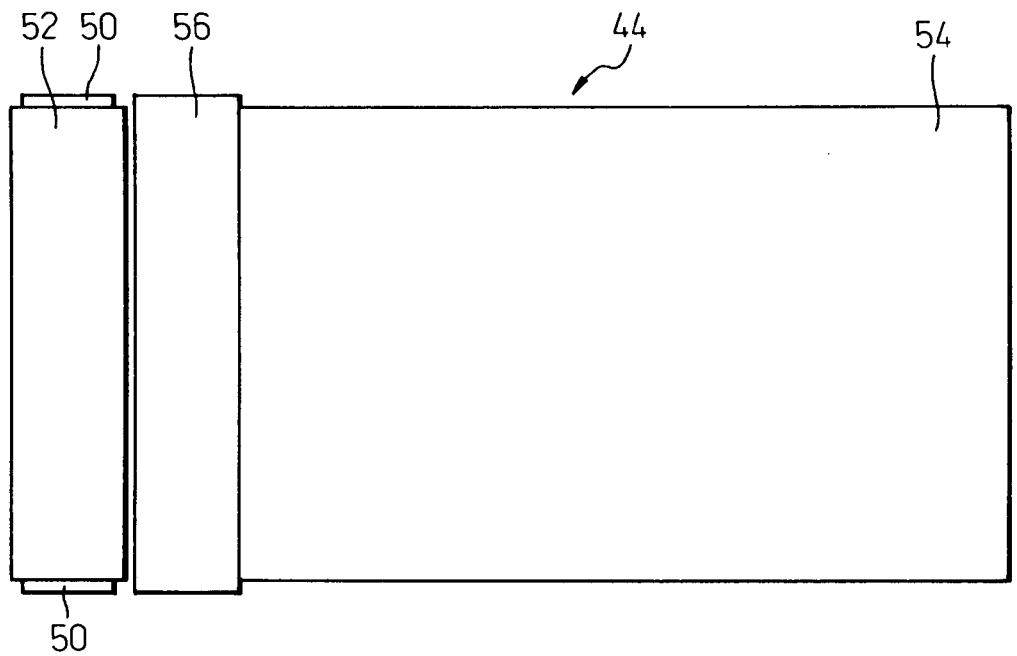
FIG. 45 is a view showing further example of a lighting unit.
Figure 46:
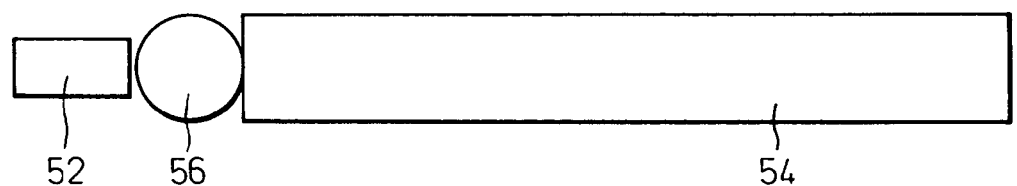
FIG. 46 is a sectional view showing the lighting unit shown in FIG. 45.

FIG. 45 shows a further example of a lighting unit. FIG. 46 is a sectional view of the lighting unit shown in FIG. 45. In this example, the light converging means 56 comprises a generally cylindrical fiber. The generally cylindrical fiber functions in the same manner as a lens and is arranged to improve the degree of parallelism of light that comes out of the first light guide plate 52 and enters the second light guide plate 54. The feature of this example is effective when the first light guide plate 52 is thinner than the second light guide plate 54.

Figure 47:
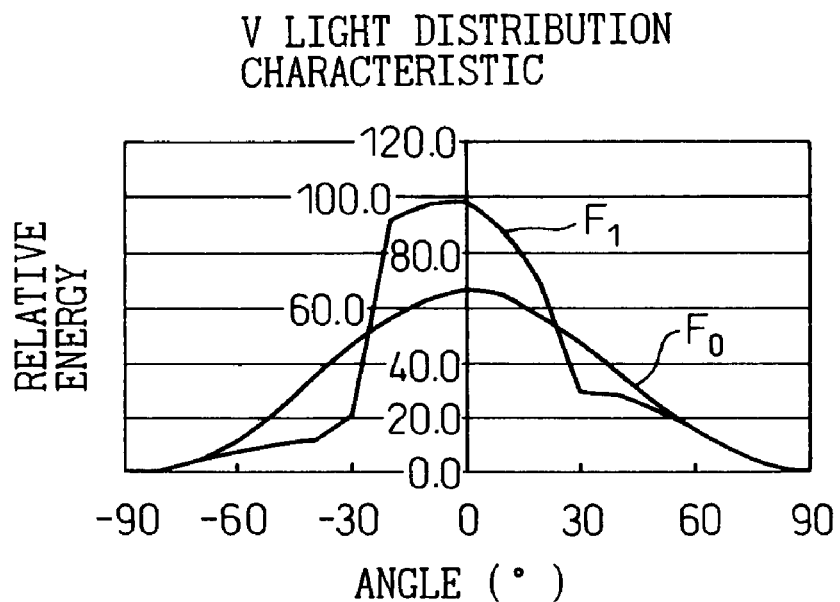
FIG. 47 is a view showing the light converging effect in the vertical direction to be exerted by the lighting unit shown in FIG. 45 and FIG. 46.
Figure 48:
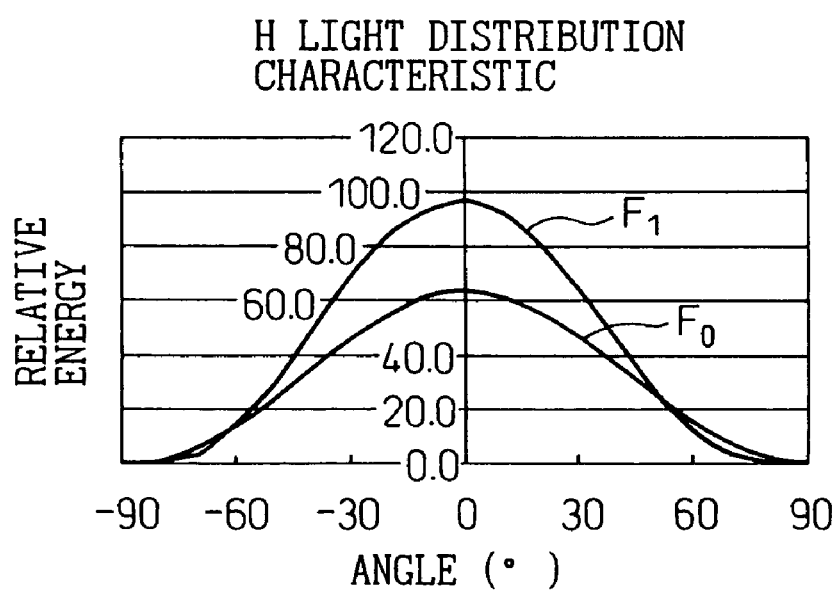
FIG. 48 is a view showing the light converging effect in the horizontal direction to be exerted by the lighting unit shown in FIGS. 45 and 46.

FIG. 47 shows an effect of light convergence in the vertical direction exerted by the lighting unit 44 shown in FIGS. 45 and 46. FIG. 48 shows an effect of light convergence in the horizontal direction exerted by the lighting unit 44 shown in FIGS. 45 and 46. In FIGS. 47 and 48, the curve F0 indicates a distribution of relative amount of light in the vertical direction attained when the fiber serving as the light converging means 56 is not included. The curve F1 indicates a distribution of relative amount of light in the vertical direction attained when the fiber serving as the light converging means 56 is included. When the fiber serving as the light converging means 56 is included, the effect of light convergence is improved, and the degree of parallelism of light incident on the second light guide plate 54 is improved. When the thickness of the first light guide plate 52 is set to 0.7 mm and the thickness of the second light guide plate 54 is set to 1.0 mm, an effect of light convergence that is about 1.5 times higher is provided.

In this example, the thickness of the LED permitting the effect of light convergence that is about 1.5 times higher, which is similar to that when the light source 50 composed of LEDs is attached directly to the first light guide plate 52, 1.0 mm, and the thickness of the second light guide plate 54 is 1.0 mm. Upon examining the LED, the thickness of the substantial, light emitting surface is smaller than 1.0 mm, and light is emitted radially from the light-emitting chip at a center, which is a square whose sides have zero point several millimeters and that is placed behind the light emitting surface. Consequently, the effect of convergence provided by the fibers is improved.

Figure 49:
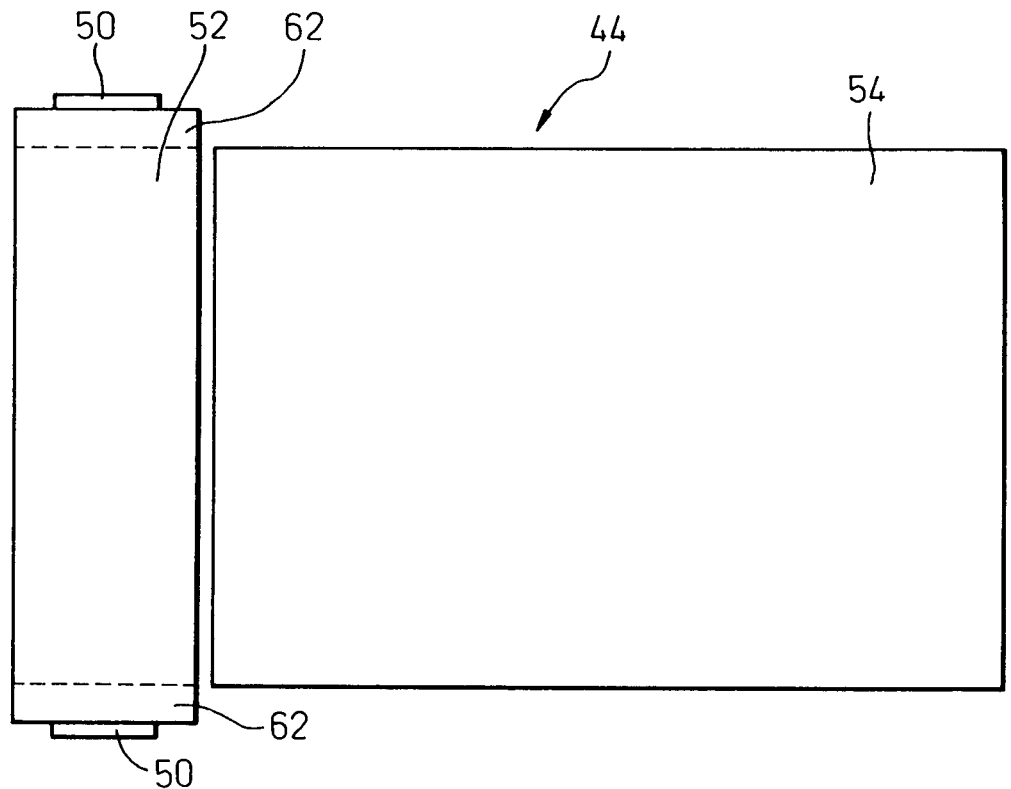
FIG. 49 is a view showing a further example of a lighting unit.
Figure 50:
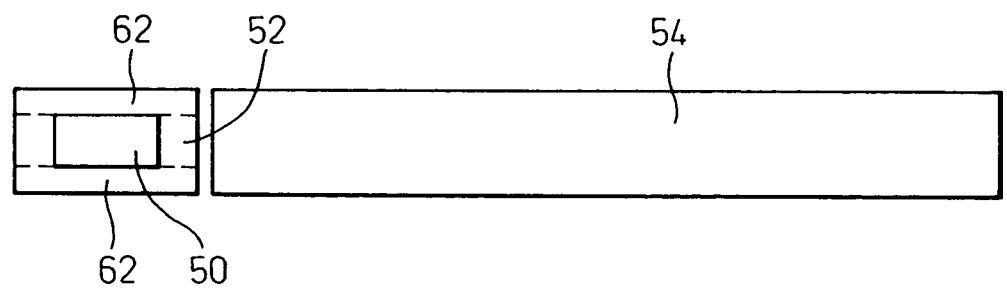
FIG. 50 is a front view of the lighting unit shown in FIG. 49.
Figure 51:
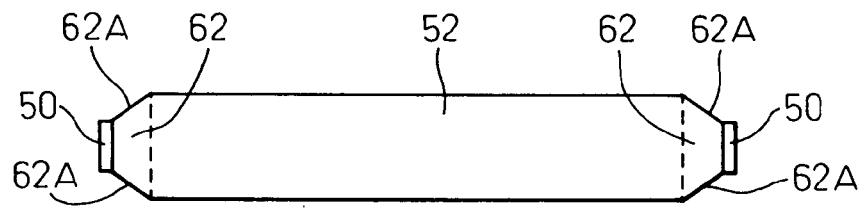
FIG. 51 is a left side view of the lighting unit shown in FIG. 49.

FIG. 49 shows a further example of a lighting unit. FIG. 50 is a front view of the lighting unit shown in FIG. 49. FIG. 51 is a left side view of the lighting unit shown in FIG. 49. In this example, a light converging means 62 similar to the light converging means 56 in the previous examples is interposed between a light source 50 formed with LEDs and a first light guide plate 52. The light converging means 62 is formed as an integral part of the first light guide plate 52 and is tapered towards the light source 50. The operation of the light converging means 62 is identical to that of the light converging means 56. The light converging means 62 is a portion linking the light source 50 and first light guide plate 52 and including a slope. If a total reflection angle at which light is totally reflected by the first light guide plate 52 is θc and the angle at which the slope meets a line parallel to the axis of the first light guide plate 52 is α, α<1.5 θc is satisfied. In this case, the thickness of the light source 50 is smaller than the thickness of the first light guide plate 52. Moreover, the light converging means 62 is positioned so as to improve the degree of parallelism of light emitted by the light source 50 and entering the first light guide plate 52.

In this example, as mentioned previously, light is radially emitted by the LED, and the effect of light convergence is higher (about 1.3 times higher). However, in the structure having the light source 50 coupled to the second light guide plate 54 via the first light guide plate 52, a reflecting mirror is formed on the side of the first light guide plate 52 opposite to the side thereof adjoining the second light guide plate 54. If the plainness and verticalness of the side surface is not so high, the spread angle in the vertical direction increases. This requires the higher precision in manufacturing the first light guide plate 52. This example makes it easier to attain precision in manufactureing.

Figure 52:
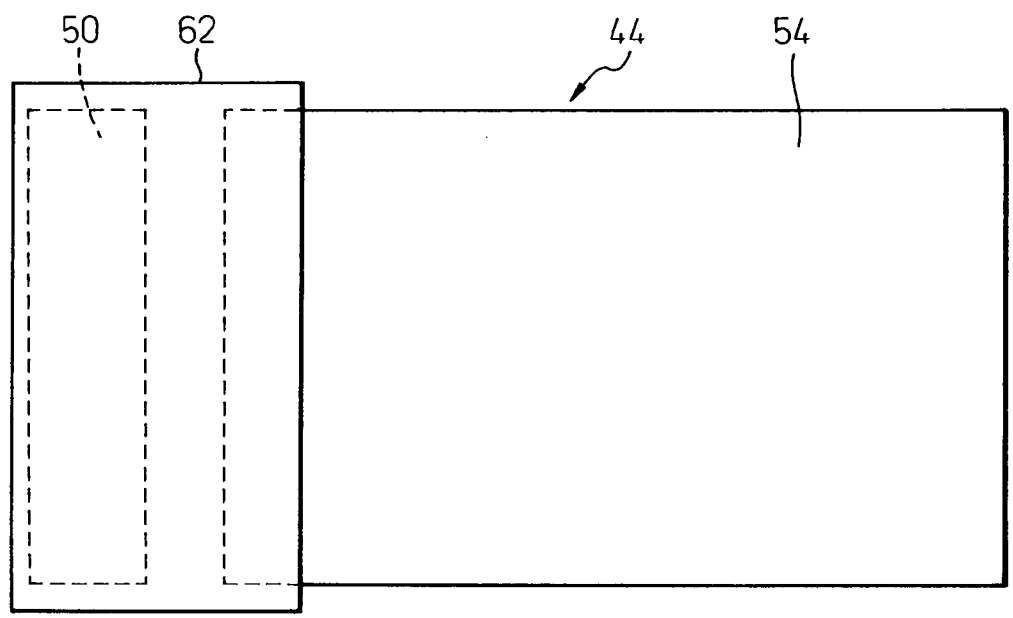
FIG. 52 is a view showing a further example of a lighting unit.
Figure 53:
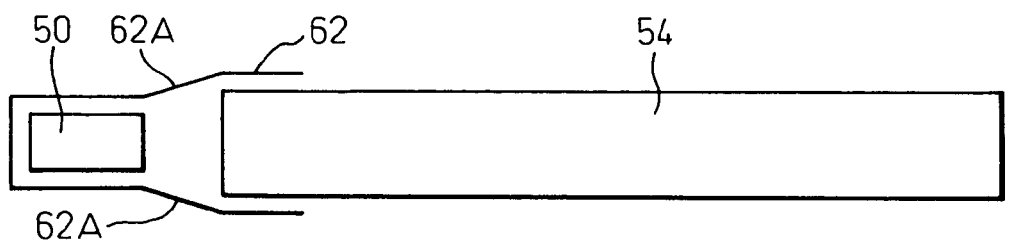
FIG. 53 is a sectional view of the lighting unit shown in FIG. 52.

FIG. 52 shows a further example of a lighting unit. FIG. 53 is a sectional view of the lighting unit shown in FIG. 52. In this example, the first light guide plate 52 included in the previous example is excluded, and the light source 50 is coupled to the second light guide plate 54. The light converging means 62 is formed between the light source 50 formed with LEDs and the second light source guide 54. Similarly to the light converging means 56 shown in FIGS. 43 and 44, the light converging means 62 comprises a reflector having slopes 62A that are inclined from a point on or near the light source 50 to a point on or near the second light guide plate 54. The reflector is included in order to improve the degree of parallelism of light emitted by the light source 50 and entering the second light guide plate 54.

Figure 54:
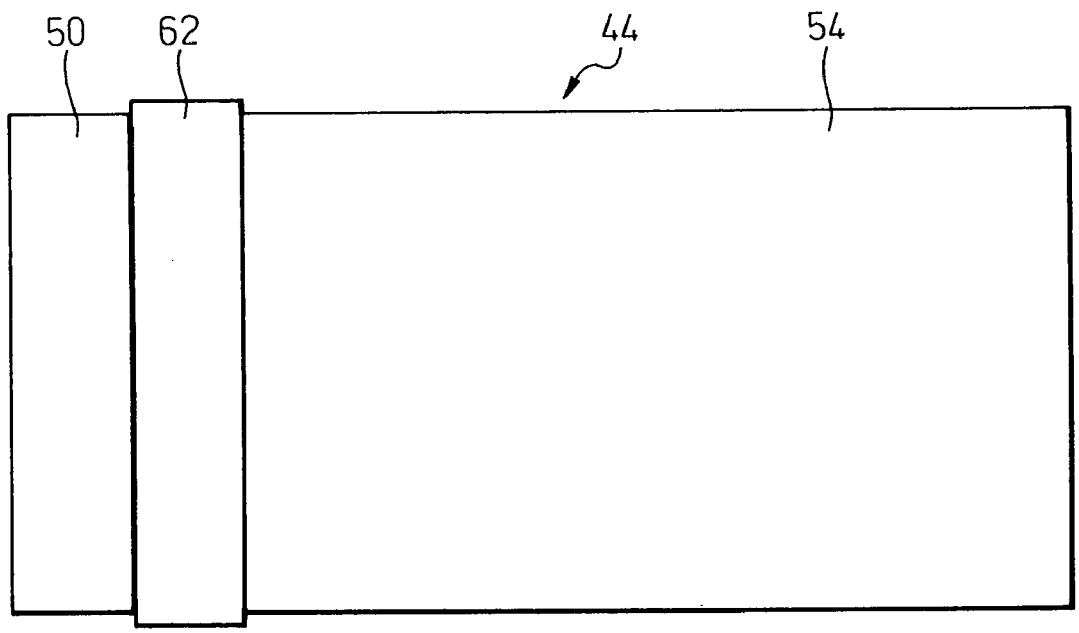
FIG. 54 is a view showing a further example of a lighting unit.
Figure 55:
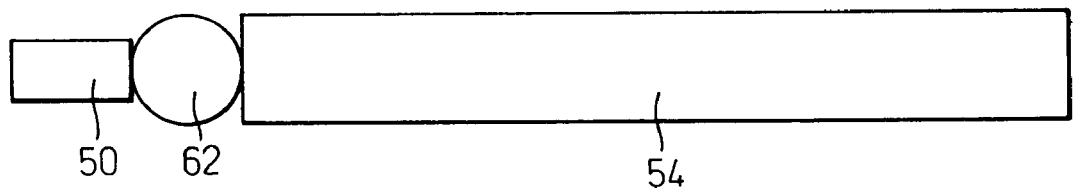
FIG. 55 is a sectional view of the lighting unit shown in FIG. 54.

FIG. 54 shows a further example of a lighting unit. FIG. 55 is a sectional view of the lighting unit shown in FIG. 54. Even in this example, the first light guide plate 52 included in the previous examples is excluded, and the light source 50 is coupled to the second light guide plate 54. The light converging means 62 is formed between the light source 50 formed with LEDs and the second light guide plate 54. Similarly to the light converging means 56 shown in FIGS. 45 and 46, the light converging means 62 is composed of a generally cylindrical fiber. The generally cylindrical fiber performs the same operation as a lens, and is included in order to improve the degree of parallelism of light emitted by the light source 50 and entering the second light guide plate 54.

Figure 56:
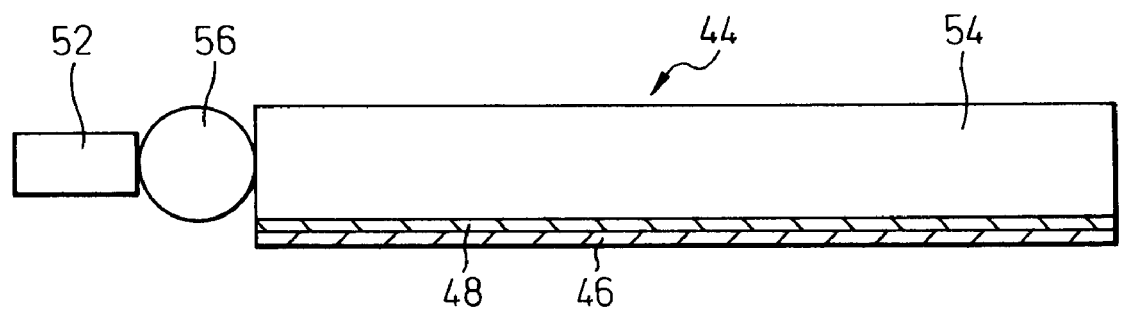
FIG. 56 is a sectional view showing a further example of a lighting unit.

FIG. 56 shows a further example of a lighting unit. The lighting unit 44 comprises the light source that is not shown, the first light guide plate 52, the second light guide plate 54, the light converging means 56 composed of a generally cylindrical fiber, and the polarizer 46 bonded to the second light guide plate 54 with the low refractive index layer 48 between them.

Figure 57:
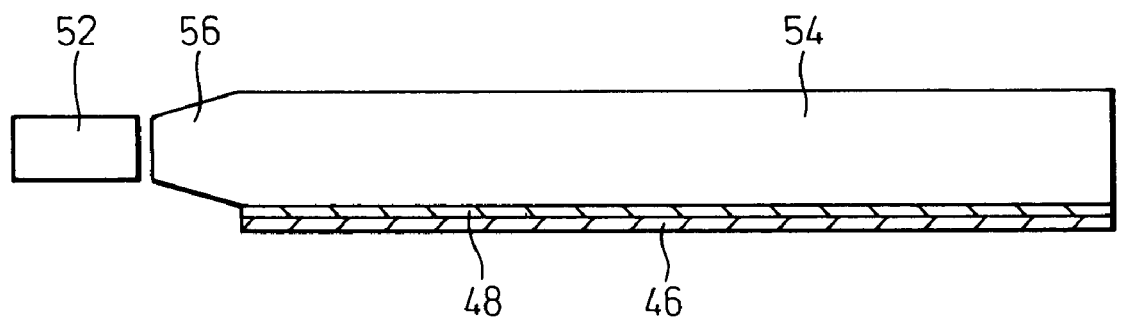
FIG. 57 is a sectional view showing a further example of a lighting unit.

FIG. 57 shows a further example of a lighting unit. The lighting unit 44 comprises the light source that is not shown, the first light guide plate 52, the second light guide plate 54, the light converging means 56 formed as an integral part of the second light guide plate 54 and tapered, and the polarizer 46 bonded to the second light guide plate 54 with the low-refractive-index layer 48 between them.

Figure 58:
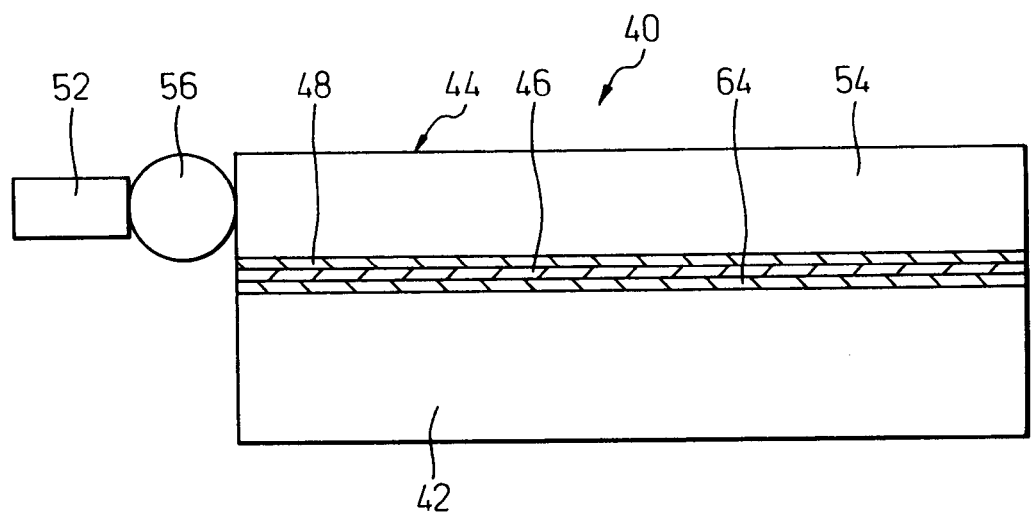
FIG. 58 is a sectional view showing an example of a liquid crystal display device.

FIG. 58 shows a further example of a liquid crystal display device. The liquid crystal display device 40 includes the lighting unit 44, the polarizer 46, and the liquid crystal panel 42. The lighting unit 44 comprises the light source that is not shown, the first light guide plate 52, the second light guide plate 54, and the light converging means 56 interposed between the first light guide plate 52 and second light guide plate 54 and formed with a generally cylindrical fiber. The polarizer 46 is bonded to the second light guide plate 54 with the low refractive index layer 48 between them, and is also bonded to the liquid crystal panel 42 with a low-refractive-index layer 64 between them.

Figure 59:
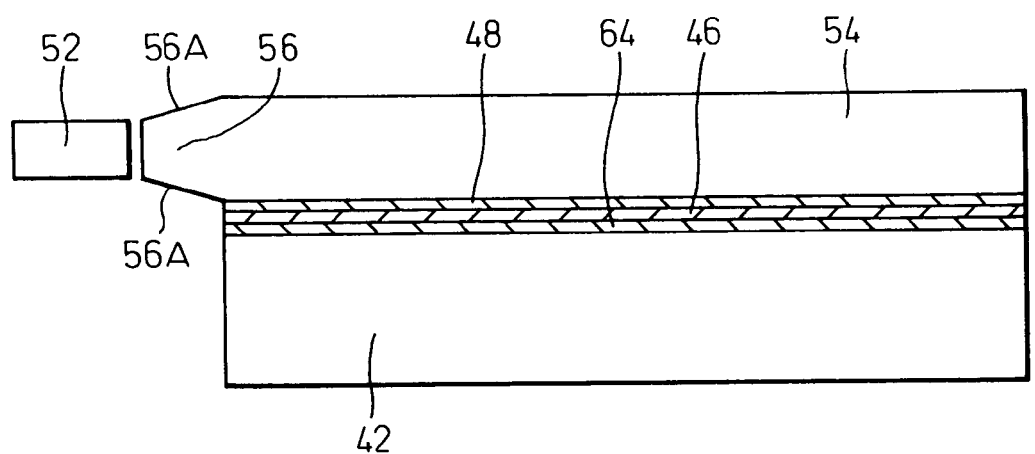
FIG. 59 is a sectional view showing another example of a liquid crystal display device.

FIG. 59 shows a further example of a liquid crystal display device. The liquid crystal display device 40 includes the lighting unit 44, the polarizer 46, and the liquid crystal panel 42. The lighting unit 44 comprises the light source that is not shown, the first light guide plate 52, the second light guide plate 54, and the light converging means 56 lying between the first light guide plate 52 and the second light guide plate 54 and including slopes 56A. The polarizer 46 is bonded to the second light guide plate 54 with the low-refractive-index layer 48 between them, and also bonded to the liquid crystal panel 42 with the low-refractive-index layer 64 between them.

Figure 60:
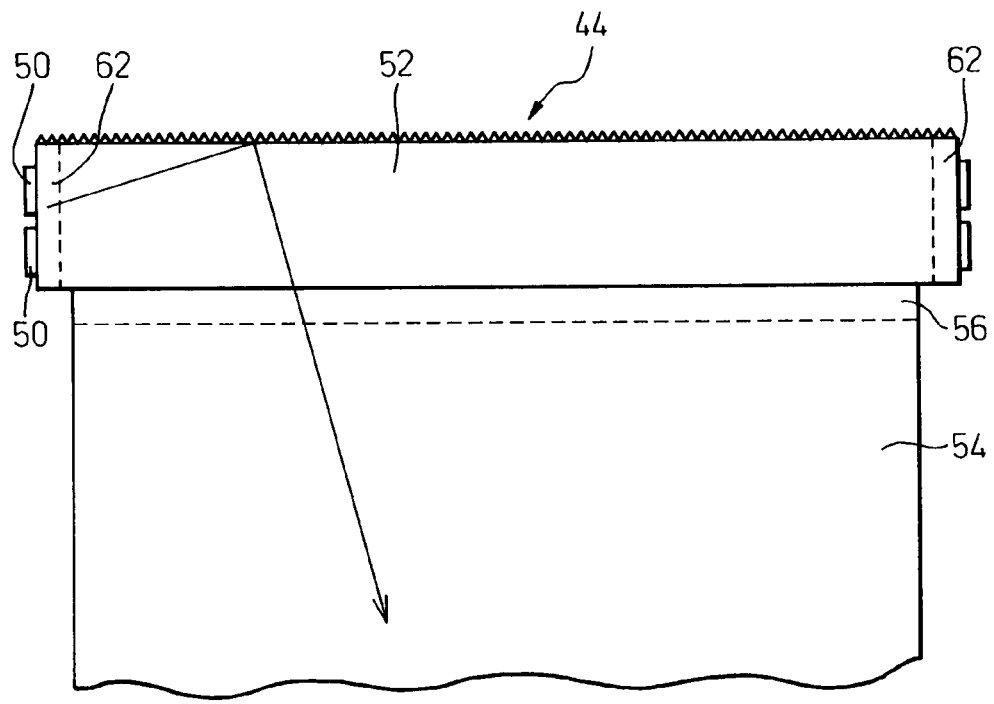
FIG. 60 is a plan view showing a further example of a lighting unit.
Figure 61:
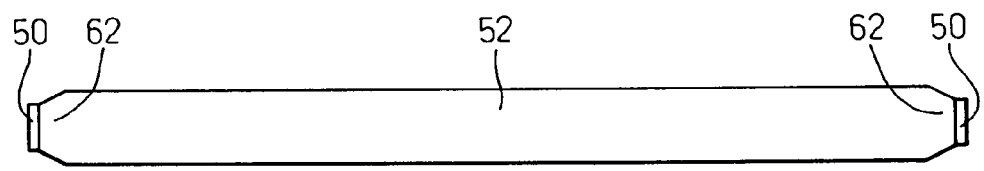
FIG. 61 is a front view of the lighting unit shown in FIG. 60.
Figure 62:
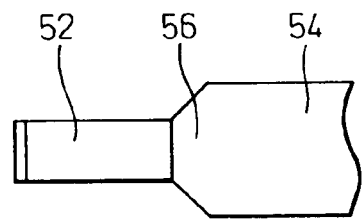
FIG. 62 is a sectional view of the lighting unit shown in FIG. 60.

FIG. 60 is a sectional view showing a further example of a lighting unit, FIG. 61 is a front view of the lighting unit shown in FIG. 60, and FIG. 62 is a sectional view of the lighting unit shown in FIG. 60. The lighting unit 44 comprises the light sources 50 formed with LEDs, the first light guide plate 52, the second light guide plate 54, the light converging means 62 interposed between the light source 50 and the first light guide plate 52 and tapered as an integral part of the first light guide plate 52, and the light converging means 56 located between the first light guide plate 52 and the second light guide plate 54, and tapered as an integral part of the second light guide plate 54.

Figure 63:
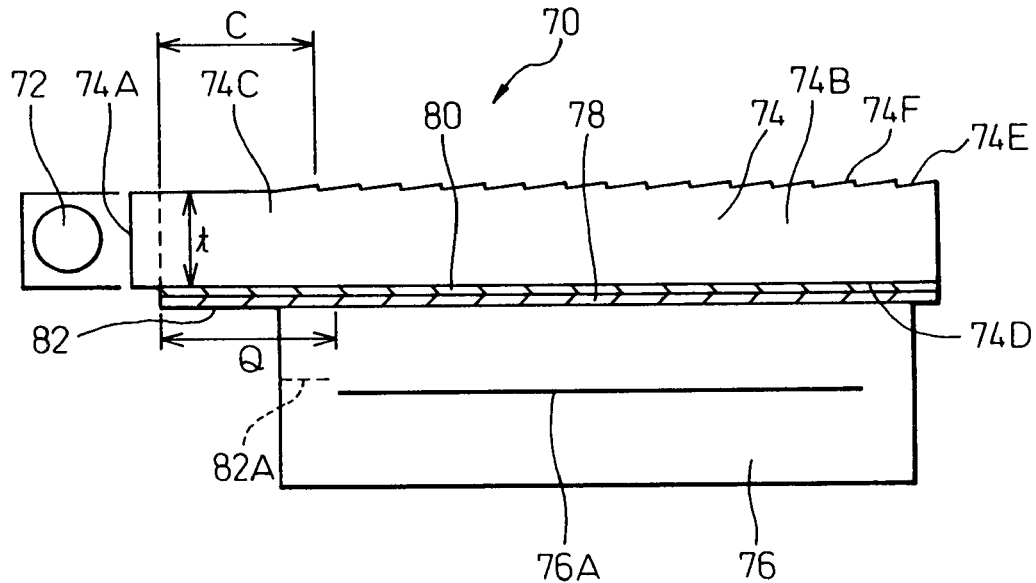
FIG. 63 is a view showing a liquid crystal display device in accordance with a third embodiment of the present invention.

FIG. 63 shows a liquid crystal display device in accordance with a third embodiment of the present invention. A liquid crystal display device 70 comprises a light source 72, a light guide plate 74 on which light emitted by the light source 72 falls, a liquid crystal panel 76 of a reflective vertical alignment type, and a polarizer 78 interposed between the light guide plate 74 and liquid crystal panel 76. A low-refractive-index layer 80 is interposed between the light guide plate 74 and the polarizer 78. The refractive index of the low-refractive-index layer 80 is higher than that of air but lower than that of the light guide plate 74.

The light guide plate 74, the polarizer 78, and the liquid crystal panel 76 are bonded to one another using an adhesive, a glue, or a bond. The low-refractive-index layer 80 comprises an adhesive, glue, or bond. The refractive index of the adhesive is nominally 1.48, but the substantial refractive index is made 1.47 or less by uniformly containing air in the adhesive and autoclaving the assembly when the light guide plate 74 is bonded to the polarizer 78. Thus, air is mixed in the adhesive as minute bubbles, which do not cause light to scatter. The light guide plate 74 is made of an acrylic whose refractive index is 1.48 or Arton whose refractive index is 1.51.

The light guide plate 74 has an incidence surface (side surface) 74A on which light emitted by the light source 72 falls, a light guide area 74B corresponding to the display area (or an area in which a liquid crystal is present) of the liquid crystal panel 76, and an unnecessary light removing area 74C lying between the incidence surface 74A and the light guide area 74B for removing at least part of unnecessary light that falls on the light guide plate 74 at an angle greater than the total reflection angle of the light guide plate 74 (a total reflection angle at the interface between the light guide plate 74 and the adhesive layer 80). The unnecessary light removing area 74C has a width Q.

Moreover, the light guide plate 74 has a first surface 74D at which light traveling in the light guide area 74B leaves the light guide plate 74 toward the liquid crystal panel 76, and prisms 74F formed on a second surface 74E on the opposite side of the first surface 74D. The prisms 74F are formed from a point of the distance C from the incidence surface 74A and over the display area 76A. The distance C is nearly equal to or a bit smaller than the width Q.

In this embodiment, the light source 72 is composed of a cold cathode tube and a U-shaped reflector and is located near the incidence surface 74A of the light guide plate 74. An unnecessary light removing means 82 is located in the unnecessary light removing area 74C of the light guide plate 74. The unnecessary light removing means 82 is preferably formed with a member that absorbs light. The member that absorbs light is preferably a black member or a metallic member, such as a black matrix. In this embodiment, the unnecessary light removing means 82 comprises an extension of the polarizer 78 extended beyond the display area 76A of the liquid crystal panel 76.

The unnecessary light removing area 74C is defined so that it will not overlap the display area 76A of the liquid crystal panel, and the unnecessary light removing area 74C does not include the prisms 74F, so that a scattering loss will not occur. The light guide plate 74 is made of Arton and has a refractive index ranging from 1.51 to 1.52. Light that spreads at angles between nearly +40° and −40° in the vertical direction enters through the incidence surface 74A. However, light that can be guided by the adhesive having the refractive index of 1.47 is the light spreading at angles between nearly +13° and −13° in the vertical direction, and light spreading at an angle between 13° and 40° partly passes through the adhesive. Part of the light is absorbed by the sheet polarizer 78, and the remaining light passes through polarizer 78. This leakage light degrades contrast, when entering the display area 76A, of the liquid crystal panel 76, and should therefore be removed. For this reason, a light absorbent black matrix 82A is placed below the extension of the polarizer 78 through which light may pass and the display area of the liquid crystal panel is not arranged at a place where the light having passed through extension of the polarizer 78 reaches. Incidentally, an absorbent tape may be substituted for the absorbent black matrix.

Light partly reflected by the low refractive index layer (adhesive) 80 in the unnecessary light removing area 74C, and unnecessary light having passed through the unnecessary light removing area 74C without contact with the low refractive index layer 80, especially light spreading at angles between ±30° and ±40° roughly approximate parallel light, and it is hard to remove such light. Such light degrades contrast when it reaches the liquid crystal panel. Therefore, such light is preferably compensated for, at least partially, by light close to parallel light in the area, in which the prisms 74F are present, in order to improve the degraded contrast. For this reason, in the prism 74F having a slow slope and a steep slope, the angle of the slow slope is set to 1° or more. Thus, the degree of parallelism of the light is improved. Consequently, the contrast is improved at a short distance from the start point of the light guide area 74B.

Figure 64:
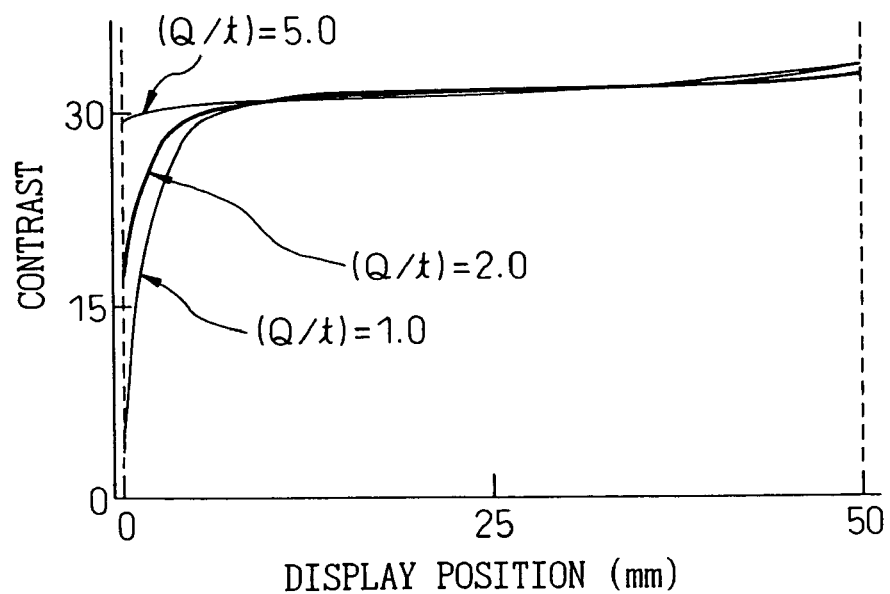
FIG. 64 is a view showing the relationship between the display position in the liquid crystal display device shown in FIG. 63 and contrast.

FIG. 64 shows the relationship between the display position in the liquid crystal display device shown in FIG. 63 and the contrast. The relationship is investigated with a parameter, which is a ratio of the width Q of the unnecessary light removing area 74C to the thickness t of the light guide plate 74 (Q/t), set to several values. The curve relevant to Q/t=2.0 demonstrates that the contrast of 10 or more is attained even on the edges of the display area 74A. Consequently, preferably, the unnecessary light removing area 74C is designed so that Q/t will be 2.0 or more.

Figure 65:
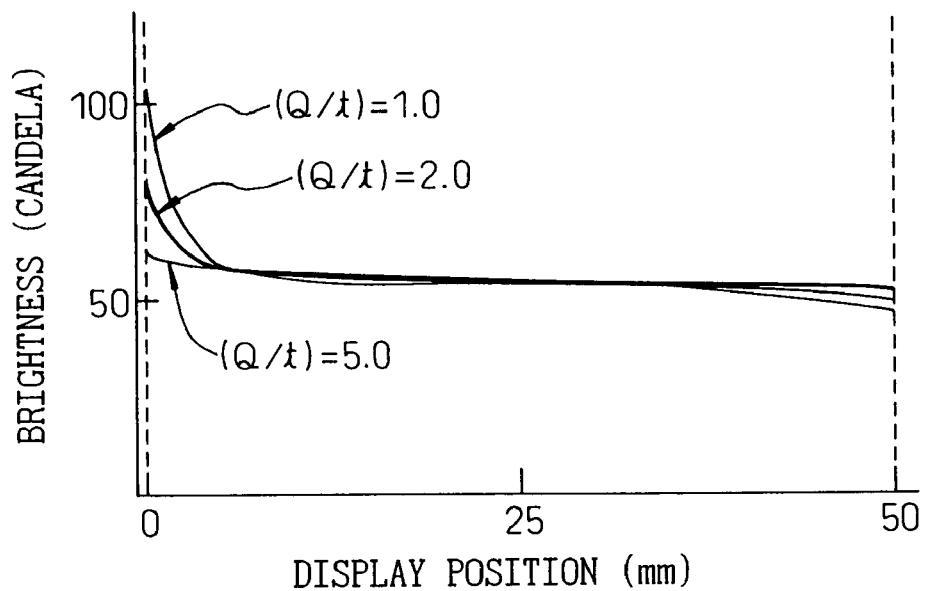
FIG. 65 is a view showing the relationship between the display position in the liquid crystal display device shown in FIG. 63 and brightness.

FIG. 65 shows the relationship between the display position in the liquid crystal display device shown in FIG. 63 and a brightness level. Even in this case, as long as Q/t is 2.0 or more, the brightness variation is relatively small.

Figure 66:
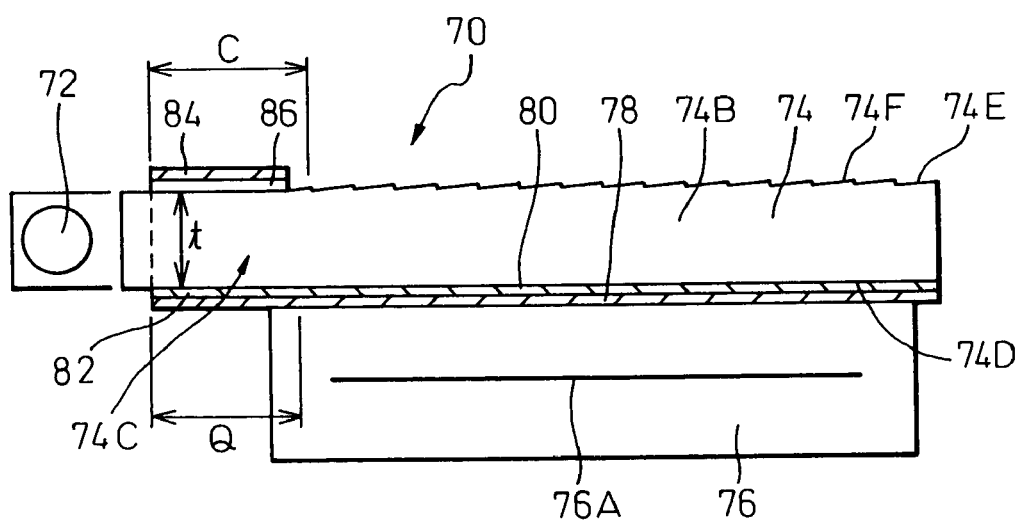
FIG. 66 is a view showing an example of a liquid crystal display device.

FIG. 66 shows an example of a liquid crystal display device. In FIG. 63, the unnecessary light removing means 82 is formed only on the lower side of the light guide plate 74, that is, on the side of the light guide plate 74 adjoining the liquid crystal panel 76. In FIG. 66, in addition to the unnecessary light removing means 82, an unnecessary light removing means 84 comprising a polarizing member is formed on the upper side of the light guide plate 74, that is, on the side of the light guide plate opposite to the side thereof adjoining the liquid crystal panel 76. The unnecessary light removing means 84 is bonded to the light guide plate 74 with a glue layer or an adhesive layer 86 between them. Furthermore, a black surface of a holder may be placed on the unnecessary light removing means 84. In this case, stray light disappears from the nearby display area and the display quality is improved.

When the unnecessary light removing means 84 is included, light emitted by the light source 72 and traveling upwards is reflected by the first surface (upper surface) 74E of the light guide plate 74. Consequently, light passing through the second surface (lower surface) 74D of the light guide plate 74 is nullified. This has the merit that the width of the unnecessary light removing area 74 may be a nearly half of the width of the one included in the embodiment shown in FIG. 63. However, in this case, the edge of the unnecessary light removing means 84 adjoining the display area should be appropriately treated so that light may not be scattered. Moreover, the problem that the number of man-hours required for bonding increases, arises.

Figure 67:
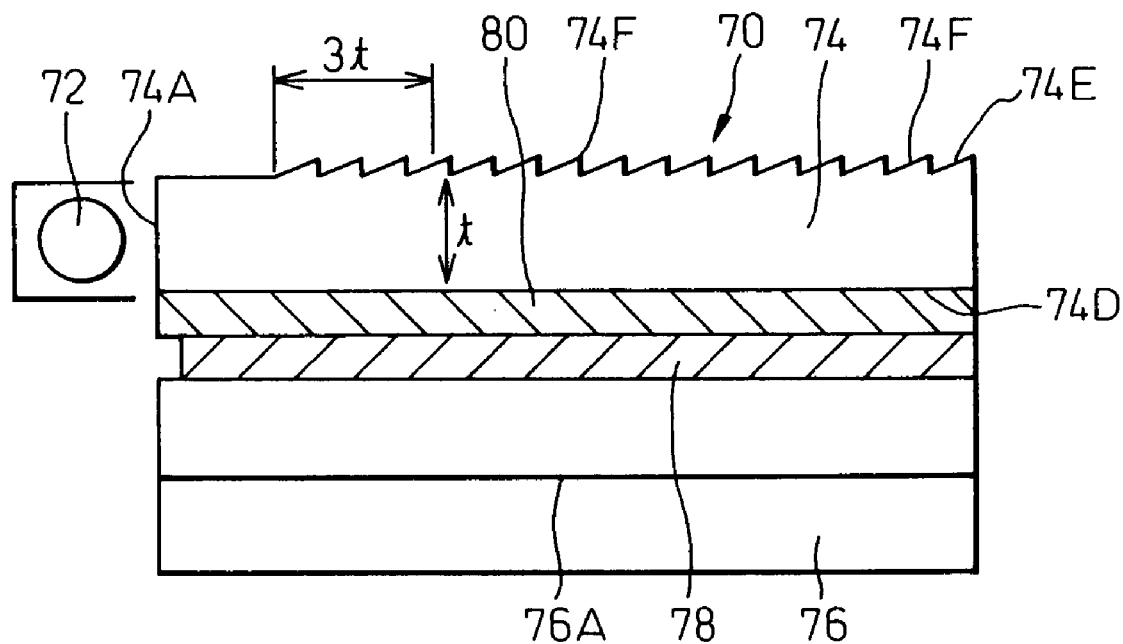
FIG. 67 is a view showing another example of a liquid crystal display device.
Figure 68:
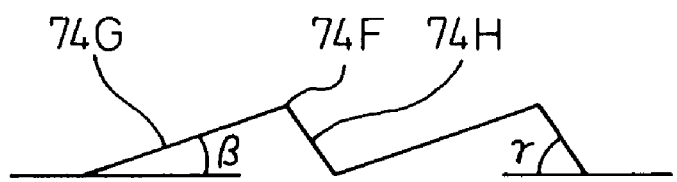
FIG. 68 is a partial enlarged view showing prisms for outlet of light formed on the surface of the light guide plate included in the liquid crystal display device shown in FIG. 67.

FIG. 67 shows a further example of a liquid crystal display device. FIG. 68 is a partly enlarged view showing the light outputting prisms 74F formed on the surface of the light guide plate 74. In FIG. 68, the prism 74F has a slow slope 74G and a steep slope 74H. Preferably, the angle β at which the slow slope 74G meets a plane parallel to the first surface 74E is equal to or larger than 1°. The angle γ at which the steep slope 74H meets the plate parallel to the first surface 74E is equal to or smaller than 45°. In particular, if that the thickness of the light guide plate 74 is t, the slow slopes and the steep slopes of the prisms 74F are formed in those angles over the range of 3t from the starting prism.

Figure 69:
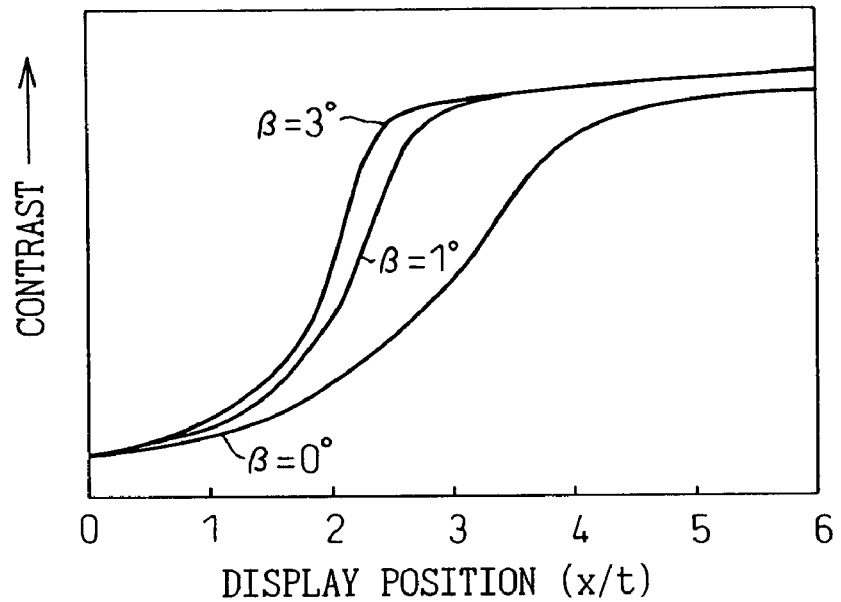
FIG. 69 is a view showing the relationship between the position in the display area of the liquid crystal display device shown in FIG. 67 and contrast.

FIG. 69 shows the relationship between the position in the display area of the liquid crystal display device shown in FIG. 67 and the contrast. In FIG. 69, the display position is indicated with a ratio of a distance x from the starting prism 74F to the thickness of the light guide plate 74, that is, x/t. If the angle β of the slow slope 74G is 1° or more, the contrast is sufficiently high near the display position 3(x/t).

Thus, instead of reducing the length of the unnecessary light removing area to the greatest possible extent, the angle of the slow slopes 74G of the prisms in the area in which the prisms are formed is set to 1° or more, so the degree of parallelism of propagated light is improved. Light reflected by the slow slope 74G once approximates parallel light at an angle of 2β.

If the light guide plate 74 has a thickness of 1 mm, by setting the angle β of the easy slopes 74G to 1° or more, light entering the prism provision area of the light guide plate 74 at an angle of 40° becomes light at an angle of 30° after travelling approximately 17 mm, and if this light is reflected by the prisms 74F and irradiated to the liquid crystal panel 76, the contrast will not be degraded largely. The majority of the light entering the prism area at the angle of 40° or so enters the first adhesive and passes through it and is not propagated in the light guide plate any longer, so the width of the area in which a contrast is so low that a user has a sense of unease becomes a half or a one-third of 17 mm.

Figure 70:
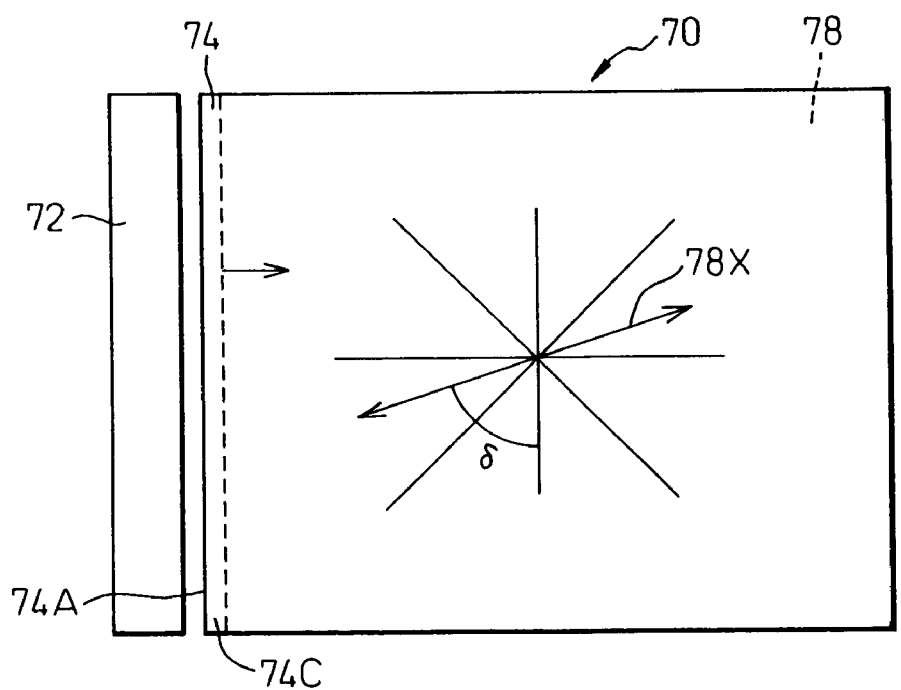
FIG. 70 is a view showing an example of a liquid crystal display device.

FIG. 70 shows a further example of a liquid crystal display device. The light source 72 and the light guide plate 74 are shown. The polarizer 78 is indicated with a dashed line. The light guide plate 74 has an unnecessary light removing area 74C described in conjunction with FIG. 63. The width of the unnecessary light removing area 74C is set to 2 mm or so. Prisms (not shown) are then arranged.

Light having a large angle, which passes through the light guide plate 74 and reaches the liquid crystal panel 76, and which causes degradation of a contrast, includes much p-polarized light with respect to the surface of the low refractive index layer 80. The absorption axis 78X of the polarizer 78 is determined so that the p-polarized light will be absorbed, whereby the contrast in the display area can be improved.

The absorption axis 78X of the sheet polarizer 78 meets a plane parallel to the incidence surface 74C at an angle δ. In FIG. 70, when the angle δ is equal to or larger than ±45°, the area in which the contrast is low tends to diminish rapidly.

Figure 71:
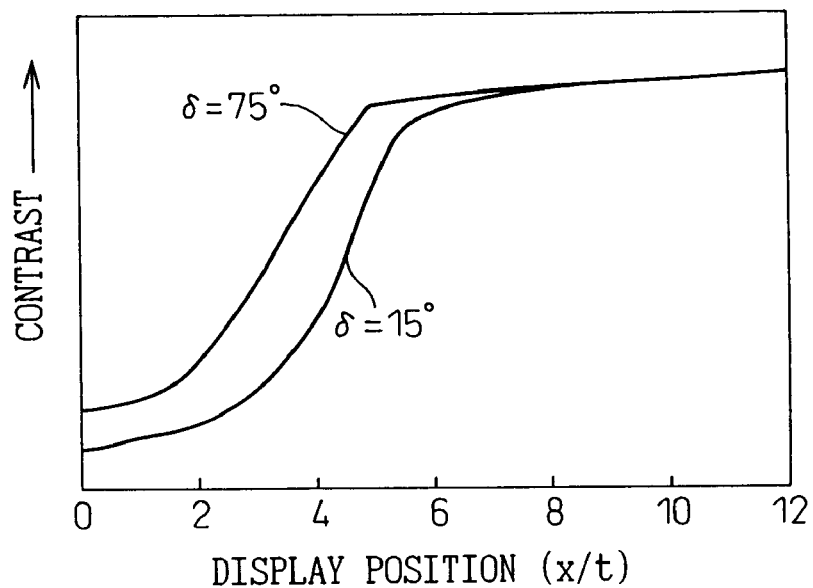
FIG. 71 is a view showing the relationship between the position in the display area of the liquid crystal display device shown in FIG. 70 and contrast.

FIG. 71 shows the relationship between the position in the display area of the liquid crystal display device shown in FIG. 70 and the contrast. In FIG. 71, the display position is indicated with a ratio of the distance x from the start point of the polarizer 78 to the thickness t of the light guide plate 74, that is, x/t. The contrast is sufficiently high near the display position 3(x/t).

Figure 72:
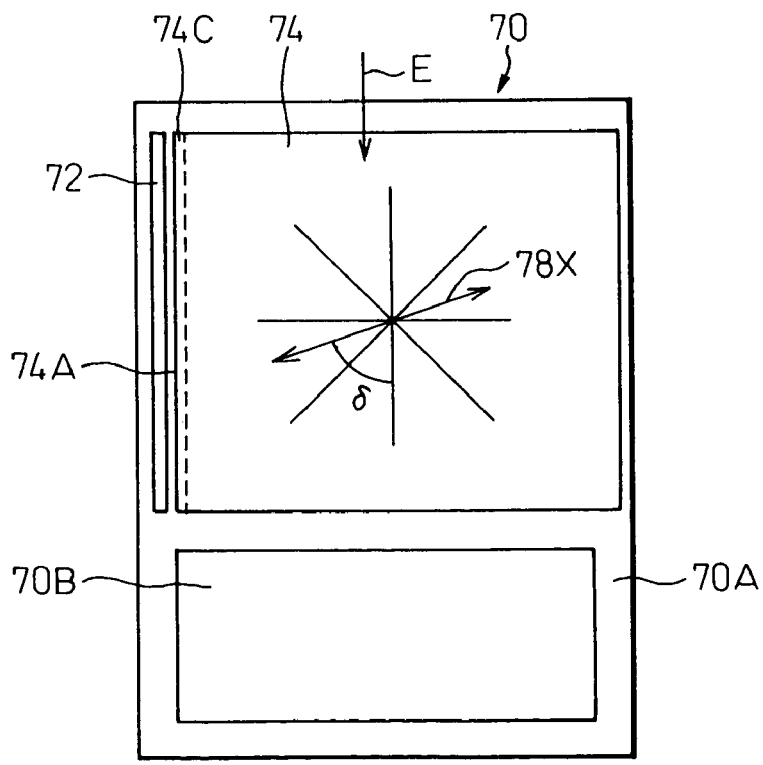
FIG. 72 is a view showing an example of a liquid crystal display device.

FIG. 72 shows a further example of a liquid crystal display device. In FIG. 72, the liquid crystal display device, which is similar to the one shown in FIG. 70, together with a device body 70A is shown. The device body 70A is used vertically erect, and an operating panel 70B is located below the assembly of the light guide plate 74, the polarizer 78, and the liquid crystal panel 76. The arrow E indicates a vertically downward direction. The absorption axis 78X of the polarizer 78 meets a plane parallel to the incidence surface 74C at the angle δ.

For example, the device body 70A is a device body of a personal digital assistant (PDA) or the like. When the display unit is incorporated in the PDA, the incidence surface of the light guide area is arranged to become a side surface, and at the same time, the absorption axis of the polarizer 76 is arranged generally horizontally, so that the polarizer absorbs polarized light component that tends to pass through the adhesive as stray light, and external illumination light coming mainly from an upper oblique direction is transmitted and polarized. Consequently, the light source is located on the side of the device body.

Figure 73:
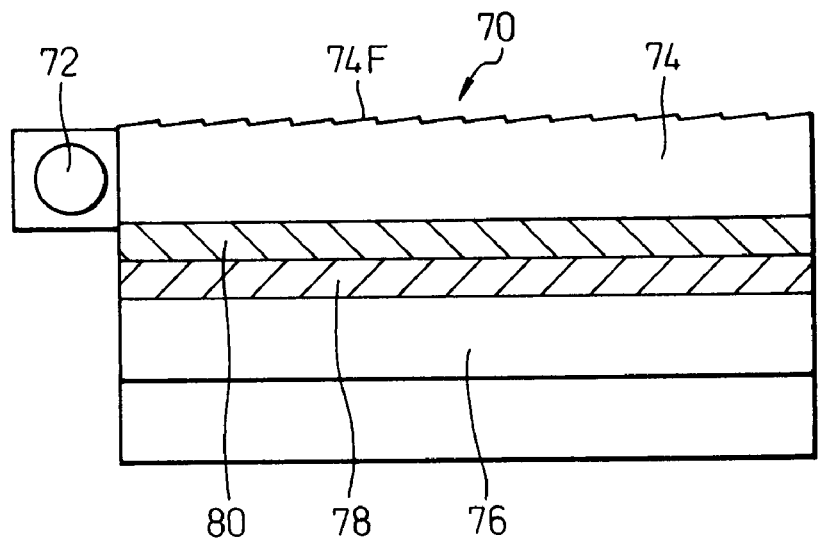
FIG. 73 is a view showing an example of a liquid crystal display device.

FIG. 73 shows a further example of a liquid crystal display device. In the example shown in FIG. 73, assuming that the refractive index of the light guide plate 74 (light guide area) is ng, the refractive index of the low refractive index layer (a layer formed on a liquid crystal panel from which light propagated through a light guide plate is reflected) 80 is na, a discrete pitch of the prisms 74F is P, and a distance from the prisms 74F of the light guide plate 74 to a reflecting mechanism (reflecting electrodes) included in the liquid crystal panel 76 is D, the following relationship is established:

$$\sqrt{Ng^2 - Na^2}/Na \geq 0.5(P/D)$$

The light guide plate 74 is made of Arton having a refractive index of 1.51 and a thickness of 1.8 mm. The low-refractive-index layer 80 is made of a TAC film having a refractive index of 1.47. The combination of the polarizer 78 and one of the glass substrates of the liquid crystal panel 76 has a refractive index ranging from 1.50 to 1.53 and a thickness of approximately 1.2 mm.

Figure 74:
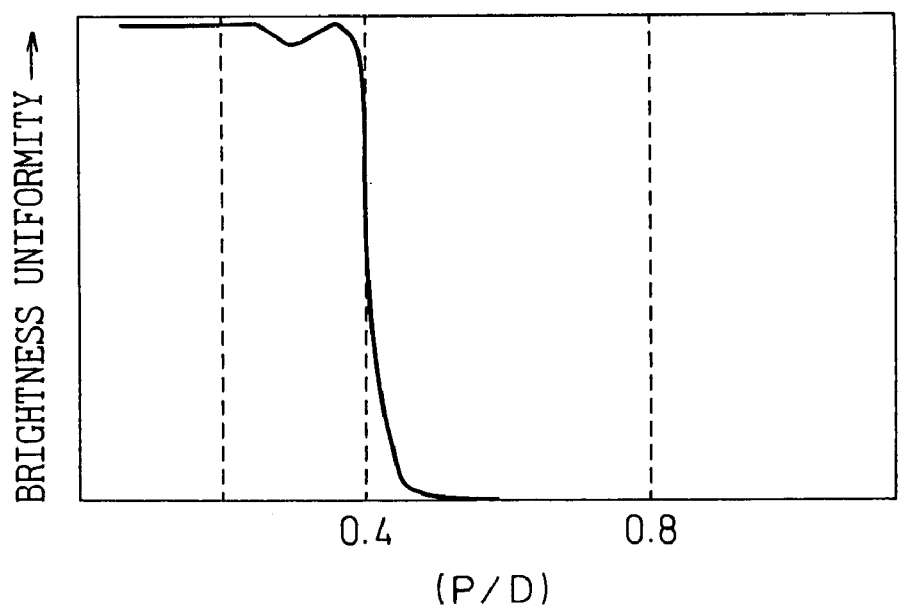
FIG. 74 is a view showing the relationship between p/d and the brightness uniformity in the liquid crystal display device shown in FIG. 73.

FIG. 74 shows the relationship between (p/d) and brightness uniformity in the liquid crystal display device shown in FIG. 73. If (p/d) is equal to or smaller than 4, the brightness uniformity is excellent.

The liquid crystal display device is manufactured with a pitch between adjoining prisms set to 1 mm, and the brightness variation occurring in the display device is very small. In a conventional structure in which a light guide plate is not bonded to a liquid crystal panel, undesirable light is emitted from the prisms formed on the light guide plate directly to a viewer, and enters the viewer's eyes, and the prisms are discerned as a bright line. According to the present invention, as the light guide plate 74, the polarizer 78, and the liquid crystal panel 76 are bonded to each other and measures are taken to prevent light having a large angle being propagated, the above problem will not occur. Unless illumination light to be directed to the display surface of the display panel involves a brightness variation, no problem occurs. Consequently, as light reflected by the prisms toward the liquid crystal panel approximates parallel light, a pitch between adjoining prisms should be narrowed, on one hand, and as undesirable light will not fall directly on the eyes, there is the merit that the prisms are indiscernible and the pitch between adjoining prisms may be made larger than conventional one, on the other hand.

Figure 75:
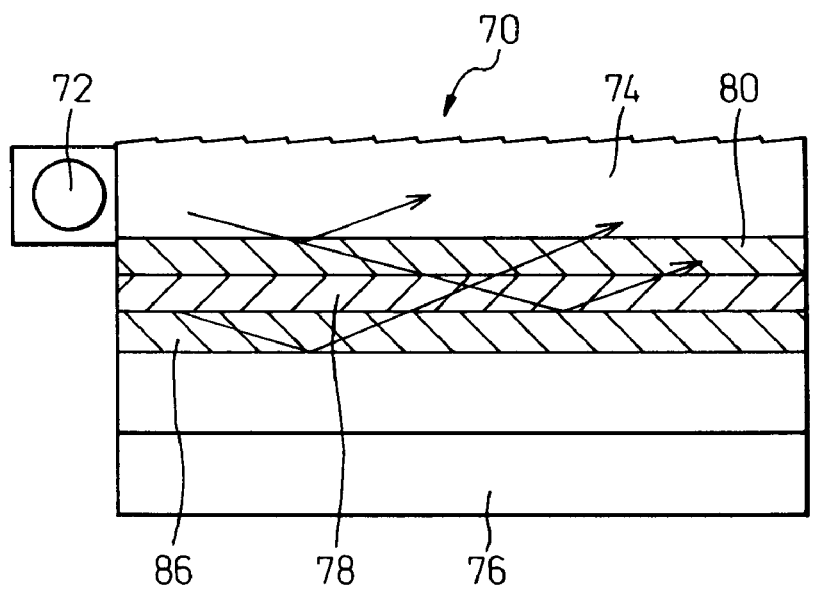
FIG. 75 is a view showing an example of a liquid crystal display device.

FIG. 75 shows a further example of a liquid crystal display device. In the example shown in FIG. 75, the low refractive index layer 80 comprising an adhesive layer is formed on the lower surface of the light guide plate 74, and the low refractive index layer 86 comprising an adhesive layer is formed on the upper surface of the liquid crystal panel 76. The light guide plate 74 is made of acrylic and has a refractive index of 1.48, and the adhesive to be applied to both the light guide plate 74 and the liquid crystal panel 76 is made of an acrylic material having a refractive index of 1.48. When the light guide plate and the liquid crystal panel are bonded, a predetermined air layer is thinly contained in the adhesive, mixed in the adhesive layer through autoclaving, so the air layer is composed of invisible nano-level bubbles and the refractive index of the adhesive layer is decreased to 1.46 or less. In order to make the air layer, which is contained in the adhesive during bonding, thin and uniform, the sheet polarizer 78 has predetermined irregularities (projections and cavities) formed thereon.

In this example, the polarizer 78 and the light guide plate 74 are bonded to each other with the first adhesive layer between them, and the liquid crystal panel 76 and the polarizing layer of the polarizer 78 are bonded to each other with the second adhesive layer between them. The thickness of the first adhesive layer can be arranged to serve as a structure for preventing or minimizing reflection or part of the structure for preventing or minimizing reflection.

Figure 76:
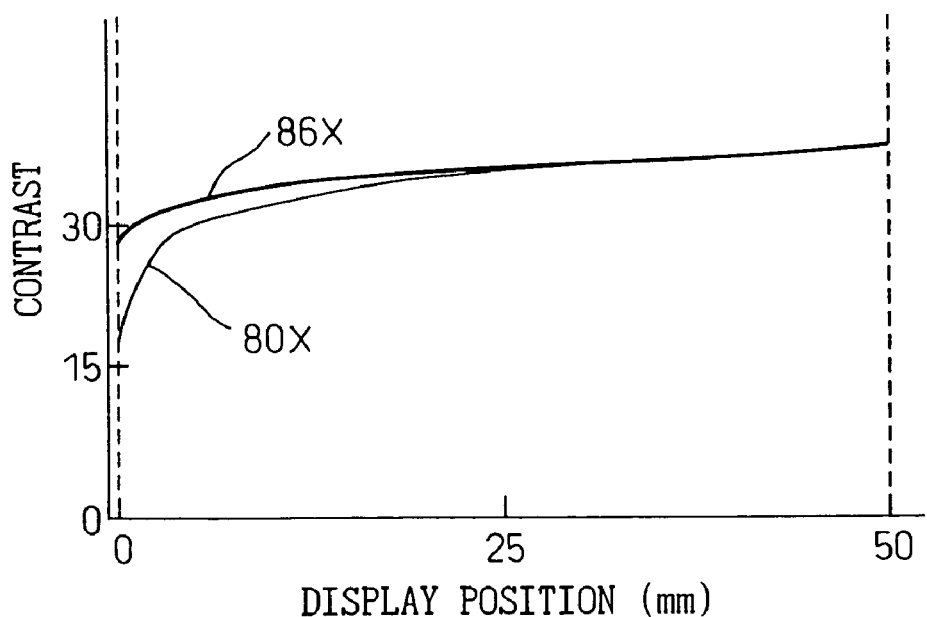
FIG. 76 is a view showing the relationship between the display position in the liquid crystal display device shown in FIG. 75 and contrast.

FIG. 76 shows the relationship between the display position in the liquid crystal display device shown in FIG. 75 and a contrast. The curve 80X is concerned with a case where the low refractive index layer 80 is formed only on the lower surface of the light guide plate 74. The curve 86X is concerned with a case where the low refractive index layer 80 and the low refractive index layer 86 are formed on both sides of the polarizer 78 adjoining the light guide plate 74 and the liquid crystal panel 76. Consequently, the provision of the low refractive index layer 80 and low refractive index layer 86 leads to an improved contrast in the whole display area.

Figure 77:
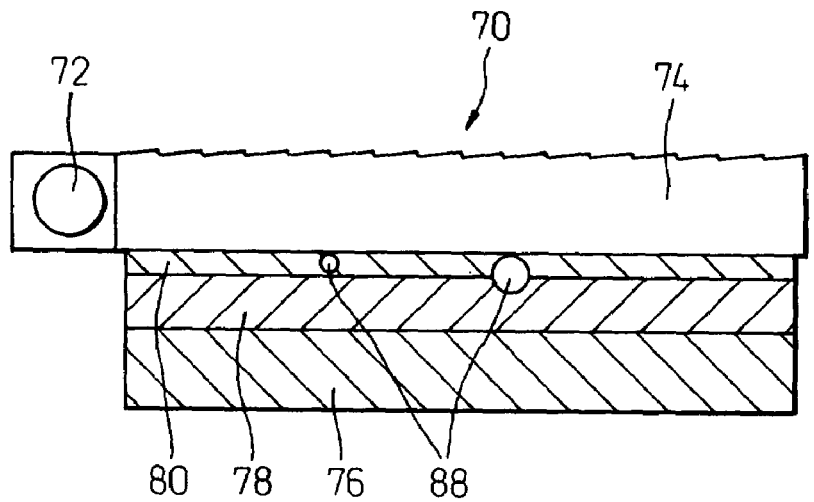
FIG. 77 is a view showing an example of a liquid crystal display device.

FIG. 77 shows a further example of a liquid crystal display device. In the example shown in FIG. 77, the polarizer 78 and the light guide plate 74 are bonded to each other with a first adhesive layer 80 between them. The liquid crystal panel 76 and the polarizing layer of the sheet polarizer 78 are bonded to each other with the second bond layer 86 between them (not shown in FIG. 77). Regarding at least one of the first adhesive layer 80 and the second adhesive layer 86, if the thickness of the adhesive layer is T and the size of dust caught in the adhesive layer is S, the following relationship is established:

$$S < 50 \ \mu m \ \text{or} \ S < T$$

Figure 78:
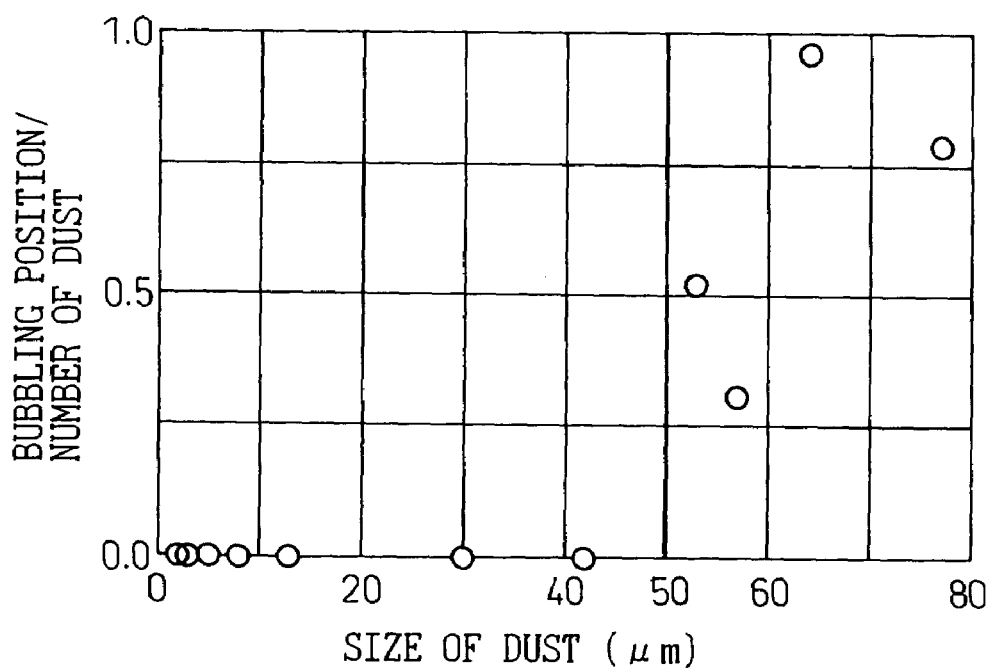
FIG. 78 is a view showing the relationship between the size of dust in the liquid crystal display device shown in FIG. 77 and a bubbling point in the liquid crystal display device shown in FIG. 77.

FIG. 78 shows the relationship between the size of dust in the liquid crystal display device shown in FIG. 77 and a bubbling point.

When the bonded assembly of the light guide plate 74, the polarizer 78, and the liquid crystal panel 76 is placed in a high humidity (85% RH at room temperature of 25° C.) environment in which the room temperature changes in the range from −20° C. to +60° C. with time, bubbles are generated in the bonded surfaces of the light guide plate 74 and the polarizer 78. Bubbles disturb polarized light, and bubbles, once generated, tend to expand in area until they are discerned later, so generation of bubbles itself poses a problem, and it is important that bubbles should not be generated.

When bubbles are observed through a microscope, it is found that dusts exist, which is mixed during bonding, in the centers of all the bubbles. The size of dust and the probability that bubbles are generated are statistically investigated, and the investigation has revealed that when dust is generally so small as to be 50 μm or less in diameter, no bubble is generated. It is considered that bubbles are generated because when dust is caught, the adhesive strength or the gluing strength of the adhesive or the glue near the dust remains low even after bonding and autoclaving, and peeling off is then presumably derived from a temperature change.

In the samples, the polarizer 78 is first bonded to the liquid crystal panel 76, and, the light guide plate 74 is then bonded to the assembly of the polarizer 78 and the liquid crystal panel 76. Consequently, presumably, the bonding between the light guide plate 74 and the polarizer 78 is weakened. When the light guide plate 74 is first bonded to the polarizer 78, and the liquid crystal panel 76 is then bonded to the resultant assembly, the same applies to the bonding between the liquid crystal panel and the polarizer.

The thickness of the adhesive layer is set to 30 μm in this example. Bubbles are not generated around dust whose size is 50 μm, which is larger than 30 μm. It is considered that this is because the dust is slightly crushed during bonding or autoclaving and becomes 30 μm or less in height. This thinking is reasonable. Therefore, if the adhesive layer has a thickness of 60 μm that is twice larger, even when dust whose height is about 60 μm is caught, no bubbles will be generated.

In order to improve the efficiency in bonding the light guide plate 74, which is made of acrylic or Arton, to the polarizer 78, corona discharge, plasma deposition, or ultraviolet irradiation is preferably carried out. The comparative discussion on the corona discharge, the plasma deposition, and the ultraviolet irradiation has revealed that corona discharge is the most suitable in terms of the strength of treating power, controllability, and a smaller variation on the display screen. The treating power of plasma deposition is too strong. The treating power of ultraviolet irradiation is too weak to be applied to an acrylic material that withstands light. It is found through production of a prototype that ultraviolet irradiation has greater difficulty in treating a surface over a large area uniformly than corona discharge does.

Figure 79:
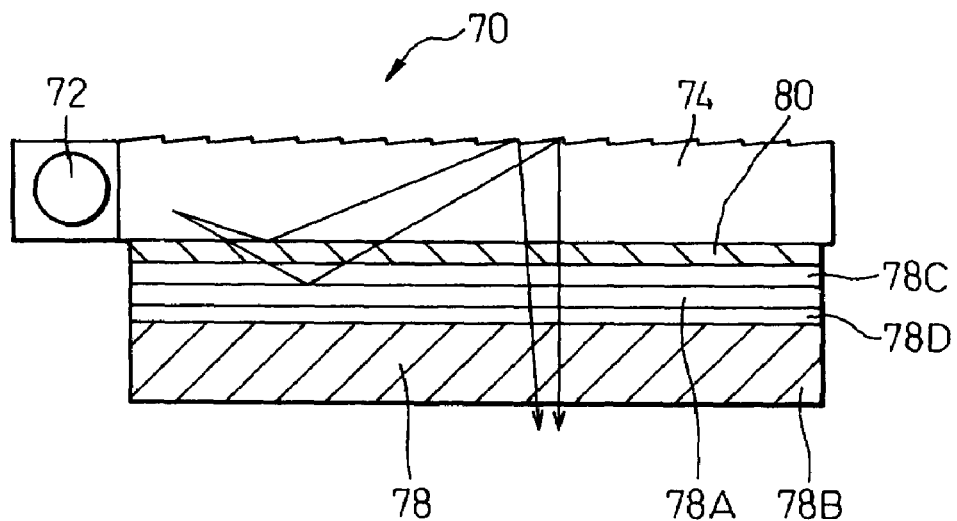
FIG. 79 is a view showing an example of a liquid crystal display device.

FIG. 79 shows a further example of a liquid crystal display device. The liquid crystal panel 76 is not shown in FIG. 79. In the example shown in FIG. 79, the adhesive layer (low-refractive-index layer) 80 is formed on the light guide plate 74. The polarizer 78 includes at least a transparent layer 78A and a polarizing layer 78B. In the example, the transparent layer 78A is sandwiched between high refractive index layers 78C and 78D. The transparent layer 78A is bonded to the adhesive layer 80 with the high refractive index layer 78C between them.

The refractive index of the adhesive layer 80 is lower than or nearly equal to the refractive index of the light guide plate 74. The refractive index of the transparent layer 78A is lower than the refractive indices of the light guide plate 74 and the bond layer 80, respectively.

The transparent (low refractive index) layer 78A and the high refractive index layers 78C and 78D are produced in advance together with the polarizing layer 78B (which absorbs one of two polarized lights but transmits the other polarized light orthogonal to the former polarized light). Moreover, another transparent layer is formed on the opposite surface of the polarizing layer 78B.

The polarizer 78 is bonded to the liquid crystal panel 76 and the light guide plate 74, respectively, whereby the freedom in selecting a glue or an adhesive to be applied to the light guide plate 74 and the polarizer 78 expands. Namely, (a) An acrylic or epoxy adhesive of a photo-curing type whose refractive index approximates that of the light guide plate 74 can be adopted.

(b) When an adhesive layer whose refractive index is low is sandwiched between the light guide plate 74 and the polarizer 78, a plurality of low-refractive-index layers is included. This leads to the improved efficiency in guiding partly reflected light that travels at an angle approximating to a total reflection angle (light largely degrades contrast when reaching the liquid crystal panel 76 after piercing the low refractive index layer).

(c) The thickness of a low refractive index layer can be easily controlled. For example, the thickness of the low-refractive-index layer can be determined so that the low-refractive-index layer provides a reflection preventing or reflection minimizing structure, or a half wavelength with respect to light vertically transmitted by the light guide plate 74. The low-refractive-index layer serves as an anti-reflection film with respect to the vertically transmitted light and serves as a low-refractive-index layer providing a reflection interface with respect to light propagated generally horizontally.

Figure 80:
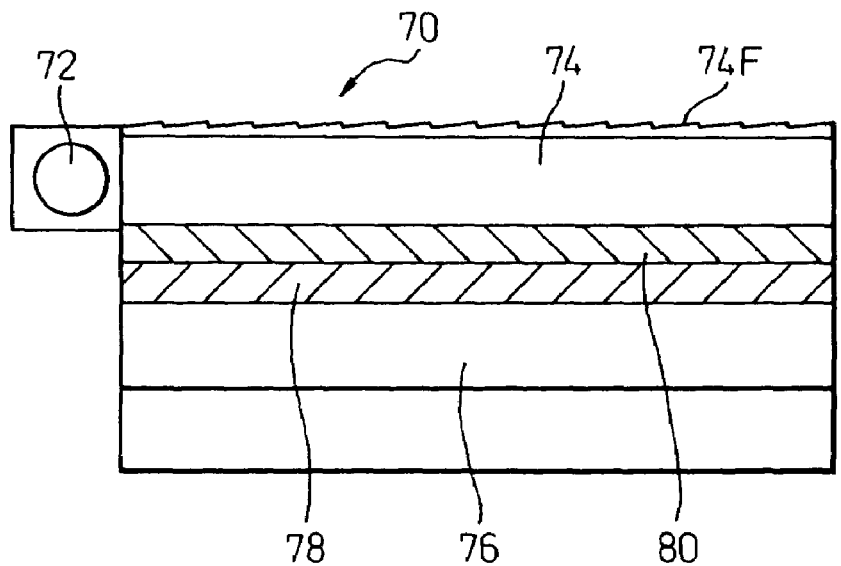
FIG. 80 is a view showing an example of a liquid crystal display device.

FIG. 80 shows a further example of a liquid crystal display device. In the example shown in FIG. 80, the light guide plate 74 is produced with a suitable glass so that the coefficient of thermal expansion of the light guide plate 74 approximates the coefficient of thermal expansion of the glass substrates of the liquid crystal panel 76. Consequently, when the bonded unit comprising the light guide plate 74 of a diagonal size of 10 inches and the liquid crystal panel 76 of a diagonal size of 10 inches with the polarizer 78 interposed between them is maintained in the room and the room temperature is changed repeatedly from −20° C. to +70° C., not only do the bonded surfaces in the bonded unit not peel off but also no bubbles are generated internally. Moreover, an abnormal deformation including warp of the substrates does not occur at all.

In the past, in the case where the light guide plate 74 made of Arton or acrylic and the liquid crystal panel 76 including glass substrates are bonded to each other, the size of the light guide plate and the liquid crystal panel not causing abnormality during a change in an environment is limited to a diagonal sized of inches 5 or less, but the construction in this example enables realization of an infinitely large structure, in principle.

In the example shown in FIG. 80, the entire light guide plate 74 is made of glass. Alternatively, a sheet having the light outputting structure such as prisms, which are made of a resin material that can be easily molded may be bonded to a glass substrate such as a flat glass plate. Moreover, the light outputting structure such as prisms may be directly formed on a glass plate or any other glass substrate using a resin material, for example, a photo-curing acrylic.

Figure 81:
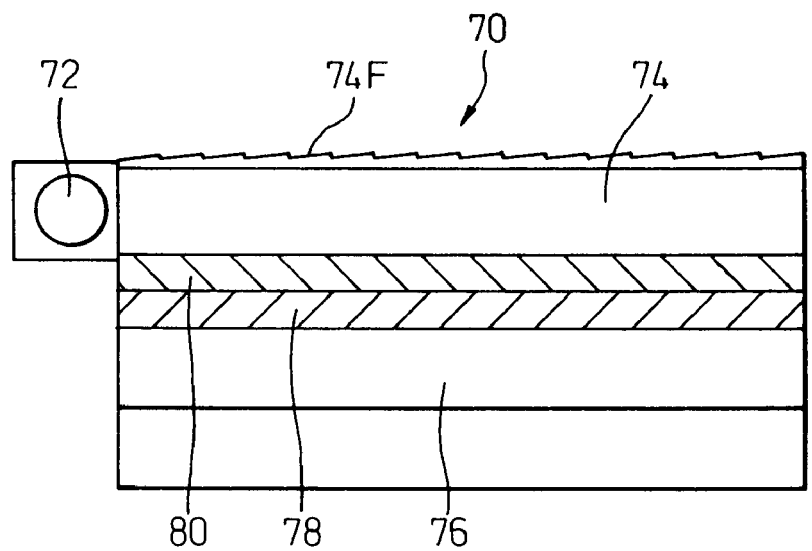
FIG. 81 is a view showing an example of a liquid crystal display device.

FIG. 81 shows a further example of a liquid crystal display device. In the example shown in FIG. 81, the substrates of the liquid crystal panel 76 are made of resin and the liquid crystal panel 76 is bonded to the light guide plate 74 made of resin. The substrate of the liquid crystal panel 76 and the light guide plate 74 exhibit mutually close coefficients of thermal expansion.

In the aforesaid embodiments, the liquid crystal panel 76 of the vertical alignment (VA) type is adopted. The following Table 1 lists the results of comparison between the liquid crystal panel of the vertical alignment (VA) type and a liquid crystal panel of a twisted nematic (TN) type. Partially Bonded 1 refers to a structure in which the light guide plate 74 with anti-reflection treatment is simply put on the assembly of liquid crystal panel 76 and the polarizer 78 bonded to each other. Partially Bonded 2 refers to a structure in which the assembly of the light guide plate 74 and the polarizer 78 bonded to each other with the low refractive index layer 80 between them is simply put on the liquid crystal panel 76. Totally Bonded refers to a structure in which the light guide plate 74, the polarizer 78, and the liquid crystal panel 76 are bonded to one another as a unit.

TABLE 1

|  | TN type | VA type |
| --- | --- | --- |
| Partly Bonded 1 | 7 | 7 |
| Partly Bonded 2 | 14 | 20 |
| Totally bonded | 19 | 35 |

In Partly Bonded structure 1, the contrast offered by the vertical alignment (VA) type is as low as the one offered by the twisted nematic (TN) type. In Totally Bonded structure in which the light guide plate 74, the polarizer 78, and the liquid crystal panel 76 are bonded to one another as a unit, the vertical alignment type liquid crystal panel offers a higher contrast than the twisted nematic type liquid crystal panel. This is because: (a) the vertical alignment method offers a higher contrast than the twisted nematic method; and (b) in order to provide the feature of the vertical alignment method, that the vertical alignment method offers a high contrast, a front light structure is preferred, wherein the assembly of the assembly of the polarizer and the light guide plate which are bonded to each other and which have reduced interface reflection is stacked on or bonded to the liquid crystal panel.

Figure 82:
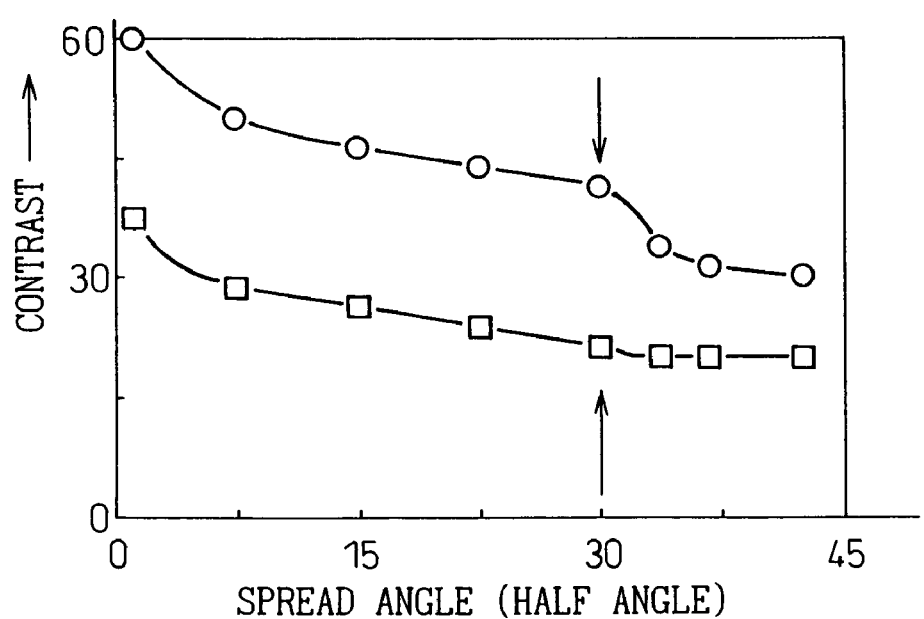
FIG. 82 is a view showing the relationship between the spread angle of light entering a light guide area in a horizontal plane and contrast.
Figure 83:
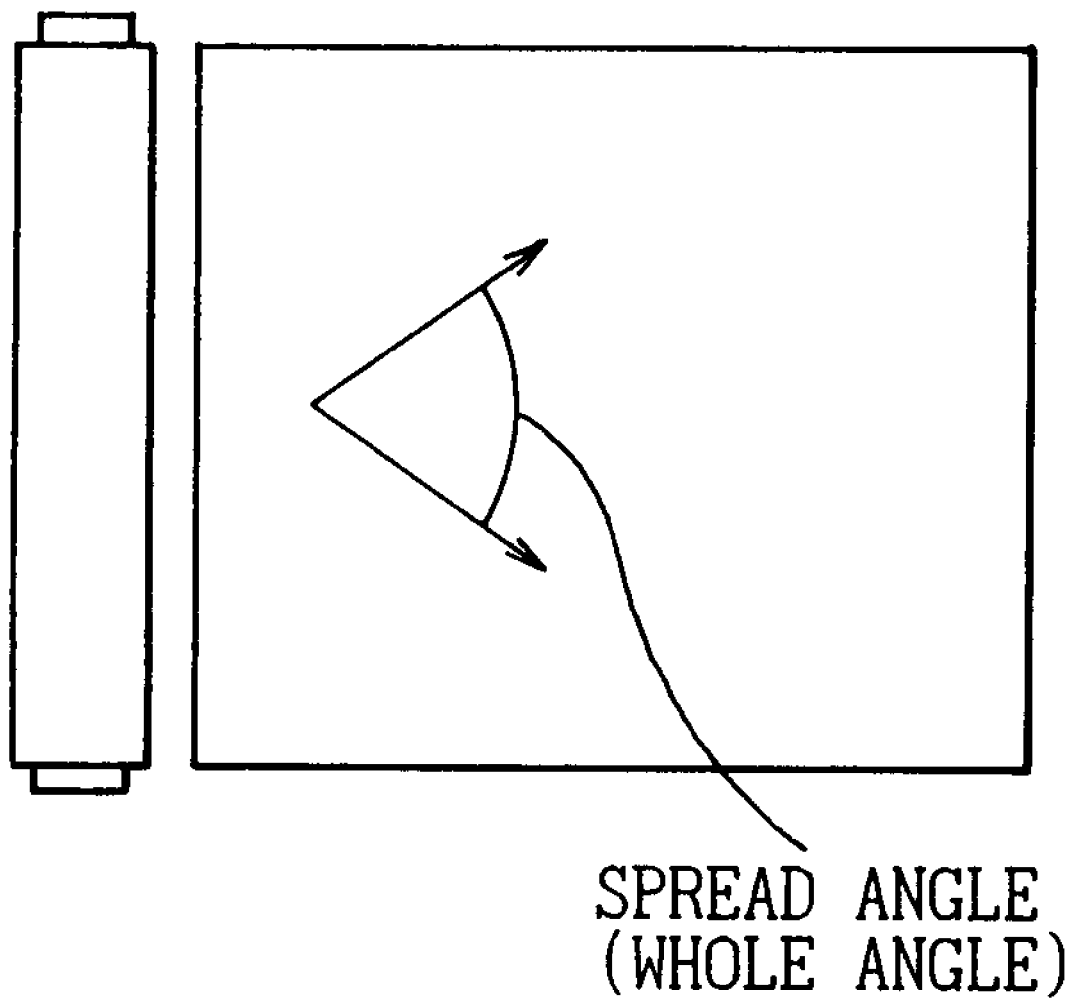
FIG. 83 is a view showing the spread angle.

FIG. 82 shows the relationship between the spread angle at which light made incident to the light guide area spreads in a horizontal plane and a contrast. The curve drawn by plotting squares is concerned with the Partly Bonded 2 structure. The curve drawn by plotting circles is concerned with the Totally Bonded structure. For example, as long as the Partly Bonded structure 2 and Totally Bonded structure are concerned, if the light guide area is made of acrylic (whose refractive index is 1.49), the spread angle is normally ±42°. When the spread angle is decreased to fall below ±30°, the contrast is improved greatly. FIG. 83 shows the spread angle.

As described above, according to the present invention, there is provided a display device including a lighting unit that offers high brightness and a high contrast. Moreover, according to the present invention, light exhibiting a high degree of parallelism can be guided through a thin light guide plate. Therefore, a lighting unit that offers high brightness, requires little power, and is thin and lightweight can be realized, and a display device including the lighting unit can be realized. Moreover, a reflective liquid crystal display device with a front light offering a high contrast and high reliability can be realized.

The invention claimed is:

1. A lighting unit comprising a light guide plate, a light source which is a light emitter, and a truncated pyramid arranged between the light guide plate and the light source, said truncated pyramid having
   a base,
   a top smaller than the base, wherein said top is an outermost peripheral planar surface, and
   a slope extending between said base and said top,
   said light source being arranged in close contact with said top of the truncated pyramid,
   said light guide plate being arranged in close contact with said base of the truncated pyramid,
   so that light is propagated from a light emitting part of the light source to the light guide plate without passing through any air layer.

2. A lighting unit according to claim 1, wherein said truncated pyramid and said light guide plate are integrated with each other, and the light source is attached to the truncated pyramid.

3. A lighting unit according to claim 1, wherein said light source and said truncated pyramid are integrated with each other, and the truncated pyramid is attached to the light guide plate.

4. A lighting unit according to claim 1, wherein: if the refractive index of the truncated pyramid is n and an angle between the slope and a line parallel to an axis of the truncated pyramid is α, the angle α of the slope of the truncated pyramid is equal to or greater than arcsin (1/n).

5. A lighting unit according to claim 1, wherein: if the refractive index of the truncated pyramid is n and an angle between the slope and a line parallel to an axis of the truncated pyramid is cx, the angle a of the slope of the truncated pyramid ranges from 30° to 45°.

6. A lighting unit according to claim 5, wherein the truncated pyramid comprises an adhesive member.

7. A lighting unit according to claim 1, wherein the light emitting part of the light source is approximately equal to the top of the truncated pyramid.

8. A lighting unit according to claim 1, wherein the light emitting surface of the light source is approximately equal to the top of the truncated pyramid.

9. A lighting unit according to claim 1, further including a reflecting member placed to at least partially surround the light source and the truncated pyramid.

10. A lighting unit according to claim 1, wherein a light absorbing member is located near a border between the light guide plate and the truncated pyramid, wherein the light absorbing member at least partially surrounds a portion of the truncated pyramid.

11. A lighting unit according to claim 1, wherein the light source comprises at least one LED.

12. A display device including a lighting unit according to one of claims 1 to 11, and a display element.

13. A lighting unit according to claim 1, wherein the light source is a package having the light emitting part sealed within an envelope.

14. A lighting unit according to claim 13, wherein the light source has a light reflecting part behind the light emitting part and emits light forward for the truncated pyramid from the light emitting part in radial directions.

15. A lighting unit according to claim 1, wherein:
   the light guide plate includes two side edges between a first face and a second face; and
   one of said side edges of said light guide plate is arranged in close contact with said base of the truncated pyramid.

16. A lighting unit according to claim 1, wherein the light emitting part of the light source is smaller than the top of the truncated pyramid.

17. A lighting unit according to claim 1, wherein the light emitting surface of the light source is smaller than the top of the truncated pyramid.

18. A lighting unit according to claim 1, wherein:
   a light emitting surface of the light source is smaller than the top of the truncated pyramid;
   the light source is attached to the top of the truncated pyramid using an adhesive; and
   the adhesive has a slope wherein a surface of a side of the light source is smaller than a surface of a side of the truncated pyramid.

19. A lighting unit according to claim 1, wherein:
   a light emitting surface of the light source is smaller than the top of the truncated pyramid;
   the light source is attached to the top of the truncated pyramid using an adhesive so that the light source is embedded in the adhesive which is a partial sphere; and
   the adhesive receives light emitted by a front of the light source and light emitted by a side of the light source and leads to the truncated pyramid.

* * * * *

UNITED STATES PATENT AND TRADEMARK OFFICE
CERTIFICATE OF CORRECTION

PATENT NO. : 7,163,331 B2 Page 1 of 1
APPLICATION NO. : 10/641720
DATED : January 16, 2007
INVENTOR(S) : Suzuki et al.

It is certified that error appears in the above-identified patent and that said Letters Patent is hereby corrected as shown below:

In the Claims:

Col. 27, line 59, delete "is cx, the angle a" and insert --is $\alpha$, the angle $\alpha$--.

Signed and Sealed this

Eighth Day of May, 2007

JON W. DUDAS
*Director of the United States Patent and Trademark Office*